United States Patent
Attar et al.

(10) Patent No.: US 12,179,361 B2
(45) Date of Patent: Dec. 31, 2024

(54) METHODS, SYSTEMS AND DEVICES FOR AUTOMATED ASSEMBLY OF BUILDING STRUCTURES PRELIMINARY

(71) Applicant: Promise Robotics Inc., Toronto (CA)

(72) Inventors: Ramtin Attar, Toronto (CA); Reza Nasseri, Edmonton (CA); Alireza Khalili, Calgary (CA); Darren Brix, Aylmer (CA); Tilemachos Pechlivanoglou, Toronto (CA); Farid Mobasser, Toronto (CA); Haitao Yu, Edmonton (CA); Robert George Kenneth Johnston, Edmonton (CA)

(73) Assignee: Promise Robotics Inc., Toronto (CA)

( * ) Notice: Subject to any disclaimer, the term of this patent is extended or adjusted under 35 U.S.C. 154(b) by 0 days.

(21) Appl. No.: 18/590,583

(22) Filed: Feb. 28, 2024

(65) Prior Publication Data

US 2024/0227184 A1 Jul. 11, 2024

Related U.S. Application Data

(62) Division of application No. 18/222,236, filed on Jul. 14, 2023.

(Continued)

(51) Int. Cl.
| | | |
|---|---|---|
| *B25J 9/16* | (2006.01) | |
| *G01N 21/88* | (2006.01) | |
| *G05B 19/418* | (2006.01) | |

(52) U.S. Cl.
CPC ........... *B25J 9/1661* (2013.01); *B25J 9/1687* (2013.01); *B25J 9/1697* (2013.01); *B25J 9/1666* (2013.01);

(Continued)

(58) Field of Classification Search
CPC ...... B25J 9/1661; B25J 9/1666; B25J 9/1682; B25J 9/1687; B25J 9/1697; B25J 9/1671;
(Continued)

(56) References Cited

U.S. PATENT DOCUMENTS

| | | | | | |
|---|---|---|---|---|---|
| 4,876,728 A | * | 10/1989 | Roth | ...................... | G06V 10/26 382/199 |
| 6,369,401 B1 | * | 4/2002 | Lee | ....................... | G01B 11/00 356/627 |

(Continued)

FOREIGN PATENT DOCUMENTS

| | | |
|---|---|---|
| EP | 3733355 A1 | 11/2020 |
| WO | 2012047603 A1 | 4/2012 |

OTHER PUBLICATIONS

International Search Report and Written Opinion mailed Sep. 5, 2023 in related International Patent Application No. PCT/CA2023/050953 (13 pages).

*Primary Examiner* — Ian Jen
*Assistant Examiner* — Karston G. Evans
(74) *Attorney, Agent, or Firm* — SMART & BIGGAR LP

(57) ABSTRACT

Embodiments herein generally relate to methods, systems and devices for automated assembly of building structures. In at least one embodiment, there is provided a robotic assembly cell for assembling building structures. The robotic assembly cell comprises a perception sensor system; one or more assembly robots; and at least one processor operable to: receive instructions corresponding to an assembly sequence for assembling a building structure; determine a plurality of building parts required for assembling the building structure based on the assembly sequence; identify each building part within a facility, based on sensor data from the perception sensor system; configure the assembly robot to retrieve the target pieces; and configure the assembly robot to assemble the target pieces according to the assembly sequence.

30 Claims, 66 Drawing Sheets

Related U.S. Application Data

(60) Provisional application No. 63/389,146, filed on Jul. 14, 2022.

(52) U.S. Cl.
CPC ............ *B25J 9/1671* (2013.01); *B25J 9/1682* (2013.01); *G01N 21/8851* (2013.01); *G05B 19/41805* (2013.01); *G05B 19/41865* (2013.01); *G05B 19/41885* (2013.01); *G05B 2219/31052* (2013.01); *G05B 2219/32104* (2013.01); *G05B 2219/32254* (2013.01); *G05B 2219/40033* (2013.01)

(58) Field of Classification Search
CPC .......... G01N 21/8851; G05B 19/41805; G05B 19/41865; G05B 19/41885; G05B 2219/31052; G05B 2219/32104; G05B 2219/32254; G05B 2219/40033
See application file for complete search history.

(56) References Cited

U.S. PATENT DOCUMENTS

| | | | |
|---|---|---|---|
| 6,415,204 B1* | 7/2002 | Hirabayashi | B23P 21/004 29/430 |
| 9,623,559 B2 | 4/2017 | Linnell et al. | |
| 9,630,316 B2 | 4/2017 | Konolige et al. | |
| 9,995,047 B2 | 6/2018 | Raman et al. | |
| 2010/0220184 A1* | 9/2010 | Appleyard | F16P 3/142 250/221 |
| 2014/0036072 A1* | 2/2014 | Lyall | G06V 20/52 348/143 |
| 2016/0136815 A1 | 5/2016 | Linnell et al. | |
| 2016/0148054 A1* | 5/2016 | Han | G06T 7/269 382/103 |
| 2018/0326596 A1* | 11/2018 | Prahlad | H05K 13/0408 |
| 2019/0381670 A1 | 12/2019 | Corell et al. | |
| 2020/0032528 A1 | 1/2020 | Telleria et al. | |
| 2020/0070352 A1 | 3/2020 | Larzaro-Gredilla et al. | |
| 2020/0147794 A1 | 5/2020 | Kerrick et al. | |
| 2020/0319630 A1 | 10/2020 | Rudnitsky et al. | |
| 2020/0376670 A1 | 12/2020 | Diankov et al. | |
| 2020/0379448 A1* | 12/2020 | Ashworth | G01N 21/8986 |
| 2021/0310263 A1 | 10/2021 | Zhang et al. | |
| 2021/0316457 A1 | 10/2021 | Kang et al. | |
| 2021/0316459 A1 | 10/2021 | Kang et al. | |
| 2021/0370513 A1 | 12/2021 | Dai | |
| 2021/0385413 A1* | 12/2021 | Wen | G06T 7/001 |
| 2022/0010608 A1 | 1/2022 | Dittrich et al. | |
| 2022/0075353 A1 | 3/2022 | Derecichei et al. | |
| 2022/0156424 A1 | 5/2022 | Poostchi | |
| 2022/0402710 A1 | 12/2022 | Pidaparthi et al. | |
| 2023/0032261 A1 | 2/2023 | Nakashima et al. | |
| 2023/0182300 A1* | 6/2023 | Meduna | B25J 9/162 700/255 |
| 2023/0386074 A1* | 11/2023 | Canton | A61B 90/96 |

* cited by examiner

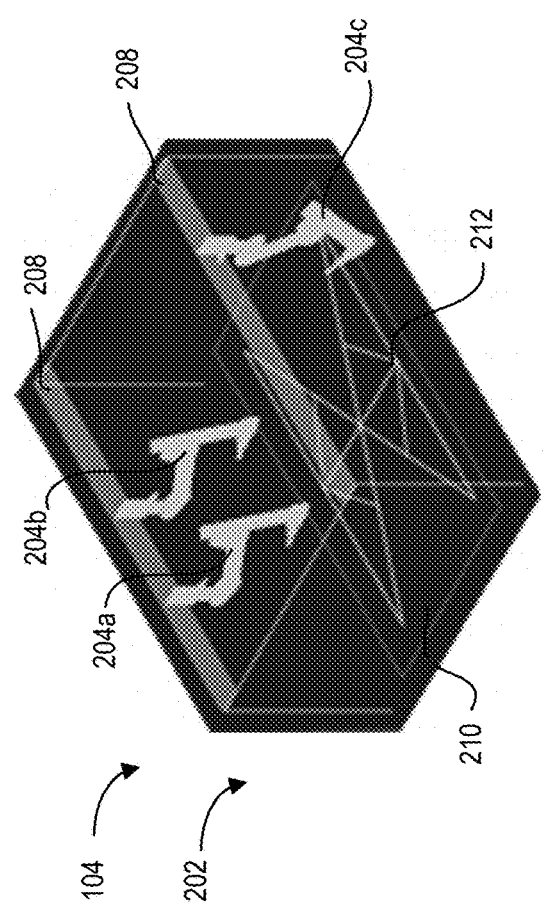
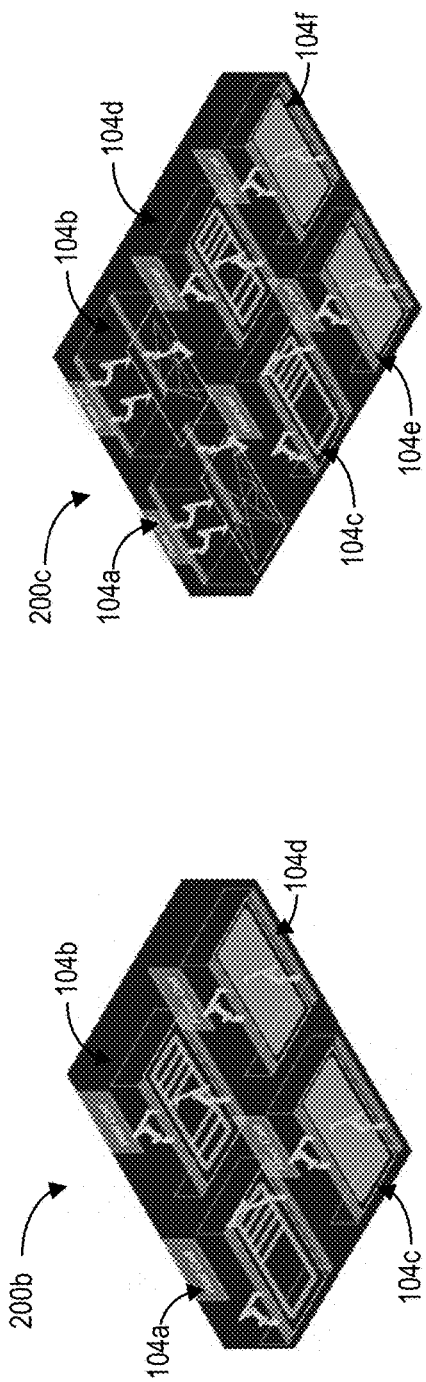
FIG. 2A
FIG. 2B
FIG. 2C

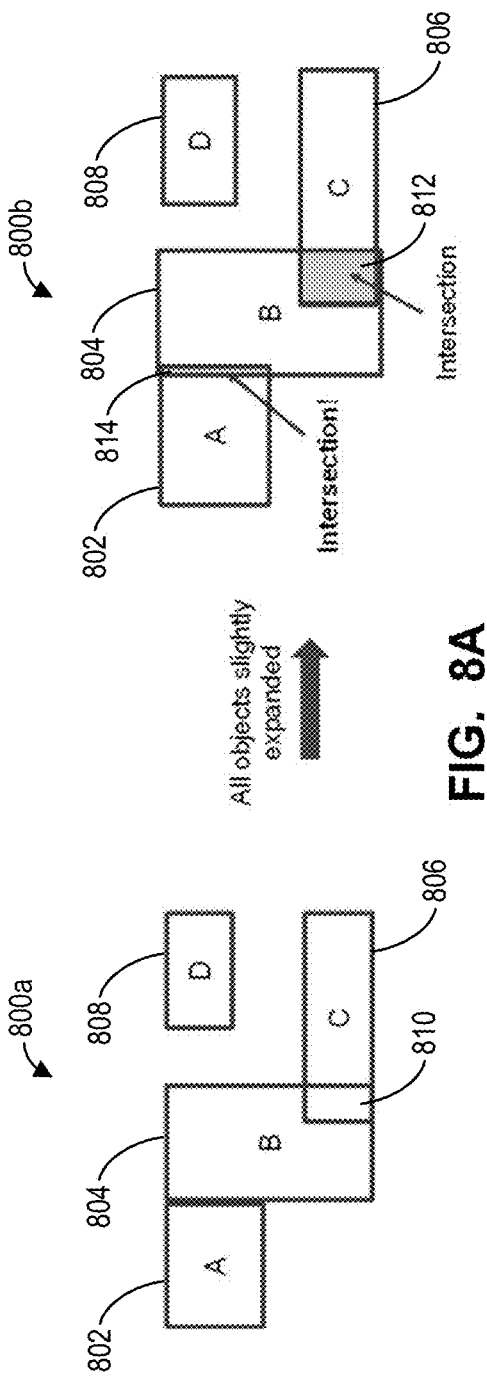
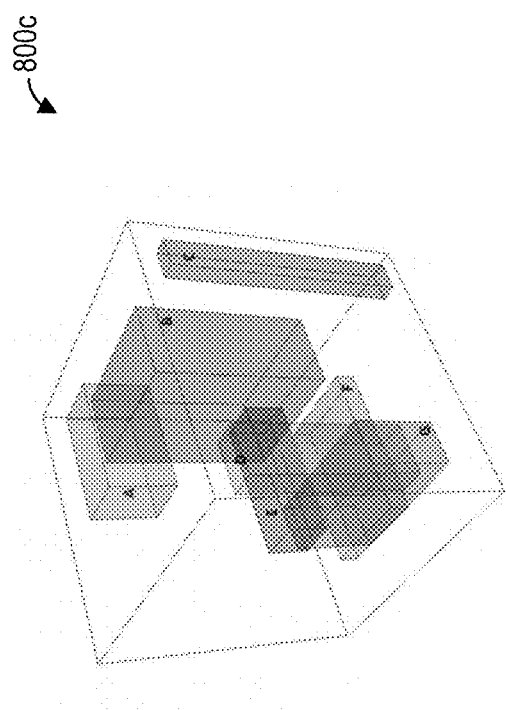
FIG. 8A
FIG. 8B

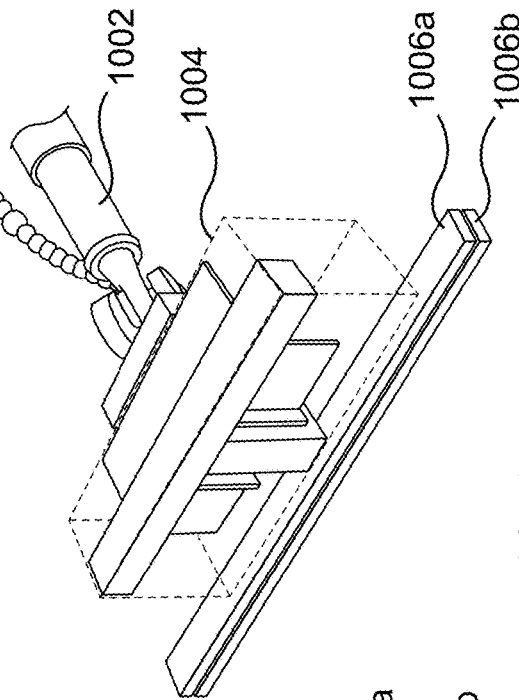
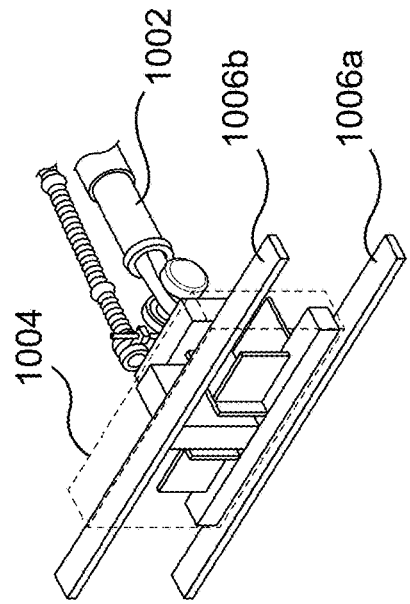
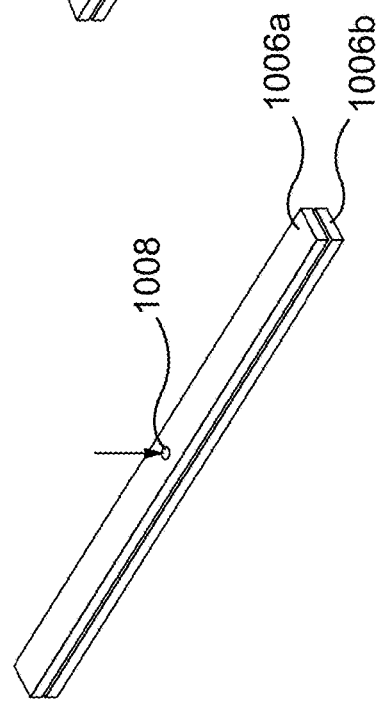
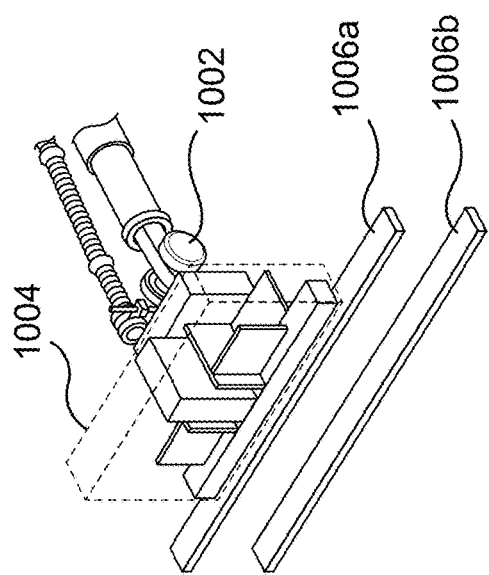
FIG. 11B
FIG. 10B
FIG. 11A
FIG. 10A

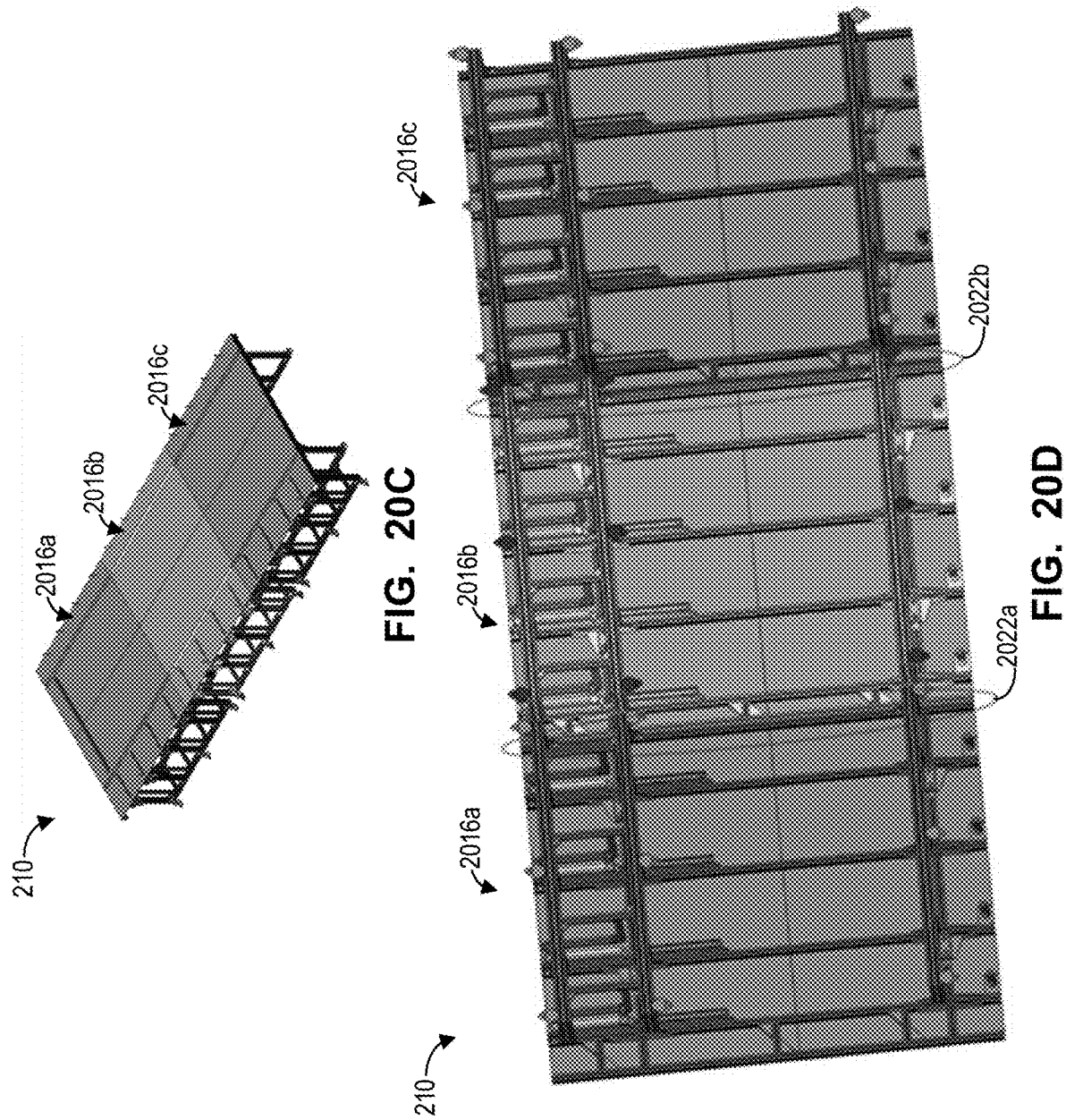

METHODS, SYSTEMS AND DEVICES FOR AUTOMATED ASSEMBLY OF BUILDING STRUCTURES PRELIMINARY

FIELD

The present disclosure generally relates to assembly and manufacturing of building structures, including building structures used in the assembly of housing units as well as other infrastructure, and in particular, to methods, systems and devices for automated assembly of building structures.

INTRODUCTION

The following is not an admission that anything discussed below is part of the prior art or part of the common general knowledge of a person skilled in the art.

In recent years, many urban centers have experienced an increasing shortage of housing (e.g., single-family homes and condominium units) caused, in-part, by a low supply of new housing construction that has lagged behind growing consumer demand. The low supply of new housing construction is driven by a combination of factors, including antiquated and manual construction processes that result in elongated construction timelines, as well as an increasing absence of a skilled labor workforce (e.g., skilled construction workers).

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In one broad aspect, there is provided a method for automated assembly of building structures, the method comprising: analyzing assembly data associated with a building structure; based on the analyzing, determining an assembly sequence for assembling building parts to construct the building structure, wherein the assembly sequence comprises a plurality of assembly tasks; generating robot-specific control instructions, for each of one or more assembly robots in a robotic assembly cell, to execute the assembly sequence; and transmitting the robot-specific control instructions to the one or more assembly robots in the robotic assembly cell.

In at least one example embodiment, the method further comprises determining: a time-based motion path and action plan for each of the one or more assembly robots to execute the assembly tasks; and generating the robotic-specific control instructions based on the corresponding time-based motion path and action plan.

In at least one example embodiment, the method further comprises initially, analyzing robotic cell capability data corresponding to hardware and software capabilities of that robotic assembly cell.

In at least one example embodiment, the robotic cell capability data comprises the number of assembly robots in that robotic assembly cell.

In at least one example embodiment, the robotic cell capability data further comprises one or more of an assembly robot configuration within the robotic cell, tooling abilities of each assembly robot in the robotic cell, assembly robot hardware limitations and a work area size of the robotic cell.

In at least one example embodiment, the method further comprises, initially, analyzing facility capability data comprising a number of robotic cells in a facility and robotic cell capability data associated with each robotic cell.

In at least one example embodiment, the method further comprises determining the assembly sequence is based on one or more optimization factors including: accuracy and repeatability of assembly, a target time of completion and a target cost of completion.

In at least one example embodiment, determining the assembly sequence comprises determining a mounting assembly sequence of the building parts, wherein the mounting assembly sequence comprises a plurality of mounting tasks.

In at least one example embodiment, each mounting task identifies one or more of: the building part requiring mounting, the mounting configuration of that building part, an assembly robot designated to perform the mounting task, a type of grasping tool to be equipped by the assembly robot to engage the building part, and an indication of a grasping configuration for the assembly robot.

In at least one example embodiment, determining the assembly sequence further comprises determining a fastening assembly sequence, wherein the fastening assembly sequence comprises a plurality of fastening tasks.

In at least one example embodiment, each fastening task identifies one or more of: the building parts requiring fastening, fastening configuration, an assembly robot designated to perform the fastening task, whether the building structure requires lifting to enable access to an underside for applying one or more fasteners, a type of fastening tool to be equipped by the assembly robot, and a fastening tool configuration.

In at least one example embodiment, the method further comprises: controlling the robotic assembly cell according to an initial assembly configuration; monitoring for one or more trigger events to re-configure the robotic assembly cell configuration; and in response to detecting a trigger event, controlling the robotic assembly cell according to an updated assembly configuration.

In at least one example embodiment, the method further comprises: determining requirements for an assembly project; identifying requirements for assembly tasks to complete the assembly project; determining robotic cell task allocation for each robotic assembly cell in the facility; and transmitting cell-specific control instructions to each of the one or more robotic assembly cells.

In at least one example embodiment, determining the assembly sequence comprises determining an assembly sequence for two or more assembly robots, wherein at least two of the two or more assembly robots are located in different cells.

In at least one example embodiment, determining an assembly sequence comprises: for each assembly state, determining possible placement actions; determining one or more action variants for each possible placement action; ranking the possible placement actions based on at least one of: a number of action variants for each of the possible placement action and a number of possible placement actions in a subsequent assembly state blocked by the possible placement action; and selecting a top ranked possible placement action based on the ranking.

In at least one example embodiment, the variants comprise at least one of: a direction of placement, an assembly robot, a tool and an assembly orientation.

In at least one example embodiment, the method further comprises generating a simulation of the assembly sequence; and displaying on a user interface the simulation of the assembly sequence.

In at least one example embodiment, the method further comprises receiving a request for modifying the assembly sequence; generating revised control instructions in response to the request; and configuring the one or more assembly robots with the revised control instructions.

In at least one example embodiment, analyzing assembly data associated with the building structure comprises: receiving the assembly data; assigning roles to the building parts; matching each of the building parts to a stored template based on the roles; detecting one or more errors associated with the building parts, the one or more errors including any errors generated during said matching; determining a positional configuration for the building parts based on the matching templates and any detected errors; and determining a fastener configuration for the building parts based on the positional configuration.

In another broad aspect, there is provided a system for automated assembly of building components, the system comprising: a robotic assembly cell comprising one or more assembly robots; and a server comprising at least one processor operable to perform the method of analyzing assembly data associated with a building structure; based on the analyzing, determining an assembly sequence for assembling building parts to construct the building structure, wherein the assembly sequence comprises a plurality of assembly tasks; generating robot-specific control instructions, for each of one or more assembly robots in a robotic assembly cell, to execute the assembly sequence; and transmitting the robot-specific control instructions to the one or more assembly robots in the robotic assembly cell.

In another broad aspect, there is provided a robotic assembly cell for assembling building structures comprising: a perception sensor system; one or more assembly robots; and at least one processor operable to: receive instructions corresponding to an assembly sequence for assembling a building structure; determine a plurality of building parts required for assembling the building structure based on the assembly sequence; identify each building part within a facility, based on sensor data from the perception sensor system; configure the assembly robot to retrieve the target pieces; and configure the robotic arm to assemble the target pieces according to the assembly sequence.

In at least one example embodiment, the at least one processor is operable to identify a location, an orientation, and a distance of each building part of the plurality of target building parts.

In at least one example embodiment, the perception sensor system comprises at least one of: a 2D or 3D imaging camera, a force sensor, torque sensor and light source.

In at least one example embodiment, the at least one processor is further operable to determine if a building part includes a defect, based on the sensor data from the perception sensor system.

In at least one example embodiment, the defect is one of: a crack, an edge imperfection, and a crown.

In at least one example embodiment, the at least one processor is further operable to: when the building part includes a defect, determine if the building part can be used and if the building part cannot be used, configure the assembly robot to discard the building part.

In at least one example embodiment, the at least one processor is further operable to determine if the assembled building structure includes a defect, based on the sensor data from the perception sensor system.

In at least one example embodiment, the at least one processor is operable to identify each target building by identifying at least one edge of the building part.

In at least one example embodiment, the perception sensor system is configured to identify a presence of an obstacle in an operation zone of the assembly robot.

In at least one example embodiment, the at least one processor is further operable to: receive a captured image of a building part, the building part being any one of the plurality of building parts; generate a binary mask of the building part based on the captured image; detect position and orientation of the building part based on detecting lines or corners of the binary mask; and determine a pose correction for the building part based on the detected orientation.

In at least one example embodiment, the at least one processor is further operable to: receive a captured image of a pre-cut table; perform background subtraction of the received image to detect a building part staged on the pre-cut table; and generate a binary mask of the building part based on the background subtraction.

In at least one example embodiment, the at least one processor is further operable to: determine a contour of the building part based on the binary mask; and compare the determined contour with a reference contour of the building part.

In at least one example embodiment, the at least one processor is further operable to: determine a length and a width of the building part based on the binary mask.

In at least one example embodiment, the at least one processor is further operable to: receive a captured image of a table; perform background subtraction of the received image to detect an object on the table; generate a binary mask of the object based on the background subtraction; and determine a contour of the object based on the binary mask.

In at least one example embodiment, the at least one processor is further operable to: receive a captured image of a spindle of the assembly robot, the captured image including a picked bit that is picked by the spindle for performing a task; compare the captured image with multiple reference images, each reference image corresponding to a bit available to be picked by the spindle; determine multiple matching scores, each matching score indicating matching between features in the captured image and features in one of the reference images; and verify that correct bit was picked by the spindle for performing the task based on the multiple matching scores.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 2A is an example modular robotic assembly cell;

FIG. 2B is an example micro-factory comprising an aggregate of multiple modular robotic cells;

FIG. 2C is an example complete factory comprising an aggregate of multiple modular robotic cells;

FIG. 8A is an illustration of a two dimensional (2D) R-tree data structure;

FIG. 8B is an illustration of a three dimensional (3D) R-tree data structure;

FIG. 10A is an illustration of a top beam being mounted from above a bottom beam;

FIG. 10B is an illustration of a top beam being mounted from below a bottom beam;

FIG. 11A is an illustration of a top beam mounted over a bottom beam;

FIG. 11B is an illustration of a top beam being fastened to a bottom beam using an assembly robot;

FIG. 20C is a side perspective view of an example modular assembly platform;

FIG. 20D is a bottom view of an example modular assembly platform;

Figure 1A:
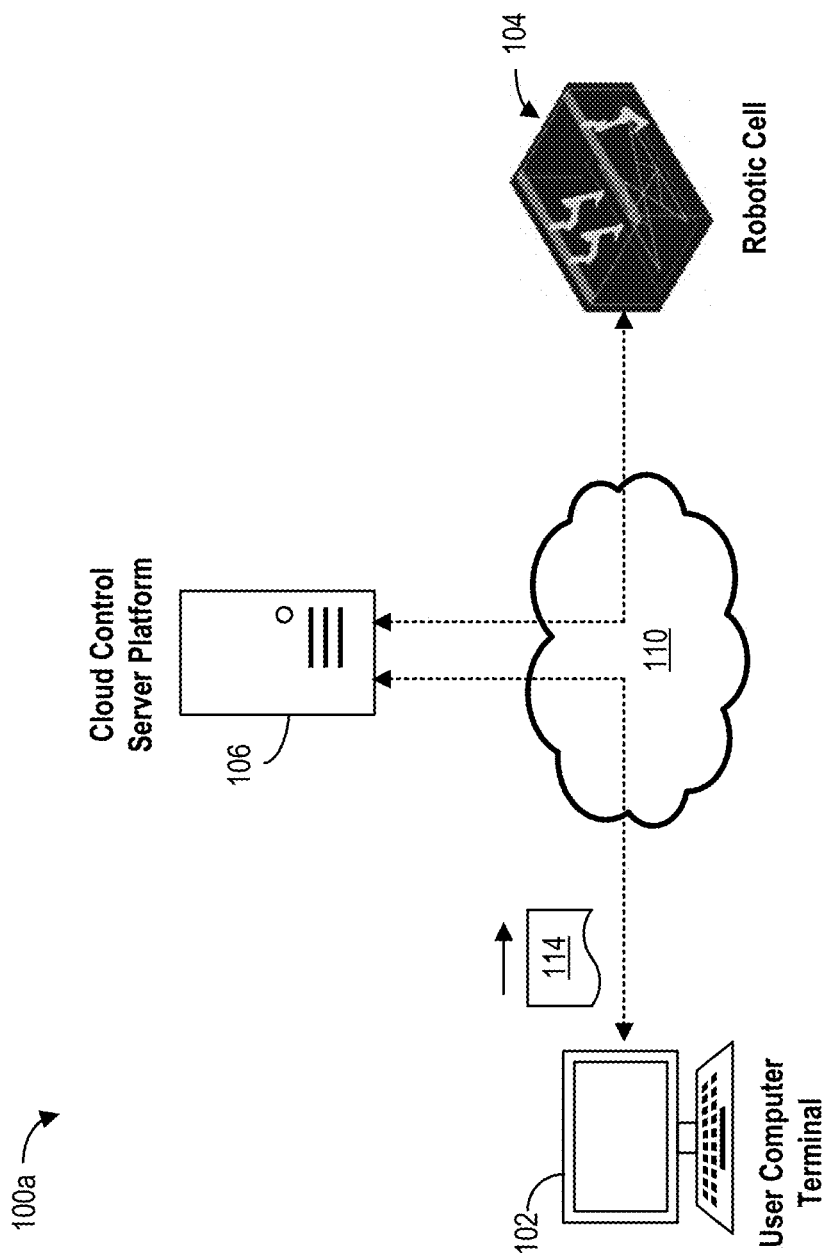
FIG. 1A is an example system for automated assembly of building structures.

Further aspects and features of the example embodiments described herein will appear from the following description taken together with the accompanying drawings.

DESCRIPTION OF VARIOUS EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth in order to provide a thorough understanding of the subject matter described herein. However, it will be understood by those of ordinary skill in the art that the subject matter described herein may be practiced without these specific details. In other instances, well-known methods, procedures and components have not been described in detail so as not to obscure the subject matter described herein. The description is not to be considered as limiting the scope of the subject matter described herein.

It should also be noted that the terms "coupled" or "coupling" as used herein can have several different meanings depending in the context in which these terms are used. For example, the terms coupled or coupling can have a mechanical, fluidic or electrical connotation. For example, as used herein, the terms coupled or coupling can indicate that two elements or devices can be directly connected to one another or connected to one another through one or more intermediate elements or devices via an electrical or magnetic signal, electrical connection, an electrical element or a mechanical element depending on the particular context. Furthermore, coupled electrical elements may send and/or receive data.

Unless the context requires otherwise, throughout the specification and claims which follow, the word "comprise" and variations thereof, such as, "comprises" and "comprising" are to be construed in an open, inclusive sense, that is, as "including, but not limited to".

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

Reference throughout this specification to "one embodiment", "an embodiment", "at least one embodiment" or "some embodiments" means that one or more particular features, structures, or characteristics may be combined in any suitable manner in one or more embodiments, unless otherwise specified to be not combinable or to be alternative options.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

Similarly, throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), optical pathways (e.g., optical fiber), electromagnetically radiative pathways (e.g., radio waves), or any combination thereof. Exemplary communicative couplings include, but are not limited to, electrical couplings, magnetic couplings, optical couplings, radio couplings, or any combination thereof.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The example systems and methods described herein may be implemented as a combination of hardware or software. In some cases, the examples described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a keyboard, mouse, touchscreen, or the like), and at least one output device (e.g. a display screen, a printer, a wireless radio, or the like) depending on the nature of the device.

Some elements that are used to implement at least part of the systems, methods, and devices described herein may be implemented via software that is written in a high-level procedural language such as object-oriented programming. The program code may be written in C++, C #, JavaScript, Python, or any other suitable programming language and may comprise modules or classes, as is known to those skilled in object-oriented programming. Alternatively, or in addition thereto, some of these elements implemented via software may be written in assembly language, machine language, or firmware as needed. In either case, the language may be a compiled or interpreted language.

At least some of these software programs may be stored on a computer readable medium such as, but not limited to, a ROM, a magnetic disk, an optical disc, a USB key, and the like that is readable by a device having at least one processor, an operating system, and the associated hardware and software that is used to implement the functionality of at least one of the methods described herein. The software program code, when read by the device, configures the device to operate in a new, specific, and predefined manner (e.g., as a specific-purpose computer) in order to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

As stated in the background, major urban centers increasingly suffer from a shortage of housing. This shortage is due, in-part, to challenges in accessing a skilled labor workforce, as well as more generally, elongated timelines inherent in antiquated and manual construction processes. Similar challenges have also affected new housing supplies in remote, rural and urban areas, which also suffer from an acute lack of available labor to build new houses.

To this end, it has been appreciated that automated construction techniques may assist in mitigating the lagging supply of new housing infrastructure. For example, automated processes may decrease reliance on a skilled labor workforce and may also expedite construction timelines. Automated construction techniques may also have the benefit of reducing total construction costs.

In view of the foregoing, the present disclosure relates to methods, systems and devices that enable automated assembly of building structures. In one example, the disclosed embodiments facilitate construction of new housing units. This includes, for example, construction of new single-family homes and condominium units. It will be understood, however, that the disclosed embodiments may also be applied to the construction of many other types of building infrastructure.

As provided in greater detail, a robotic assembly cell is disclosed for automated assembly of building structures. To facilitate automated assembly of building structures, the robotic cell can include one or more assembly robots. The robotic cell may also include other system components that facilitate automated assembly. For example, these may include automated cutting stations, assembly building platforms, etc. In some cases, the robotic cell may further include features that facilitate manual intervention by human operators, as needed (e.g., a manual intervention table).

In at least some example cases, the robotic cell may be configurable, or re-configurable, to perform different, or multiple tasks. For example, the assembly robots, inside the robotic cell, can be re-configurable to assemble different types of building structures. For instance, the same robotic cell can be re-configured to assemble different building structures used for constructing a single-family home. In this manner, the robotic cell can form an integrated one-stop automated solution for assembling complete buildings.

In an example application, building structures are pre-assembled (e.g., pre-fabricated) using the robotic cell and are transported or shipped to a construction site. At the construction site, the pre-assembled structures are rapidly assembled into the desired building infrastructure (e.g., a housing unit). Accordingly, the robotic cell can facilitate expedited construction timelines at a construction site.

The disclosed robotic cell may also be portable. For instance, the robotic cell may include systems and devices which can be quickly disassembled, transported and re-assembled. In turn, this may allow the robotic cell to be shipped and deployed at different geographic locations. This feature may be advantageous in facilitating construction in remote, rural areas.

In various embodiments disclosed herein, the robotic assembly cell is connected to a cloud server platform. The cloud platform monitors, controls and coordinates operation of the robotic cell. For example, the cloud platform may generate and transmit control instructions to guide operation of assembly robots inside the robotic cell. To this end, the cloud platform may also configure, or re-configure (e.g., re-program) robotic cells to provide different functions on as-need basis.

In more detail, the cloud server enables a unique software-defined manufacturing service. Robotic cells may be deployed at any geographic location, and connected or plugged-into the remote cloud platform to become operational. The cloud platform is able to manage back-end software operation for the robotic cell. In turn, users are not required to maintain and update the back-end software in order to operate the robotic cell. This allows low capital investment and fast deployment of robotic cells by user operators (e.g., real estate developers).

As disclosed herein, the cloud sever platform can also remotely service multiple robotic cells, concurrently or non-concurrently. For example, the cloud platform can service multiple cells associated with different users in the same or different geographic locations. This can reduce system-wide costs when deploying the system to service a plurality of robotic cells designated to different construction projects.

In some example cases, the cloud server may host one or more machine learning models. The machine learning models may be trainable to generate control instructions for the robotic cells. For instance, a machine learning model may be trained to determine optimal assembly sequences for assembling different types of building structures. To this end, as the cloud server may communicate with multiple robotic cells—the cloud server may train the model using aggregate datasets generated or received from the multiple cells. As such, the cloud platform is uniquely able to generate highly trained, and highly efficient machine learning models.

The robotics assembly cell may also be modular and scalable. For example, multiple robotics cells can be combined in a scalable manner to form different "factory" sizes with different production volumes and/or capabilities. For example, this can include micro-factories, complete factories or otherwise anything in-between.

Robot cell "factories" can enable mass production of building structures. For example, different robotic cells, in a single factory, may be configured (or re-configured) to assemble different building structures, as-needed. In other cases, different robotic cells may assemble different portions of the same building structure. More particularly, factories may be scaled-up or scaled-down as desired to increase or decrease the number of modular cells, and thereby, increase or decrease production output. In some examples, operation of each robotic cell in the factory may be managed and coordinated by the cloud platform. In other cases, the robotic cells may be each individually controlled, such as, for example, by using a dedicated local controller.

In view of the foregoing, the disclosed embodiments provide for easy to deploy, automated assembly and manufacturing of building structures. By leveraging the efficiencies of industrialized assembly robots and/or machine learning models, it is believed that the disclosed methods and systems accelerate manufacturing times, while also removing uncertainties associated with the construction of homes and other buildings.

The automated systems may also enable reliable, just-in-time manufacturing of building structures in a wide array of construction applications. This may allow construction projects to meet the growing demand for higher productivity, while addressing growing labor shortages and doing so in a sustainable manner.

It is further believed that the disclosed embodiments, which enable remote, cloud-based control of assembly robots, also assist in the democratization of assembly robots in construction. This, in turn, facilitates ease of acquisition and deployment of this technology for assembling housing. The automation of construction also has broader advantages in reducing overall construction costs for the final housing product, while increasing the quality of the output product.

1. General System Overview

Reference is now made to FIG. 1A, which shows an example system 100a for automated assembly of building structures.

As shown, system 100a generally includes a user computer terminal 102 connected, via network 110, to one or more control server(s) 106 (e.g., cloud servers) and a robotic assembly cell 104.

In operation, a user may interact with the computer terminal 102. Computer terminal 102 may, for example, enable the user to upload one or more design files 114. The design files 114 can correspond to model designs for building structures requiring assembly via robotic cell 104 (e.g., wall panels, roof/ceiling structures, etc.).

The design file(s) 114 may be transmitted from the computer terminal 102 to the cloud server 106, via network 110. Cloud server 106 may receive, parse and analyze the design file. In turn, the cloud server 106 may generate control instructions for assembling the corresponding building structure(s). The control instructions are then transmitted to the robotic cell 104 for automated assembly (e.g., in real-time or near real-time). In some example cases, the cloud server 106 may host one or more machine learning models (e.g., AI models), which provide enhanced functionality in determining and generating optimal assembly control instructions.

In the various embodiments disclosed herein, one of the novel aspects of the system 100a is the use of the cloud server 106 as an intermediary between user terminal 102 and the robotic cell 104. More particularly, a user may deploy the robotic cell 104 at any desired on-site or off-site location, and further connect (e.g., plug-in) the computer terminal 102 and robotic cell 104 to network 110. Cloud server 106 may then provide a "ready-to-use" software platform for remotely controlling and monitoring operation of the robotic cell 104. In turn, users deploying the robotic cell 104 are not required to manage the complexities of the automated software platform. Rather, a third party which is hosting the cloud platform may manage the back-end software, and may further update and enhance the software platform, e.g., in real-time or near real-time. In this manner, cloud server 106 can provide automated manufacturing in the form of a software as a service (Saas), thereby enabling fast deployment of robotic cells 104, and at a low capital investment to the robotic cell user.

In more detail, computer terminal 102 may be a desktop or laptop computer, but may also refer to a smartphone, tablet computer, as well as a wide variety of "smart" devices capable of data communication. The computer terminal 102 can include a display for presenting a graphical user interface (GUI). The GUI may allow the user to input various building structure design files (e.g., CAD® models).

Server 106 is a computer server that is connected to network 110. Server 106 has a processor, volatile and non-volatile memory, at least one network interface, and may have various other input/output devices. To this end, server 106 need not be a dedicated physical computer. For example, in various embodiments, the various logical components that are shown as being provided on server 106 may be hosted by a third party "cloud" hosting service such as Amazon™ Web Services™ Elastic Compute Cloud (Amazon EC2). As with all devices shown in the systems 100*a* (and systems 100*b*, 100*c* in FIGS. 1B and 1C), there may be multiple servers 106, although not all are shown. It will be understood that reference to a server 106, in the singular, may refer to one or more servers.

As explained, server 106 can provide cloud-based motion planning and control for the robotic cell 104. Server 106 may also provide more general production management services for the robotic cell, including: (i) assembly planning and scheduling, (ii) real-time or near real-time monitoring of assembly progress, (iii) management of inventory at the robotic cell, (iv) assembly and production cost estimation, (v) controlling and supervision of required maintenance, (vi) analytics and report generation, (vii) logistics and shipping management, and/or (viii) building and component model analysis and optimization.

In some examples, some or all of the processes provided by the server 106 can be performed by one or more machine learning models, hosted on the server 106. For example, this includes the cloud-based motion and path planning, as well as the various general production management services.

Network 110 may be connected to the internet. Typically, the connection between network 110 and the Internet may be made via a firewall server (not shown). In some cases, there may be multiple links or firewalls, or both, between network 110 and the Internet. Some organizations may operate multiple networks 110 or virtual networks 110, which can be internetworked or isolated. These have been omitted for ease of illustration, however it will be understood that the teachings herein can be applied to such systems. Network 110 may be constructed from one or more computer network technologies, such as IEEE 802.3 (Ethernet), IEEE 802.11 and similar technologies.

FIG. 2A shows an example robotic assembly cell 104. As shown, the robotic cell 104 may include one or more assembly robots 204*a*-204*c* used for assembling various building structures (e.g., wall panels, ceilings/roofs, floor panels, staircases, etc.). The assembly robots 204 can comprise any suitable robotic system including, by way of example, robotic arms and/or robotic gantry systems. The assembly robots 204 can be stationary, or may dynamically move around the robotic cell 104 (e.g., along slidable tracks 208). Operation of assembly robots 204 may be controlled, and guided by control instructions received from cloud server 106. In other cases, one or more assembly robots 204 may be controlled by a local computing system or processor of the robotic cell 104.

As stated previously, a unique feature of the robotic cell 104 is that it may be flexibly configured or re-configured (e.g., re-programmed) to perform different or multiple tasks. For example, multi-functional assembly robots 204 can be re-configured to assemble different building structures, on as-need basis (or otherwise assemble different portions of the same structure). This can be done by transmitting new or updated control instructions to the robotic cell 104. Accordingly, the same robotic cell 104 can act as a one-stop integrated solution for various assembly needs. This, in turn, minimizes the amount of system resources and footprint required to assemble building units having different types of constituent building structures.

The robotic cell 104 may also include a building platform 210 (e.g., a table) for positioning assembled parts. The robotic cell 104 may also include other system components (e.g., cutting tables, etc.) that may be used in automated or manual assembly, and that are described in further detail herein.

As also noted previously, robotic cell 104 can be used to pre-fabricate (or pre-assemble) building structures, which may be transported or shipped to a construction site for rapid assembly (e.g., into a housing unit). In other examples, the robotic cell 104 may itself be portable, such that it may be shipped directly to a construction site.

Figure 1B:
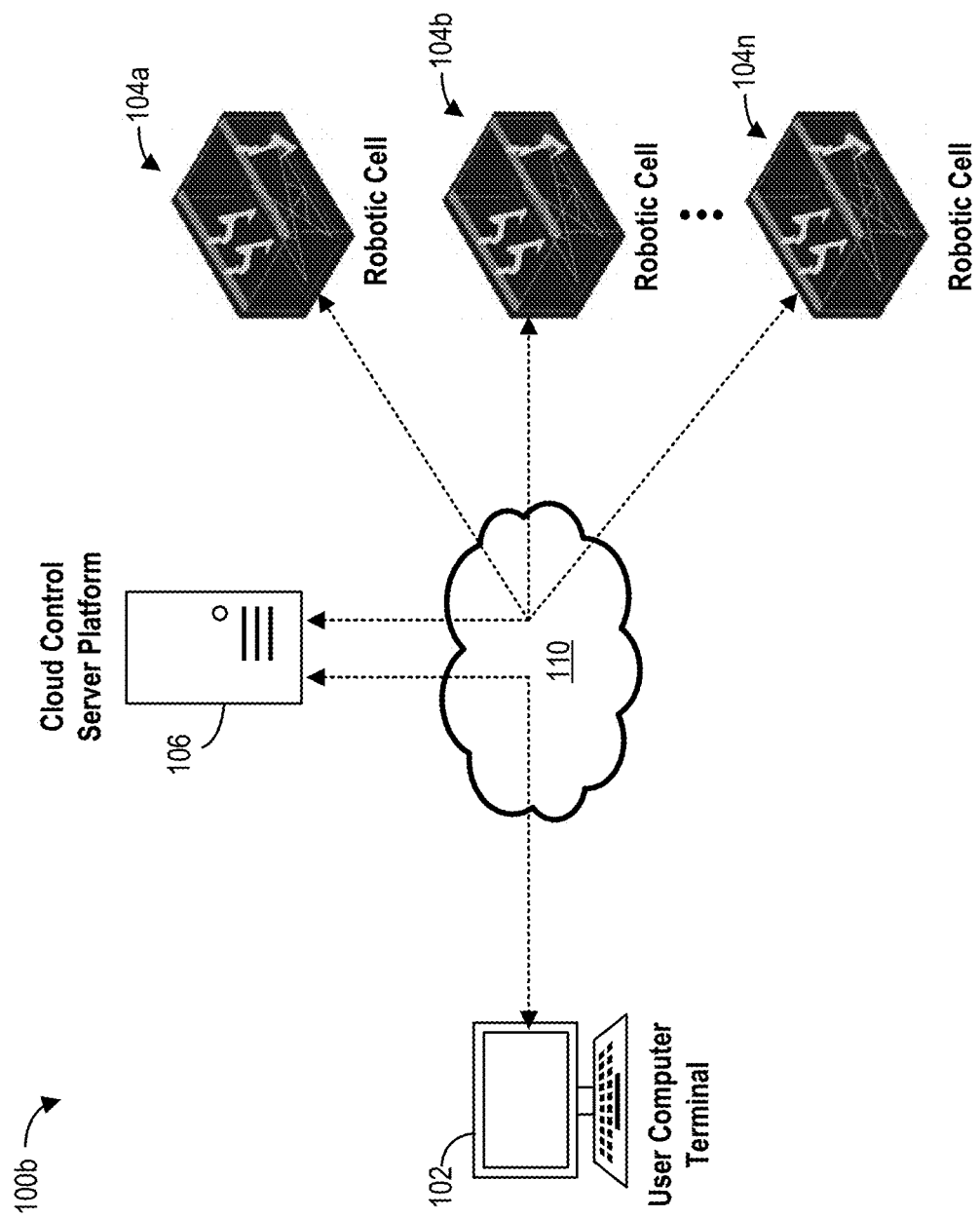
FIG. 1B is another example system for automated assembly of building structures.

Reference is now made to FIG. 1B, which shows another example system 100*b* for automated assembly of building structures.

System 100*b* is generally analogous to system 100*a*, with the exception that system 100*b* includes any number of robotic assembly cells 104*a*-104*n*. The robotic cells 104 may be located in different geographic locations, or in the same geographic location. In some examples, the robotic cells 104 may be associated with different users, or the same user.

As shown, the one or more robotic cells 104 may be serviced by the same cloud software platform 106. That is, the cloud platform 106 may independently monitor and generate control instructions for each robotic cell 104. Accordingly, the cloud platform 106 may be scalable to accommodate, for example, any number of disparate construction projects by any number of robotic cells 104. In turn, this avoids replicating the back-end software platform for each individual robotic cell 104, and for each individual construction project. Still further, where cloud server 106 hosts machine learning models, the machine learning models can be trained on aggregate data generated by the plurality of robotic cells 104, e.g., using big data analytics. Accordingly, assembly operations in each individual robotic cell 104 may benefit from the broader wisdom learned from all separately located robotic cells 104.

In some examples, the robotic cells 104 may be modular and can be combined in a scalable manner to form assembly "factories". For example, as shown in FIGS. 2B and 2C, the modular cells 104*a*-104*d* can be deployed in close proximity (e.g., the same general location) to form a micro-factory 200*b* (FIG. 2B), or otherwise to form a complete factory 200*c* (104*a*-104*f* in FIG. 2C). In this example, different robotic cells 104 can assemble different building structures, or perform different assembly tasks on the same structure. This may provide a unique advantage when undertaking large or complex construction projects.

In example cases where multiple robotic cells 104 are aggregated to form a "factory"—cloud software platform 106 may not only manage each independent robotic cell 104, but may also provide more "global" management as between multiple robotic cells 104. For example, cloud server 106 may coordinate assignment of different tasks to different robotic cell 104, and configure and/or re-configure robotic cells 104 to undertake different functions as needed. Cloud server 106 may also, more generally, coordinate between robotic cells 104 to ensure cohesive and synchronized assembly processes. In other examples, one or more local computing systems can provide aggregate, or individual monitoring and control of individual robotic cells 104.

In at least one embodiment, cell "factories" may include transportation, or conveyance systems for transporting parts and components between cells. For example, automated guided vehicles (AGVs) can transport raw material, pre-cut material as well as partially or fully assembled building structures between robotic cells. In these cases, the cloud software platform 106 may also manage and coordinate an inter-cell transport or conveyance system.

Figure 1C:
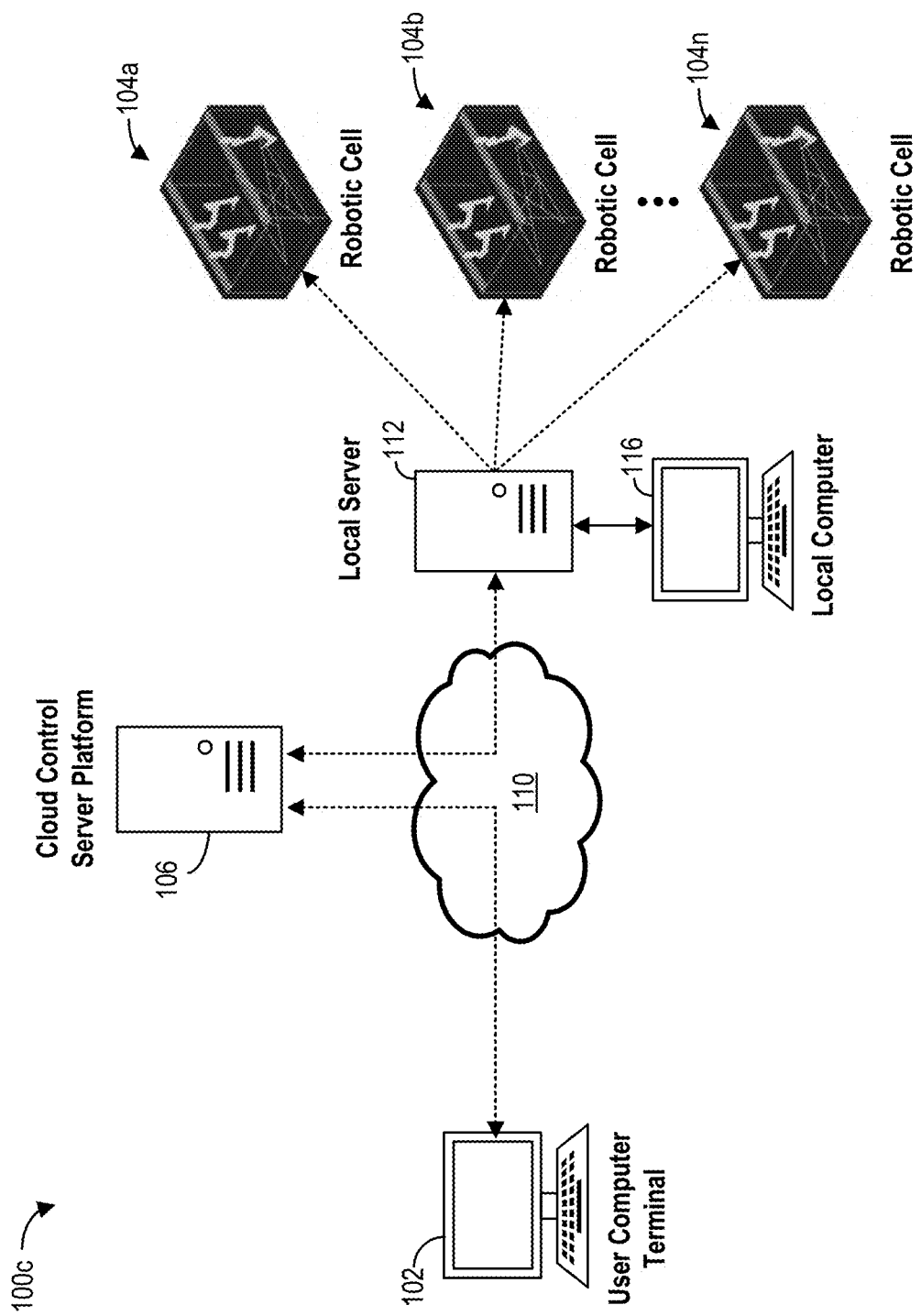
FIG. 1C is still another example system for automated assembly of building structures.

Reference is now made to FIG. 1C, which shows another example system 100c for automated assembly of building structures.

System 100c is generally analogous to system 100b, with the addition of a local server 112. Local server 112 may locally control and manage a number of robotic assembly cells 104a-104n (e.g., via a local network), which together form a robotic cell factory. In some examples, the local server can be a local "cloud" server. Local server 112 can therefore act as the intermediary between the robotic cells 104 and the cloud platform 106. Local server 112 can also perform all, or some of the functions of the cloud server 106.

In some examples, the local server 112 may also communicate with a local computer terminal 116. For example, this may allow for a local operator to interact directly with the robotic cells 104.

In other cases, only the local server 112 is provided, without the cloud platform 106. In these examples, user computer terminal 102 can communicate directly with the local server 112 and/or computer terminal 116.

II. Example Methods for Automated Assembly of Building Structures

Figure 3A:
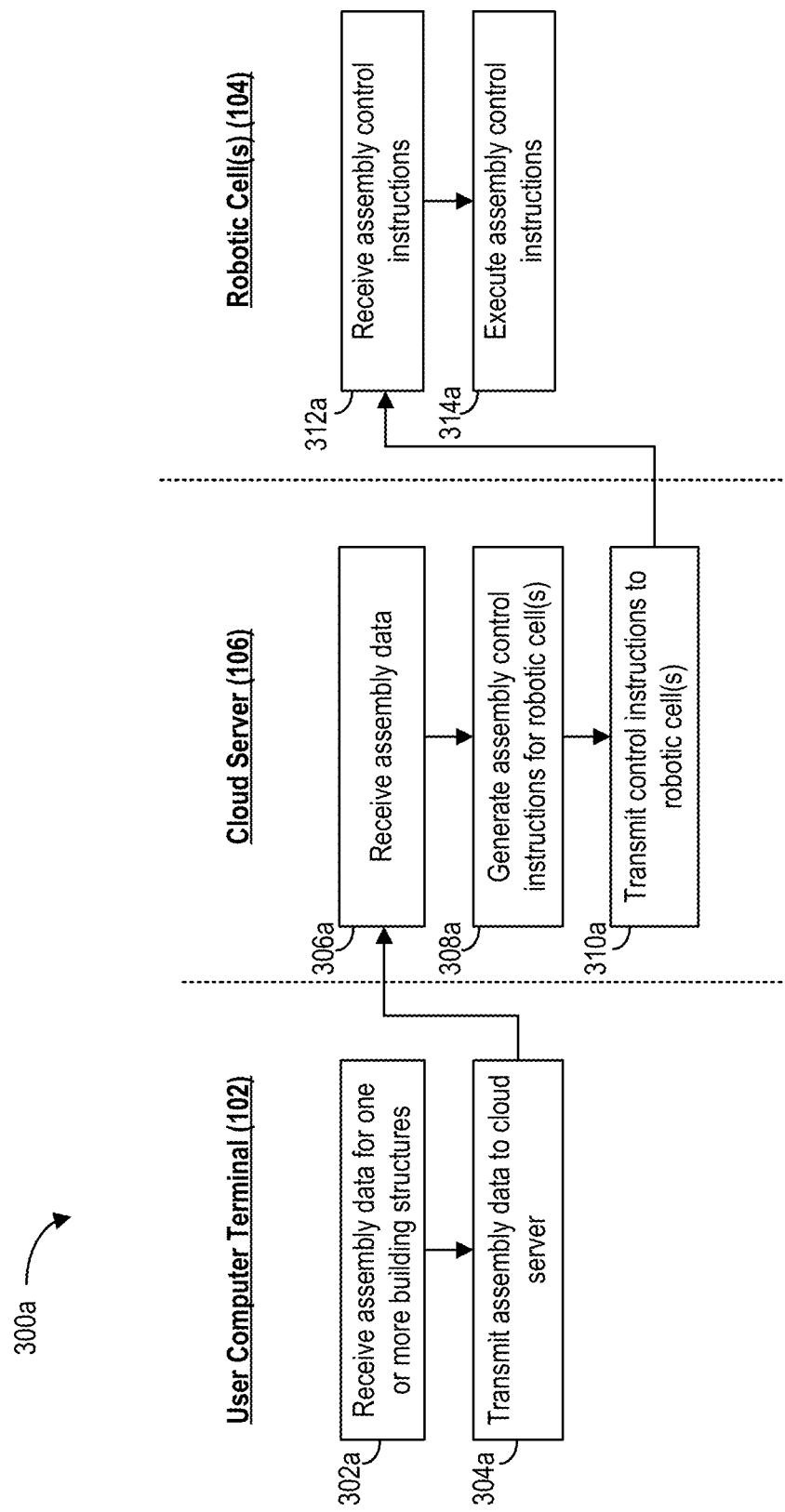
FIG. 3A is a process flow for an example method for automated assembly of building structures.

Reference is now made to FIG. 3A, which illustrates a process flow for an example method 300a for automated assembly of building structures.

As shown, at 302a, user computer terminal 102 may receive assembly data associated with one or more building structures (or portions of building structures) requiring assembly. For example, the building structures can include wall panels, roof/ceiling structures, floor panels, etc.

The assembly data can identify an assembled design for the building structure. In more detail, assembly data for a building structure can identify, for instance: (i) different building parts required for assembling the building structure (e.g., studs, panels, etc.); (ii) dimensions of each building part; (iii) positional configuration of each building part relative to other building parts in an assembled state (e.g., adjacent or coupled building parts), and/or (iii) a fastening configuration for building parts in the assembled state (e.g., quantity, location and type of nailing or stapling for fastening parts together). In some examples, the assembly data may comprise a CAD® model file of the building structure which requires assembly.

Figure 4A:
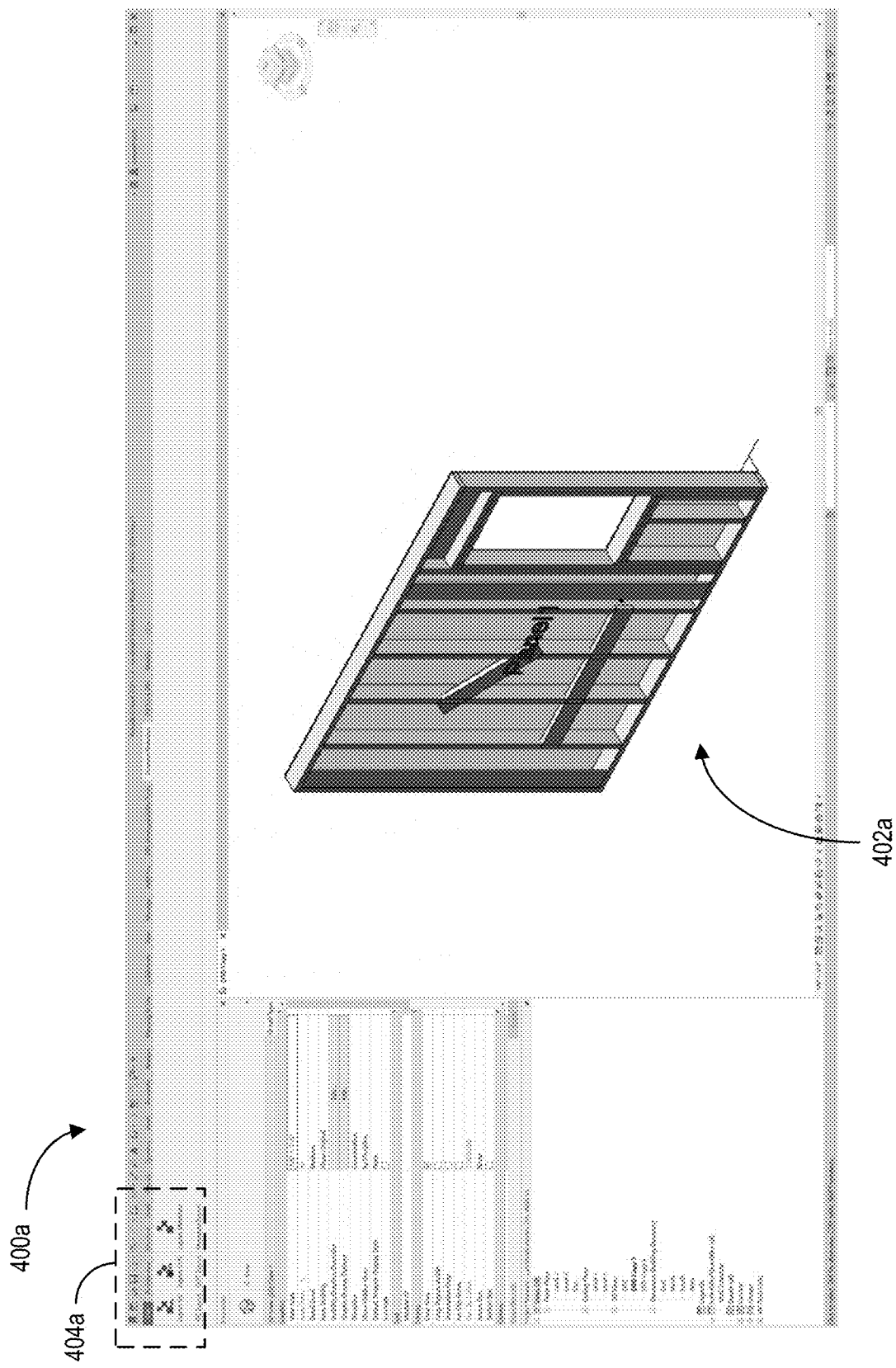
FIG. 4A is an example graphical user interface (GUI) that may be displayed on a user computer terminal.

FIG. 4A shows a graphical user interface (GUI) 400a of example assembly data that may be received at act 302a. GUI 400a may be displayed, for example, on the computer terminal 102. In this example, the assembly data relates to a wall panel design. The wall panel design may be generated on computer terminal 102, or otherwise pre-generated on another computing device and subsequently uploaded and/or received by computer terminal 102.

In at least some example cases, at act 302a, the user terminal 102 may receive assembly data for more than one building structure. For example, assembly data can relate to multiple building structures associated with an entire, or a portion, of a building infrastructure (e.g., a single-family home).

Referring back to FIG. 3A, at 304a, the assembly data is transmitted to the server 106. For instance, as shown in FIG. 4A, interface 400a may include a software plug-in or extension 404a which users select to upload (e.g., transmit) the structural model to the cloud server platform 106.

At 306a, the server 106 receives the assembly data.

At 308a, the server 106 parses and analyzes the assembly data, and based on the parsing and analyzing, generates assembly instructions for controlling the robotic cell 104 to assemble the building structure, or any portion thereof. In at least some examples, assembly instructions, generated by server 106, can comprise a robotic script for controlling assembly robots 204 inside the robotic cell 104.

At 310a, the control instructions are transmitted from the server 106 to one or more robotic cell(s) 104. At 312a, each robotic cell 104 can receive corresponding assembly control instructions, and at act 314a, may execute the control instructions to assemble the corresponding building structure (or a portion thereof).

In some examples, method 300a may not require assembly data to be transmitted from the user computer terminal 102 to the server 106. For example, cloud server 106 may already pre-store assembly data for various building structures. The cloud server 106 may then access, and transmit the pre-stored assembly data directly to the one or more robotic cells 104.

In other examples, method 300a can be performed using a local computing system or processor which is associated with the robotic cells. For example, a local computing system may receive (or pre-store) assembly data, which may be used to directly control the robotic cell 104.

During robotic cell activity (e.g., during act 314a), the robotic cell 104 may transmit progress data, back to the server 106. Progress data can include various data about the progress of the robotic cell in completing the required assembly control instructions. For example, progress data can include the current stage of assembly for the robotic cell 104. The progress data can also include historical execution data, such as the time taken to complete previous assembly stages. In some examples, the execution data is used for estimating the assembly cycle time, e.g., offline estimation. All information can be recorded locally and sent to the cloud after the assembly is finished. However, in real-time the overall status of the cell (e.g., standby, fault, paused, assembly in progress) can be sent directly to the cloud server 106. In some examples, the progress data is monitored by a processor of the robotic cell 104, and transmitted to the server 106 via a communication interface.

Figure 3B:
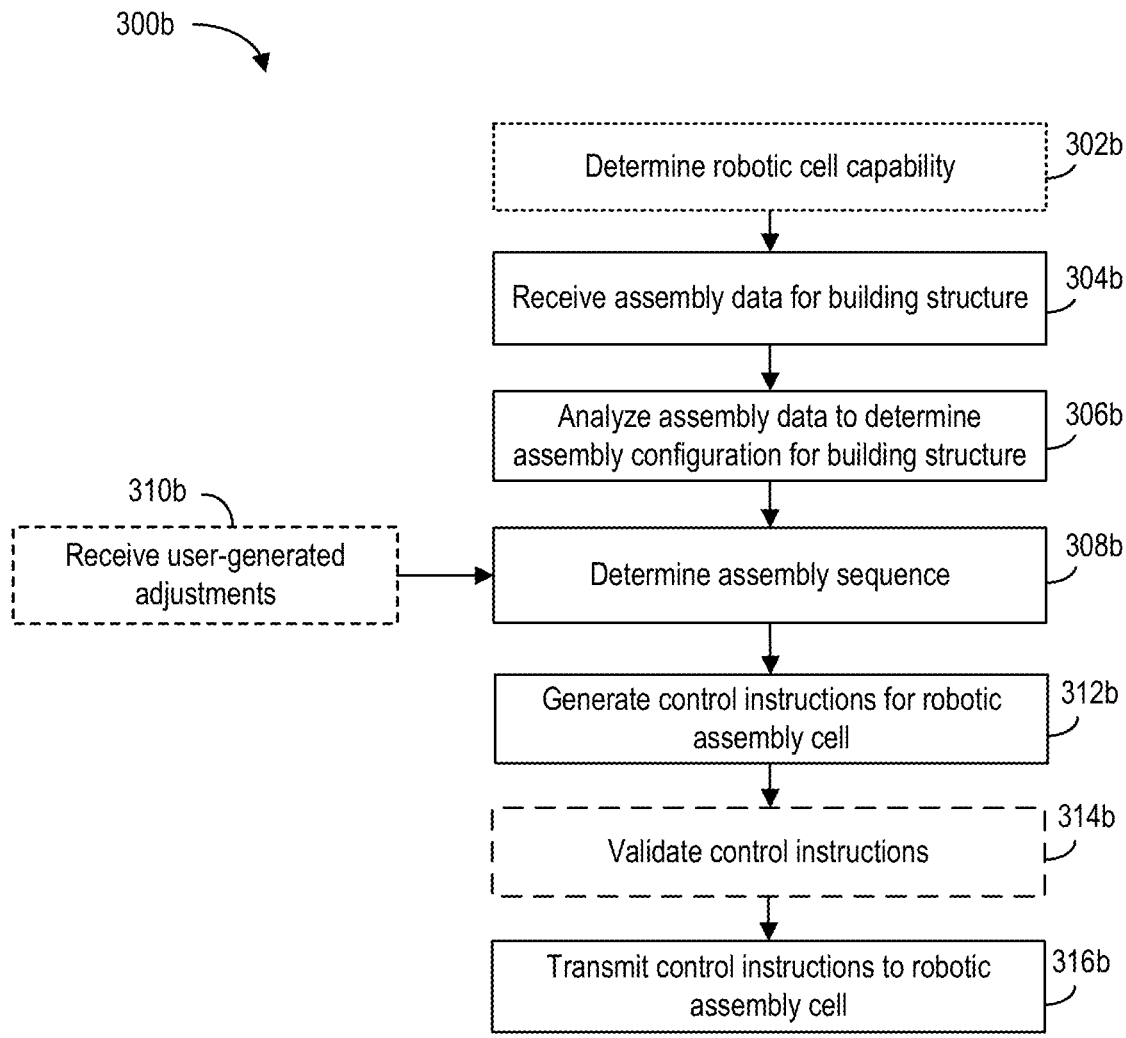
FIG. 3B is a process flow for an example method for generating control instructions by one or more servers.

Reference is now made to FIG. 3B, which illustrates a process flow for an example method 300b for generating assembly control instructions for a single robotic assembly cell 104.

Method 300b can be performed by server 106, and expands on acts 306a-310a of method 300a in FIG. 3A. In some cases, method 300b can also be performed by any computing system in communication with the robotic cell 104.

As shown, at 302b, server 106 may initially determine, or assess, the capability of the robotic cell 104 conducting the assembly (also referred to herein as determining "robot cell capability data"). This data can assist server 106 to determine the type of assembly tasks the robotic cell is able to perform, and in turn, the control instructions server 106 is able to generate for that robotic cell.

More particularly, robotic cell capability data may refer to the aggregate, or any portion, of the hardware and/or software capabilities of the robotic cell 104. By way of non-limiting examples, this data can include: (i) the number of assembly robots in the robotic cell, (ii) the positional location of each assembly robots within the cell (e.g., left or right of the building platform 210), (iii) the tooling abilities of each assembly robot, (iv) the work area size within each robotic cell (including the size of the building platform 210), (v) assembly robot hardware limitations, and/or (vi) information about other devices or systems located within the robotic cell (e.g., a pre-cut station).

Various techniques can enable acquiring robotic cell capability data. For instance, the robot cell capability data may be pre-defined ahead of time, or pre-configured (e.g., pre-loaded) into the server 106 (e.g., by a user operator). In other example cases, the server 106 may acquire the robot cell capability data from the robotic cell 104. For example, after a robotic cell 104 is connected to (e.g., plugged-into) network 110, the robotic cell 104 may communicate it's capabilities to the server 106. This may occur, for example, either automatically or in response to a query from the server 106. Each cell's capability information can be stored in that cell's memory and transmitted to the server 106.

At 304b, server 106 can receive assembly data for a building structure requiring assembly (e.g., a building model file). The assembly data can be retrieved from memory, or otherwise received from the computer terminal 102 (e.g., act 306a in FIG. 3A) or still otherwise received from any other computing system.

At 306b, the assembly data may be analyzed to determine an assembly configuration for the building structure. The assembly configuration can correspond to any information relating to how the building structure is configured in the assembled state. Determining the assembly configuration can include determining: (i) a listing of different building parts required for assembling the building structure (e.g., studs, panels, etc.), (ii) the dimensions of each building part, (iii) the positional configuration of each building part relative to other building parts in the assembled state (e.g., adjacent or coupled building parts). As provided herein, determining the positional configuration can include determining contact data between building parts. Determining contact data can include determining a contact axis between two or more adjacent building parts, as well as a contact surface area between the adjacent building parts; and/or (iv) the fastening configuration for the building parts in the assembled state (e.g., quantity, location, orientation and type of nailing or stapling for fastening parts together).

At 308b, based on the analysis at act 306b, the server 106 can determine an assembly sequence for assembling building parts into the desired building structure. The assembly sequence identifies the order in which building parts are assembled together to construct the building structure.

In at least one example, the assembly sequence can include one or more assembly tasks (e.g., a plurality of action tasks). Each assembly task can indicate: (i) the type of assembly task requiring performance, (ii) information about that assembly task, (iii) a time, or time range, for performing the assembly task, and/or (iv) a system in the robotic cell 104 designated to perform that assembly task (e.g., assembly robots, a cutting station, etc). Assembly tasks may be performed concurrently, partially concurrently or non-concurrently (e.g., consecutively).

In some examples, the assembly tasks can be one of several types, including: (i) mounting tasks, and (ii) fastening tasks. Both mounting and fastening tasks may be performed by assembly robots 204 inside the robotic cell 104. In other examples, the assembly tasks can also include fitting tasks (e.g., fitting a window or stud in a particular assembly).

A mounting task is a task that involves mounting (e.g., placing) a building part onto the assembly platform 210 (FIG. 2A). A mounting task can involve an assembly robot 204: (a) picking-up (e.g., grasping) the building part from an inventory stack, (b) translating the building part to a relevant position over the assembly platform 210, and (c) dropping-off (e.g., mounting or placing) the building part onto the assembly platform in the correct orientation.

By way of further example, each mounting task can identify, for instance: (i) the building part requiring mounting, (ii) the mounting configuration of that building part (e.g., placement angle, orientation and/or position) on the assembly platform 210. The mounting configuration may be determined based on the assembly configuration determined at act 306b, (iii) an assembly robot designated to perform the mounting task, (iv) in some cases, a type of grasping tool to be equipped by the assembly robot 204 to enable picking-up and mounting the building part, as well as an indication of a grasping configuration for the assembly robot 204 (e.g., a grasp pose and grasp location relative to the building part). In some example cases, the grasp tool and grasp configuration may be selected based on the type of building part, and the desired mounting configuration.

A mounting sequence can refer to an aggregate of one or more mounting tasks. Accordingly, a mounting sequence may define a type of assembly sequence. For example, when assembling a wall panel comprising a top, left, right and bottom beam—the mounting sequence can indicate initially mounting the bottom beam, and subsequently, mounting the left and right beams, followed by the top beam.

As provided herein, the mounting sequence can be generated with a view to identified blocking constraints. For example, it may be determined that mounting a first building part may block (or prevent) other building parts from being subsequently mounted. Accordingly, the mounting sequence may be generated to prevent blocking incidences.

In contrast to a mounting task, a fastening task may involve applying one or more fasteners (e.g., nails or staples) to fasten two or more building parts together. A fastening task can involve controlling an assembly robot 204 to apply one or more fasteners to target building parts.

In some examples, each fastening task can identify: (i) the building parts requiring fastening, (ii) the fastening configuration, (iii) an assembly robot designated to perform the fastening task, (iii) whether the building structure requires lifting to enable access to an underside for applying one or more fasteners, and/or (iv) in some cases, a type of fastening tool to be equipped by the assembly robot, as well as a fastening tool configuration (e.g., orientation and/or other settings of the tool).

The fastening configuration (ii) can include: (a) locations where the fasteners are applied to the building parts, (b) the direction or axis in which the fasteners are inserted into the building parts, and (c) the type of fasteners to be applied (e.g., nails or staples).

A fastening sequence can refer to an aggregate of one or more fastening tasks. A fastening sequence may therefore also define a type of assembly sequence. For example, the fastening sequence may indicate that parts "A" and "B" should be fastened together prior to fastening part "C" to parts "A" and "B".

In some example, the fastening sequence is also generated with a view to avoiding specific blocking constraints. For example, it can be determined that a tool cannot reach a target point, or otherwise collides with other mounted elements when attempting to reach a target point. In other cases, parts may not be stable for assembly, and must be initially fastened to other parts or be held by a clamp. Accordingly, the fastening sequence can be generated to circumvent these blocking constraints.

In at least some cases, the fastening sequence may mirror the mounting sequence. For example, mounted parts may be immediately fastened together. The fastening sequence may also, however, diverge from the mounting sequence.

In some example cases, different assembly robots 204 can be designated to perform different mounting or fastening tasks with a view to optimizing various factors, including optimizing assembly efficiency and assembly time. Optimizing assembly efficiency can also relate to achieving enhanced accuracy and/or repeatability. Assembly tasks can also be designated to different assembly robots with a view to preventing collisions between assembly robots operating concurrently.

In addition or in the alternative to mounting and fastening tasks, other types of assembly tasks determined at act 308*b* in method 300*b* include, for example: (i) pre-cut raw material to desired dimensions, (ii) transporting raw material to a robotic cell, (iii) rotating or re-orienting an assembled, or partially assembled, building structures on the assembly platform 210 to enable further assembly, (iv) translating an assembled, or partially assembled building structure, to a different robotic cell, etc. These tasks can be performed by assembly robots 204, or any other robotic cell system (e.g., automated guided vehicles, etc.)

Figure 4B:
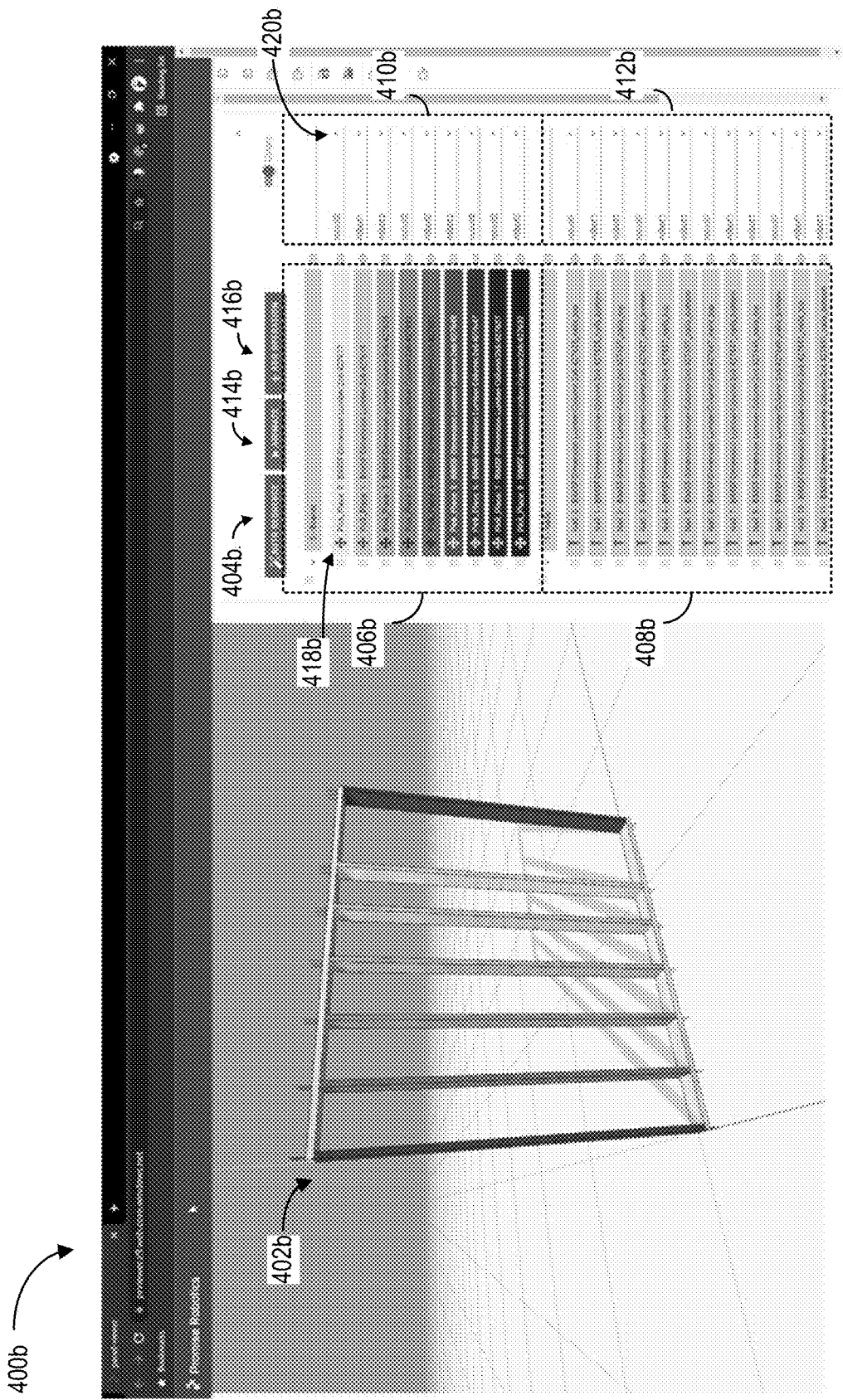
FIG. 4B is an example GUI that may be displayed on a user computer terminal.

FIG. 4B shows an example GUI 400*b* that may be displayed at the computer terminal 102. In particular, GUI 400*b* may display the assembly sequence determined at act 308*b*. For instance, once the server 106 has generated the assembly sequence, it may transmit assembly sequence data to the computer terminal 102, which may be displayed in the form of GUI 400*b*. GUI 400*b* may allow the user to review and modify the assembly sequence, as needed.

In the illustrated example, GUI 400*b* shows an assembly sequence generated for an example wall panel 402*b*. As shown, users may select the auto sequence feature 404*b* to enable the server 106 to perform act 308*b*.

Interface 400*b* also shows the mounting sequence 406*b*, which includes picking-up and placing different building parts on the assembly platform. The fastening sequence 408*b* is also exemplified for each identified building part. Additionally, interface 400*b* designates assembly robots 204 (e.g., robot 1 and robot 2) at 410*b* and 412*b* for each mounting and fastening task, respectively.

As further shown, GUI 400*b* may also include an animate option 416*b*. This option may enable users to observe a visualized simulation of the assembly sequence. This may facilitate review of the assembly sequence by the user.

In at least some examples, the interface 400*b* may also enable user modifications. For example, a drag-and-move option 418*b* allows users to re-order the mounting and/or fastening sequences. As well, a drop-down option 420*b* may allow changing the assembly robot 204 performing an assembly task. The user adjustments can therefore define desired user preferences and/or user-defined assembly constraints.

Figure 4C:
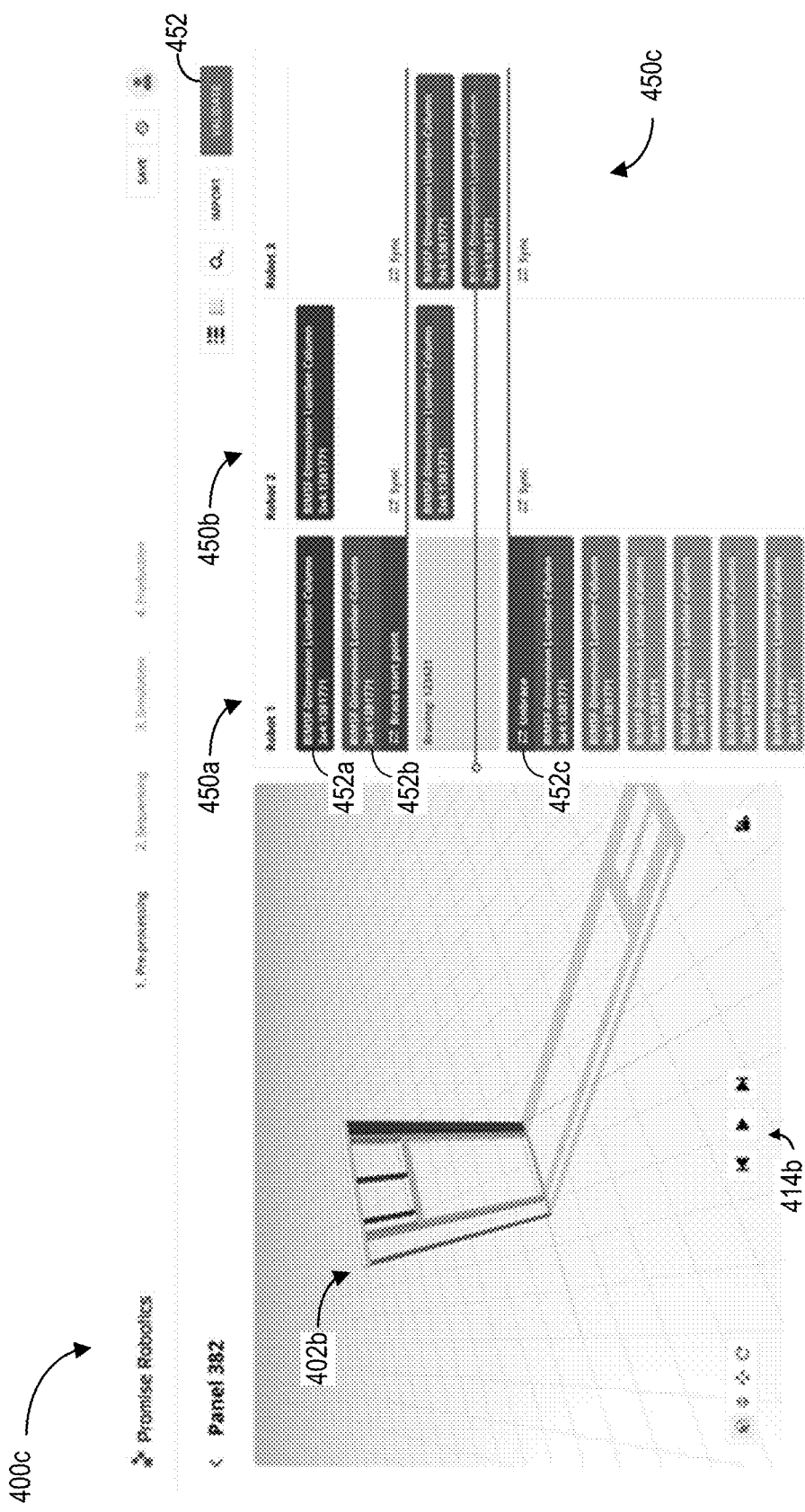
FIG. 4C is another example GUI that may be displayed on a user computer terminal.

FIG. 4C shows another example GUI 400*c* that may be displayed at the computer terminal 102. The GUI 400*c* is generally analogous to the GUI 400*b*, but displays the various functions using a modified visual layout arrangement. As shown, the GUI 400*c* displays the assembly sequence for each robot 450*a*-450*c* in the cell. The user may validate 452 the assembly sequence, as well as animate 414*b* the sequence.

More broadly, the GUI 400*c* displays the coordination between robots and how they synchronize their actions. The GUI 400*c* allows the user to manipulate both action sequences as well as how the robots synchronize through commands such as sync and signal and wait. For example, this shown by the bracing action being performed by one robot while other robots are completing tasks.

Referring back to FIG. 3B, at 310*b*, the server 106 can receive one or more user-generated adjustments to the assembly sequence (e.g., via interface 400*b* in FIG. 4B). In response, a modified assembly sequence can be generated. In some examples, the user can be presented with different variations of the assembly sequence, and may be able to select an optimal or preferred sequence.

In some example cases, the assembly sequence generated at 308*b* may be generated by trained machine learning models. The models may be trained to learn optimized assembly sequences for different building structures. The models may also be trained to learn from previously applied user control preferences.

At 312*b*, server 106 may generate assembly control instructions for a robotic assembly cell 104. The assembly instructions may enable the robotic cell 104 to execute the assembly sequence generated at act 308*b*.

For example, act 312*b* can involve generating robotic-specific control data for one or more assembly robots 204 in the robotic cell 104. The robot-specific control data can enable control of a corresponding assembly robot 204 to execute designated assembly tasks. For example, the control instructions may control an assembly robot 204 to pick-up, mount and fasten correct building parts, as required. Control instructions may also prepare the assembly robot 204 to execute an assembly task. For example, this can include instructions for an assembly robot 204 to engage, or swap an assembly tool for another assembly tool that is more suited for performing a required assembly task (e.g., as indicated in the assembly task instructions).

In various embodiments disclosed herein, the control instructions may be generated based on a robotic cell configuration of the robotic cell 104. Server 106 may receive the robotic cell configuration in the robot cell capability data received at act 302*b*. In some examples, server 106 may store the robotic cell configuration in a database.

The robotic cell configuration may include the number of robots in robotic cell 104, the number and description of different zones of robotic cell 104 and the different tools available to the robots. This is illustrated by way of an example, where the robotic cell configuration includes two robots (Robot 1 and Robot 2) and the robotic cell 104 is divided into five zone types (such as, for example, Plate Zone, Stud Zone, OSB Zone, Precut Table Zone and Table Bracket Zone). The example robotic cell configuration also includes the different tool types and the availability of the zones and tools to the two robots.

Zone types:
    Plate Zone, holds one type of plate parts
    Stud Zone, holds one type of stud parts
    OSB Zone, holds one type of OSB parts
    Precut Table Zone, holds various precut parts
    Table Bracket Zone, holds one type of stud parts that are different to the common studs used in this panel (used for wall backings)

Robot 1 Assignment:
    Stud Zone 1
    OSB Zone

Robot 2 Assignment:
    Plate Zone
    Stud Zone 2
    Precut Table
    Table Bracket Zone Tool types:
   Suction gripper-nailer
      1 assigned to Robot 1
      1 assigned to Robot 2
   Compression gripper-nailer
      1 assigned to Robot 2
   Stapler-nailer
      1 available to both Robots with a tool switch
   OSB gripper
      1 assigned to Robot 1

For the above example robotic cell configuration, the generated control instructions may designate Robot 1 for tasks related to OSBs because the OSB Zone and the OSB gripper are assigned to Robot 1. In other examples, the robotic cell may include different number of robots, different number/type of zones and different number/type of tools.

In some examples, robot control instructions can comprise a time-based motion path and action plan for an assembly robot 204 to execute designated assembly tasks. In cases where multiple assembly robots 204 are operating in the same assembly cell 104, the time-based motion and action plan can be generated with a view to avoiding collisions between concurrently operating robots. A robot script may then be generated which reflects the motion path and action plan. The time-based motion and action plan can also, more generally, ensure synchroneity between robots in the same cell. For example, this can include ensuring one robot pauses while the other robot completes a task. This involves coordinating between each robot's location at different time instances based in-part on the task being performed by each robot at these time instances.

Control instructions may also be generated at act 312b for other system components located inside the robotic cell, including automated cutting stations, etc. As noted previously, the server 106 can determine available systems based on the robot cell capability data received at act 302b. In some examples, precut parts may be placed on the pre-cut table of the robotic cell in the order of the precut part placement actions in the generated control instructions. The pickup points of the precut parts may be determined and a 3D model of the precut parts arrangement may be generated. Synchronization checkpoints for the robots of the robotic cell may be added based on the constraints and the generated control instructions.

At 314b, in some examples, the control instructions are validated. For instance, a simulation may be completed to confirm that the robot control instructions do not result in multiple robotics, in the same cell, colliding with each other (or other objects). The 3D model of the precut parts arrangement may be used in generating the simulation. In some examples, the simulation can be presented on the user computer terminal 102 for final validation.

At 316b, the control instructions are transmitted to the robotic assembly cell 104 for execution. In some cases, prior to transmitting the control instructions, a user may observe a simulation of the control script and/or provide adjustments or modifications to the control sequence, e.g., via computer terminal 102. A modified control script may then be generated, which is transmitted to the robotic cell 104.

In some examples, each control instruction may be converted into one or more robot commands depending on the type of control instruction. For example, simple control instructions may be converted into a single robot command while complex control instructions may be converted into multiple robot commands. The robot commands may be executable by a robot, for example, assembly robots 204 shown in FIG. 2A.

The robot command may include one or more parameter values depending on the type of robot command. For an example robot command for placing a part, the parameter values may include an approach angle and a placement location. The robot commands may be encoded using any suitable language that is usable by the robots. For example, the robot commands may be encoded using KUKA Robot Language (KRL) or extensible Markup Language (XML).

In some examples, the assembly sequence determined at act 308b may be generated in view of one or more optimization factors. The optimization factors can include, by way of example, optimizing for: (i) assembly time, (ii) assembly cost, (iii) balanced assembly robot utilization, (iv) building structure stability, (v) accuracy and repeatability of assembly, and/or (vi) reducing assembly robot load stress. Optimization factors may be pre-set ahead of time, or may be received as user control preferences any time prior to, or during, act 308b, e.g., via computer terminal 102.

Figure 3C:
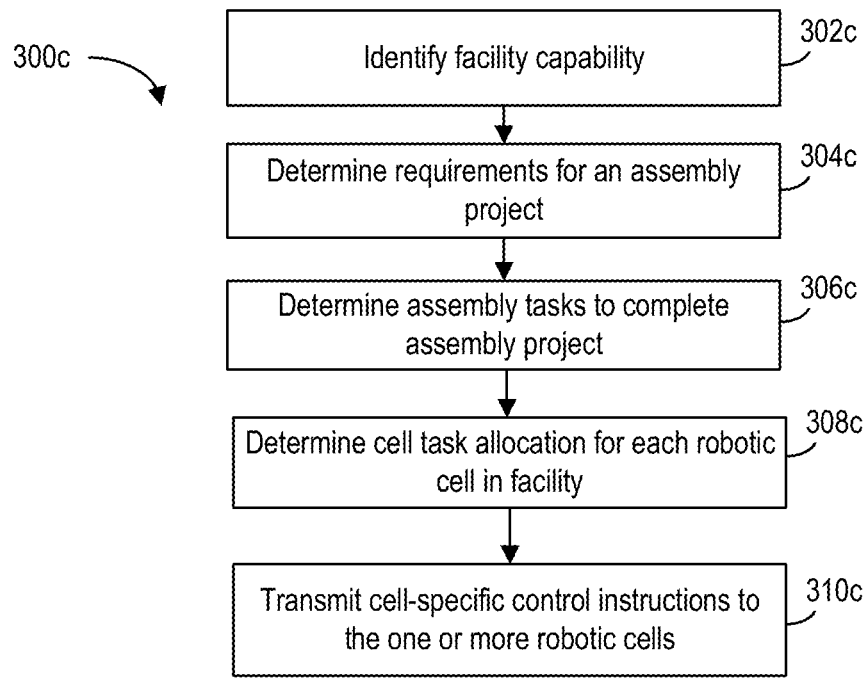
FIG. 3C is a process flow for another example method for generating control instructions by one or more servers.

Reference is now made to FIG. 3C, which illustrates a process flow for an example method 300c for generating control instructions for multiple robotic assembly cells 104, e.g., arranged in a facility (FIGS. 2B and 2C). Method 300c can be performed by the server 106, or otherwise, any other computing system connected to the robotic cells.

At 302c, server 106 can identify the facility capability by accessing facility capability data. Facility capability data can include, for example, the number of robotic assembly cells 104 in the facility, as well robot cell capability data corresponding to one or more of the robotic cells 104.

Facility capability data can also include progress data, in relation to each robotic assembly cell 104. Progress data can be used, not only determine if a robotic cell is currently active/available (e.g., free) to take on new assembly tasks, but also to determine the robotic cell's current activity schedule. For example, if the robotic cell is currently busy, the progress data may indicate that the robotic cell will be free at a subsequent, or near point in time. For instance, the progress data can indicate that a robotic cell may be close to completing its current assembly tasks.

The facility capability data may be determined in various manners. For instance, robotic cells 104 may each individually communicate their robotic cell capability data and/or progress data to the server 106, e.g., through an initial handshake protocol. The server 106 may then aggregate all robot cell data to determine the facility capability. In other cases, one or more of the robotic cells may operate to aggregate capability data for multiple connected robotic cells 104, and may relay the aggregated data to the server 106 (or this can be done by the local server 112 in FIG. 1C).

At 304c, the server 106 can determine assembly project requirements for an assembly project that requires completion. An assembly project can involve assembling one or more building structures. The assembly project requirements can define constraints for assembling these building structures. The project requirements can be indicated, for example, by a user of user terminal 102—or otherwise, can be pre-configured into the server 106.

In at least one example, the assembly project can involve assembling multiple building structures (e.g., roofs, window panels, etc.). Further, some building structures may require assembly before, after or concurrently with other building structures. In this example, the assembly project requirements, or constraints, correspond to a required building structure assembly order.

In other examples, the assembly project requirements can indicate that some building structures require assembly with a higher level of priority, or urgency than other building structures. Accordingly, this can also factor into the building structure assembly order.

At 306c, the server 106 can determine a sequence of assembly tasks for completing the assembly project. This act can be analogous to performing acts 306b-308b for each building structure requiring assembly, in the assembly project. The sequence of assembly tasks can also be determined based on the assembly project constraints.

At 308c, based on act 302c, the server 106 can determine cell assembly task allocation for one or more selected robotic assembly cells 104 in the facility. The cell task allocation involves designating specific assembly tasks to specific, selected robotic cell 104.

In one example, cell task allocation at act 308c, involves designated, to different robotic assembly cell 104, all assembly tasks corresponding to the same building structure. Accordingly, if the assembly project includes more than one building structure, each robotic cell is assigned to build a different building structure.

In another example, multiple robotic cells can be assigned to assemble the same building structure. For example, the assembly can be daisy chained such that a first robotic cell 104 can assemble a first portion of the structure, thereafter the partially-constructed structure is conveyed to a second robotic cell 104 to continue assembly, and so on until the assembly is complete. In this case, assembly tasks relating to the same structure are distributed between multiple robotic cells. An assembly schedule can also be generated which outlines when each robotic cell 104 should complete its portion of assembly tasks.

At act 308c, tasks can be allocated to different robotic cells in different manners. For instance, in one example, cell task allocation is based on robotic cell capability data (e.g., as determined at 302c).

For example, specific assembly tasks can be assigned to robotic cells having the capability to perform these assembly tasks. By way of example, an assembly task may require specific tools for mounting and fastening building parts. Accordingly, the system can identify robotic cells having appropriate tools for completing the required mounting and fastening tasks, and can assign these assembly tasks to those selected robotic cells. In other examples, an assembly task may require certain space availability with the cell (e.g., specific size of assembly platform table 210), or a minimum number of available robots 204, etc.

If a robotic cell 104 is capable of handling all assembly tasks related to a single building structure, this robotic cell 104 can be selected to assemble that building structure. Otherwise, if no single robotic cell 104 is able to assemble the building structure alone, or otherwise, it is not optimal for a single cell to assemble the building structure alone, assembly tasks are distributed between multiple robotic cells. Accordingly, multiple robotic cells can cooperate to assemble the building structure.

Cell task allocation can also be determined based on progress data of robotic cells. For example, robotic cells which are currently available to take on new tasks may be assigned new assembly tasks. In complex scheduling schemes, a cell may not be immediately available to take on new tasks. However, progress data can indicate that the cell will be available at a future point in time. Accordingly, the cell is designated assembly tasks scheduled to occur at that future point in time. For example, this can occur if multiple cells operate on the same building structure at different scheduled times.

In at least one example, a robotic cell may be currently busy with an alternative task, as indicated by its progress data. However, the system can still designate assembly tasks to that cell. That is, the system can override existing tasks with new tasks. For example, the existing tasks can be lower priority, and/or are already performed by other redundant cells in the facility.

Accordingly, cell task allocation and robot cell selection at act 308c can occur with a view to one or more optimization criteria, including which robot cells are best suited to handle which assembly tasks based on robot cell capability data, as well which robot cells are available to receive assembly tasks based on the cell progress data. In other cases, optimization criteria can also include optimizing for assembly time and cost.

At 310c, the server 106 may transmit cell-specific control instruction to one or more robotic cells. The cell-specific control instructions may include, for example, control instructions for each assembly robot in that cell. The control instructions may command the cell to execute assembly tasks assigned to that cell. These instructions can be generated in a manner analogous to acts 308b-316b, for different building structures.

As stated above, in some examples, a single building structure is assembled by multiple robotic cells associated with a facility. For example, a building structure is passed between multiple cells in-turn. In this case, each cell performs a different part of the assembly. To facilitate this process, it can help to track the building structure as it travels between different cells. This allows each cell to determine when the building structure has arrived. When the building structure arrives at the cell, the cell can execute the control instructions received at 310c in association with that structure.

In at least one example, a robotic cell 104 can be equipped with sensors (e.g., image sensors as part of its perception system), which enable the cell to monitor when the building structure has arrived. When it arrives, the cell can identify the building structure, and execute its portion of the assembly control instructions, and then pass on the building structure to the next robotic cell. In other cases, the robotic cell is informed of when the building structure is expected to arrive by the server 106, and can monitor for its arrival at the schedule times (e.g., using the perception system).

In some examples, each building structure includes a tracking indicia (e.g., QR code). When a building structure arrives at a cell, the cell's sensors can scan the indicia to identify the structure, and identify the relevant assembly tasks required to be performed on the structure. For example, the robotic cell can cross-reference the scanned indicia to received control instructions. Alternatively, the robotic cell can request the control instructions from the server 106 based on the indicia data. The scanning sensor can be equipped, for example, on the assembly robot 204.

In still another example, once a robotic cell has completed its portion of the assembly tasks, it may validate this with the system (e.g., a local or cloud server). This may allow the system to alert the next robotic cell that its turn is next to assemble the building structure. Accordingly, the next robotic cell can ready itself for the arrival of the building structure. In other cases, the alert can be transmitted to a manual assembly station.

Robotic cells can also, more generally, communicate with the transfer or conveyance mechanism, which transfers building structures between robotic cells. For instance, the transfer mechanism may alert a robotic cell that a specific building structure has now been delivered (e.g., via local network communication).

Accordingly, any combination or sub-combination of the above-noted techniques can be used to track building structures moving between multiple cells.

Figure 3D:
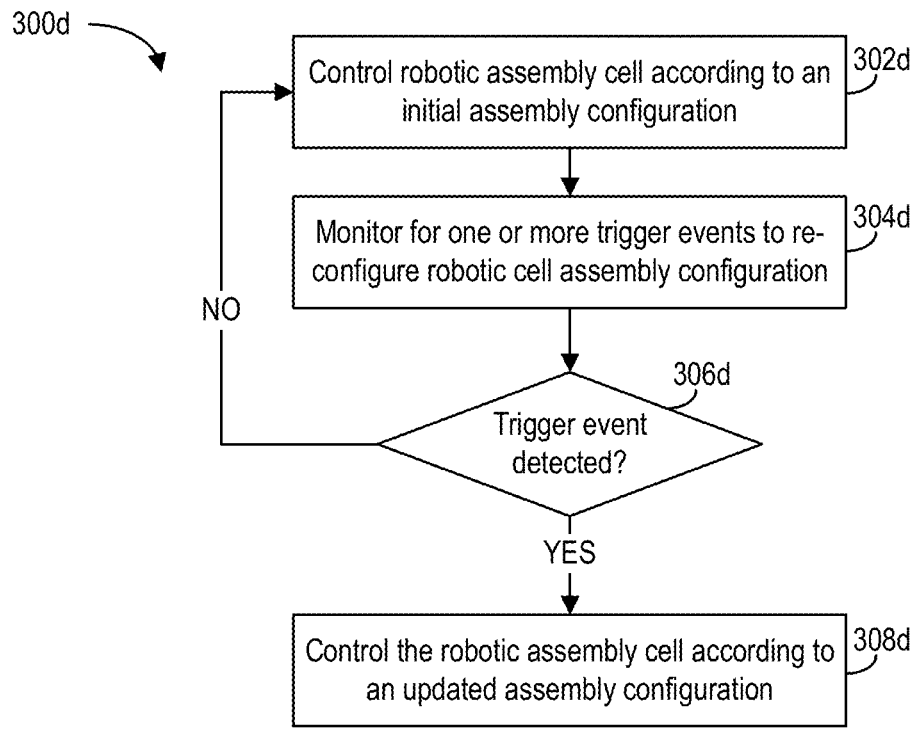
FIG. 3D is a process flow for still another example method for generating control instructions by one or more servers.

Reference is now made to FIG. 3D, which illustrates a process flow for an example method 300d for re-configuring robotic assembly cells 104 to perform new or different assembly tasks. Method 300d can be performed by the server 106, or otherwise, any other computing system connected to the robotic cells.

In some examples, method 300d is performed in the course of performing method 300c. For example, during acts 306c and 308c—it may be necessary to re-configure cells to carry out assembly tasks. Method 300d is also, more generally, useful during method 300b if it is required to re-configure a single cell to take on a new task.

At 302d, the robotic cell 104 is controlled according to an initial assembly configuration. An assembly configuration can refer to one or more assembly tasks the robotic cell is being controlled to execute. For instance, the robotic cell 104 can be controlled to assemble a first building structure. In some cases, the initial assembly configuration may simply be that the robotic cell is in an initial inactive state.

At 304d, the server 106 can monitor for one or more trigger events which cause the server 106 to re-configure the robotic cell's assembly configuration. For example, a trigger event can correspond to receiving instructions from the user computer terminal 102 to build a new building structure (e.g., receiving a new building design file from computer terminal 102).

The trigger event can also relate to a determining a change in robotic cell capability. For example, a robotic cell can have decreased capability resulting from a number of factors including machine break-down. For instance, rather than having three operational robotic arms, the cell may suddenly only have two operational robotic arms. This can be determined through monitoring (e.g., real-time or near real-time) robotic cell capability data. In this case, the robotic cell can be re-configured to handle assembly tasks performable with the reduced capability.

By a similar token, a robotic cell can have a different or increased capability. For instance, different capabilities can result from modifying the available assembly tools in the robotic cell, or modifying available hardware (e.g., new tools, robotic arms, greater building platform area, etc.). Modified capability can also result, for example, from simply rearranging the cell layout for different task optimizations. Accordingly, the robotic cell can be re-configured with assembly tasks that correspond to the modified capability.

In cases where the robotic cell 104 is part of a facility (FIGS. 2B and 2C), the trigger event may be a determination that robotic cell 104 need to be re-configured to meet facility-wide requirements. For example, mass production of a specific building structure may require the system to designate more robotic cells 104 to assembling a given building structure, etc. For instance, available (or unused) robotic cells) can be re-configured to become active to complete tasks relating to a building structure. Otherwise, robotic cells that are assigned to assemble less urgent structures, or structures with less demand, can be re-configured to meet the demand requirements. To this end, assembly tasks can be designated priority levels, such that higher priority tasks can take precedence over lower priority tasks. If a robotic cell is assigned to lower priority tasks, and a higher priority task requires completion—this can be a trigger event to re-configure the robotic cell. Priority levels can be pre-configured for certain assembly tasks, or otherwise defined by the user terminal 102 or server 106.

In other examples, the trigger event can relate to events that happen in other robotic cells. For example, a fault in another robotic cell can be a trigger event. For example, the trigger event can involve determining that another robotic cell is experiencing a fault (e.g., a machine break-down). Accordingly, a current robotic cell needs to be re-configured to compensate for all, or some of the tasks performed by the faulty cell. Similarly, a trigger event relate to the other robotic cell having reduced, modified or increased capability. In this case, the current cell may also need to be re-configured to handle tasks previously performed by the other cell.

In still other examples, the facility-wide requirements can relate to one or more optimization criteria. For example, to optimize assembly, it may be determined that different cell configurations are required.

At 306d, a determination is made as to whether a trigger event was detected.

At 308d, if a trigger event was detected, the server 106 may control the robotic assembly cell 104 according to an updated assembly configuration. For example, this can involve controlling the robotic cell to assemble a new or different building structure, as required. If the robotic cell is initially inactive, the updated assembly configuration can involve activating the robotic cell. Otherwise, the robotic cell 104 can continue operating according to the initial assembly configuration at 302c.

III. Example Hardware/Software Block Diagram Architectures

Figure 5A:
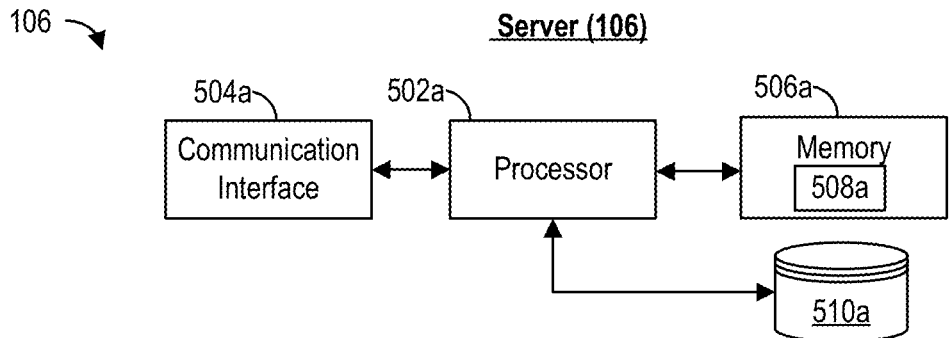
FIG. 5A is a simplified block diagram of an example hardware/software architecture for an example server.
Figure 5B:
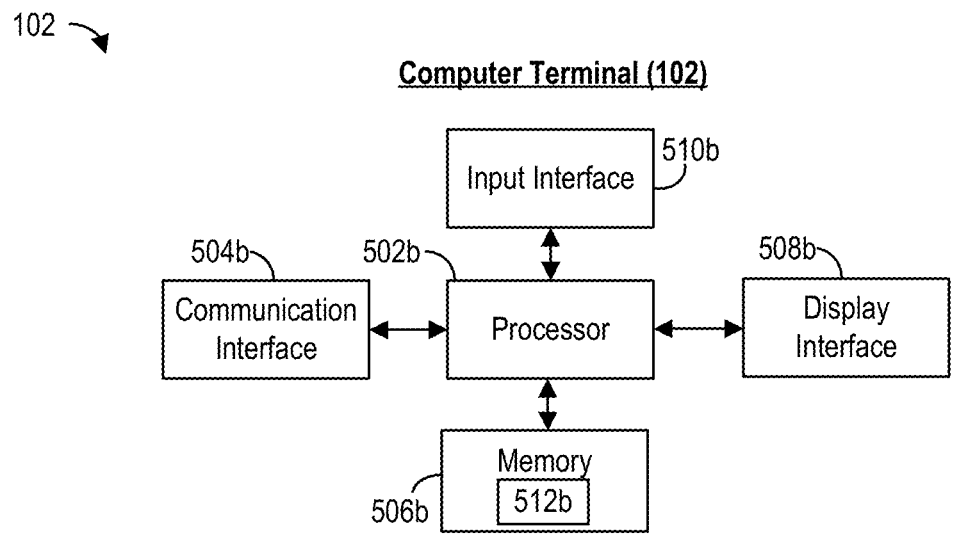
FIG. 5B is a simplified block diagram of an example hardware/software architecture for a user computer terminal.
Figure 5C:
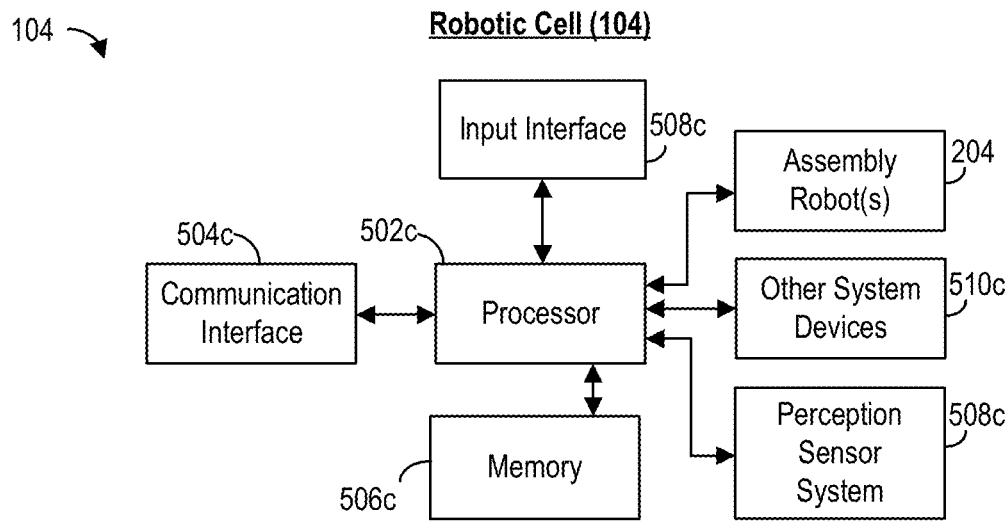
FIG. 5C is a simplified block diagram of an example hardware architecture for a robotic assembly cell.

Reference is now made to FIGS. 5A-5C, which show simplified hardware/software block diagrams for example servers 106, computer terminals 102 and robotic cells 104.

FIG. 5A shows a simplified hardware/software block diagram for an example server 106. As shown, the server 106 may include a processor 502 coupled to one or more a communication interface 504a and a memory 506a.

Processor 502a is a computer processor, such as a general purpose microprocessor. In some other cases, processor 502a may be a field programmable gate array, application specific integrated circuit, microcontroller, or other suitable computer processor. While only a single processor 502a is exemplified, it will be understood that processor 502a may comprise any number of processors (e.g., parallel processors, etc.). Accordingly, reference to processor 502a performing a function or operation may be understood to refer to any number or subset of processors 502a performing that function or operation, concurrently, partially concurrently and/or non-concurrently.

Communication interface 504a is one or more data network interface, such as an IEEE 802.3 or IEEE 802.11 interface, for communication over a network (e.g. network 110).

Processor 502a is also coupled, via a computer data bus, to memory 506a. Memory 506a may include both volatile and non-volatile memory. Non-volatile memory stores computer programs consisting of computer-executable instructions, which may be loaded into volatile memory for execution by processor 502a as needed. It will be understood by those of skill in the art that references herein to server 106 as carrying out a function or acting in a particular way imply that processor 502a is executing instructions (e.g., a software program) stored in memory 506a and possibly transmitting or receiving inputs and outputs via one or more interface. Memory 506a may also store data input to, or output from, processor 502a in the course of executing the computer-executable instructions.

As shown, memory 506a can store one or more automated assembly software programs 508a. The assembly software programs 508a can perform various functions provided herein including, by way of non-limiting examples, performing methods 300b (FIG. 3B), 300c (FIG. 3C) and/or 300d (FIG. 3D). In some example cases, the assembly software program 508a can perform, (i) model validation for received building structure models, (ii) assembly sequence generation, and/or (iii) assembly robot motion path and action planning.

In some cases, the server 106 may also include a data storage 510a, coupled to processor 502a. Data storage 510a can store "big data" aggregated from one or more robotic assembly cells 104. The aggregate data can be used, for example, to train one or more machine learning models. For example, the aggregate data can train machine learning models to generate optimal assembly sequences for different building structures.

FIG. 5B shows a simplified hardware/software block diagram of an example computer terminal 102. Similar to server 106, computer terminal 102 may also include a processor 502b coupled, via a computer data bus, to one or more of a communication interface 504b and a memory 506b.

Processor 502b, communication interface 504b and memory 506b may be analogous in structure and function to processor 502a, memory 506a and communication interface 506a of the server 106, respectively. To this end, it will also be understood by those of skill in the art that references herein to computer terminal 102 as carrying out a function or acting in a particular way imply that processor 502b is executing instructions (e.g., a software program) stored in memory 506b and possibly transmitting or receiving inputs and outputs via one or more interface.

In some example cases, memory 506b can store a client-side program 512b that can communicate with server 106. The client-side program 512b may perform acts 302a and 304a (FIG. 3A), and may also generate GUIs as shown, for example, in FIGS. 4A and 4B.

Processor 502b may also couple to one or more of a display interface 508b and an input interface 510b.

Display interface 508b may be, for example, a desktop screen (e.g., an LCD screen), which can be used to display various graphical interface (e.g., as shown in FIGS. 4A and 4B). Input interface 510b can be, for example, a keyboard and mouse or otherwise any other interface for accepting user inputs (e.g., selections as shown in FIG. 4B). In some example cases, the input interface 510b can be a touchscreen display (e.g., a capacitive touchscreen display), in which case the input interface 510b may be integrated into the display interface 508b.

FIG. 5C shows a simplified hardware/software block diagram of an example robotic assembly cell 104. As shown, the robotic cell 104 may also include a processor 502c coupled, via a computer data bus, to one or more of a communication interface 504c and a memory 506c. Processor 502c, communication interface 504c and memory 506c may be analogous in structure and function to processor 502a, memory 506a and communication interface 506a of the server 106, respectively. It will also be understood by those of skill in the art that references herein to robotic cell 104 as carrying out a function or acting in a particular way imply that processor 502c is executing instructions (e.g., a software program) stored in memory 506c and possibly transmitting or receiving inputs and outputs via one or more interface. Further, input interface 508c may be analogous to input interface 510b.

Processor 502c may also be coupled to one or more assembly robots 204, as well as other system devices 510c (e.g., automated cutting stations, etc.) and/or a perception system 512c, which is explained in greater detail herein.

IV. Example Methods for Determining Assembly Sequences

Figure 6A:
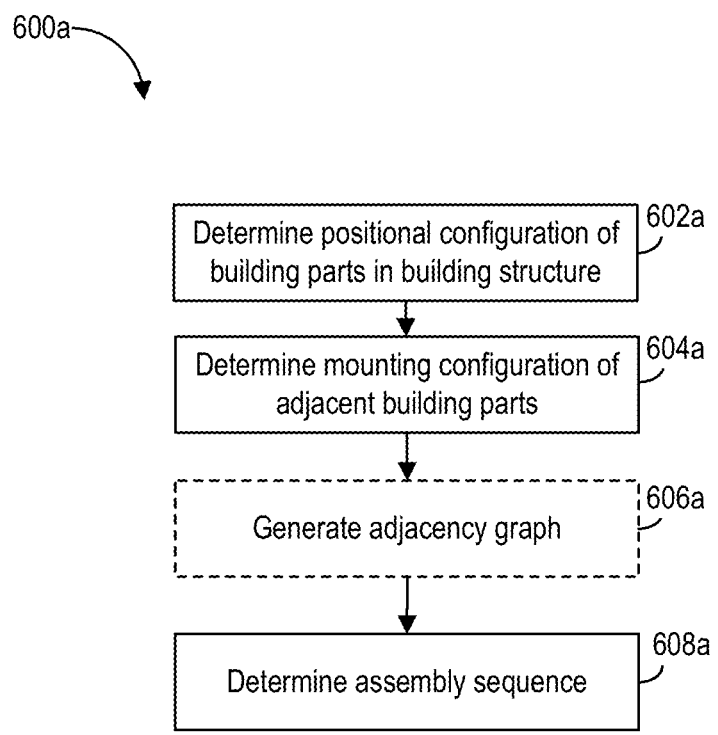
FIG. 6A is a process flow of an example method for determining an assembly sequence for a building structure.
Figure 6B:
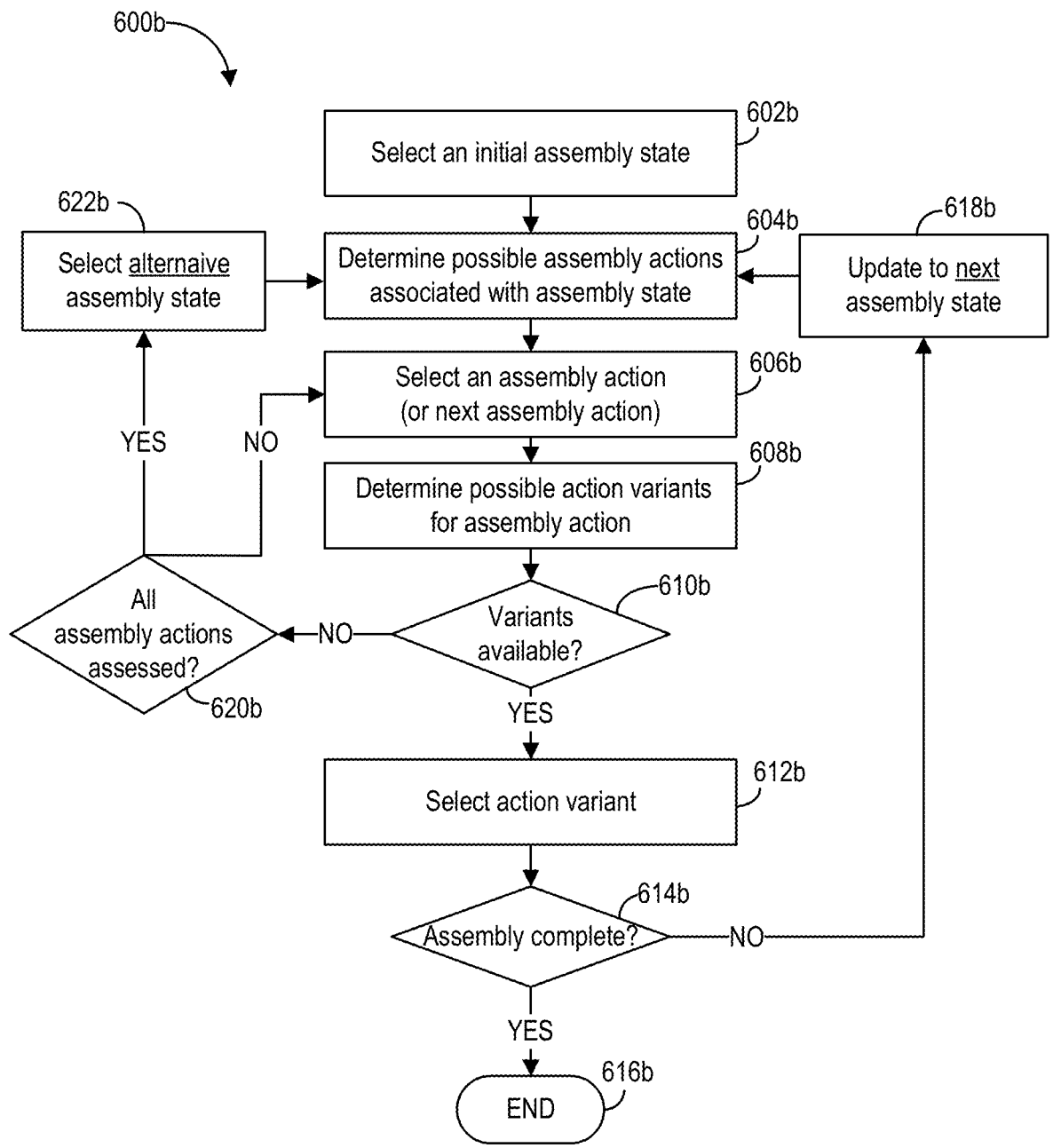
FIG. 6B is a process flow of another example method for determining an assembly sequence for a building structure.
Figure 6C:
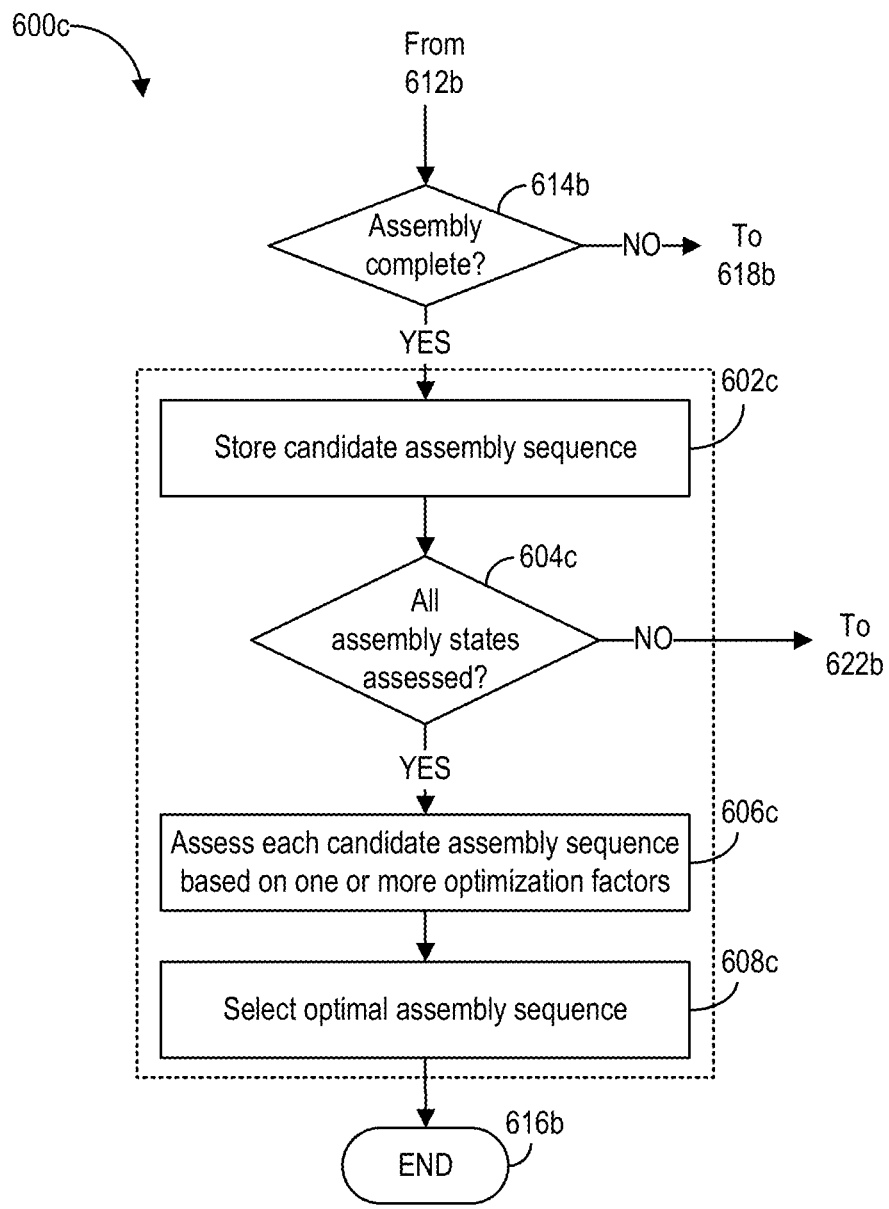
FIG. 6C is a process flow of still another example method for determining an assembly sequence for a building structure.

Reference is now made to FIGS. 6A-6C, which show process flows for example methods for determining an assembly sequence for a building structure. Methods 600a-600c, in FIGS. 6A-6C, may be executed, for example, by the cloud control server 106 during acts 306b and 308b of FIG. 3B.

Referring first to FIG. 6A, which shows a process flow for an example method 600a for analyzing assembly data with a view to determining an optimal assembly sequence.

At 602a, assembly data is analyzed to determine the positional configuration of different building parts in the building structure (e.g., the positional configuration of each stud in a wall panel). This is analogous to act 306b in FIG. 3B.

At 604a, based on the results of act 602a, the mounting configuration of adjacent building parts may be determined. Determining the mounting configuration can include determining: (i) adjacent building parts with engaging contact surfaces, (ii) the surface area of the engaging contact surfaces, and/or (iii) the contact axis of the contact surfaces. The mounting configuration can be identified based on the determined positional configuration of adjacent building parts.

Figure 7A:
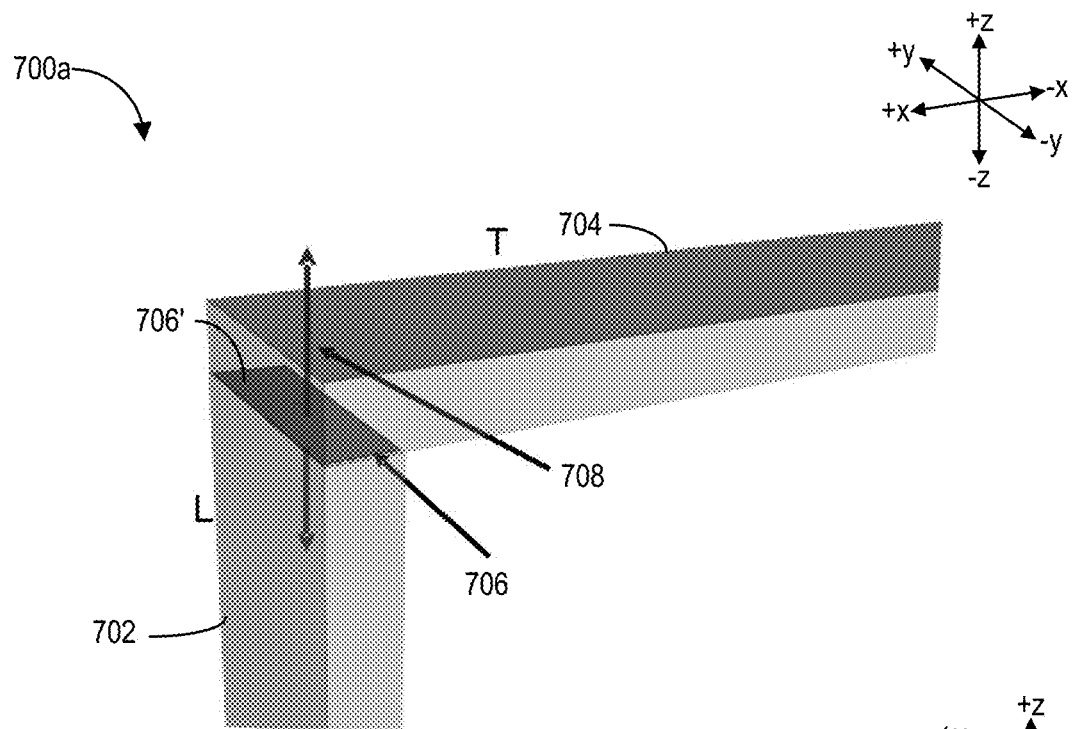
FIG. 7A is an illustration of adjacent building parts in a building structure.

To further clarify act 604a, reference is briefly made to FIG. 7A. FIG. 7A illustrates a portion of an assembled building structure 700a (e.g., a wall panel). It is observed that beam 702 is adjacent to, and engages beam 704 along a contact surface 706. The contact surface 706 has a surface area 706', and has a contact axis defined along axis 708. The contact axis 708 is defined in a plane orthogonal to the plane in which the contact surface extends.

Figure 7B:
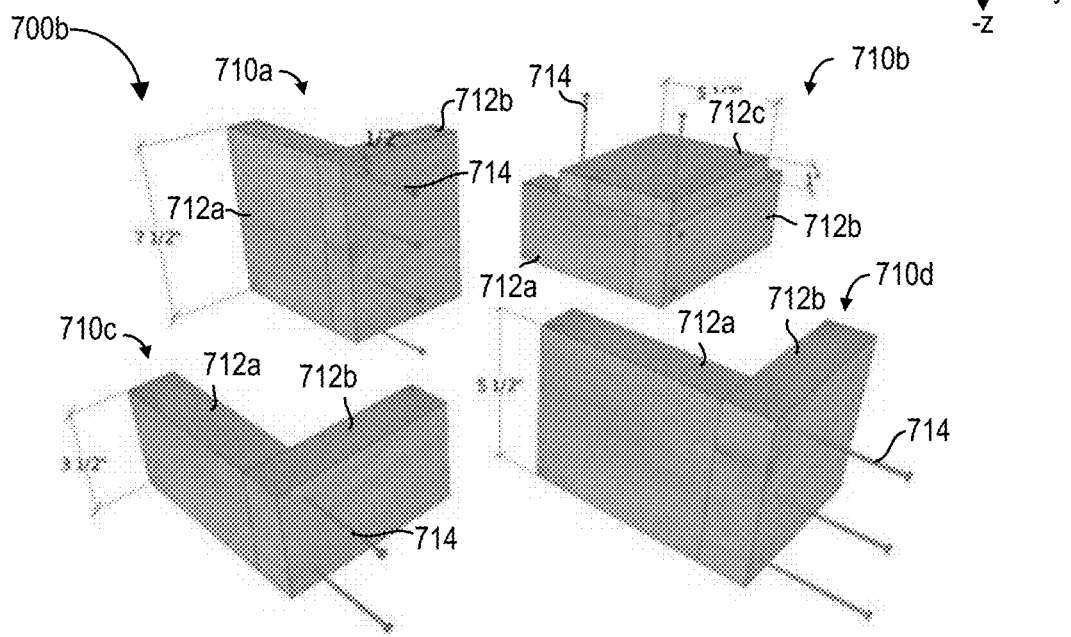
FIG. 7B are illustrations of two or more building parts being fastened together.

The contact surface area, and the contact axis data (collectively referred to herein as "contact data") provide useful information in respect of how building parts are mounted and fastened together. For example, the contact axis defines the relative direction of engagement of two adjacent building parts. For instance, as shown in FIG. 7B, the contact axis between building parts 712a, 712b is directed along a y-axis (assemblies 710a, 710c and 710d). Further, the contact axis between building parts 712c and 712a, 712b is directed along a z-axis.

The contact axis is also useful in determining the direction fasteners should engage to fasten building parts together. For example, as shown in FIG. 7B—in assemblies 710a, 710b and 710d, the fasteners 714 are oriented along the contact y-axis. Further, in assembly 710, the fasteners 714 are orientated along the contact x-axis. As clarified herein, the contact axis also determines various blocking constraints when determining the ordered assembly sequence of building parts.

In contrast to the contact axis 708, the contact surface area 706' is useful in determining the number and/or position of fasteners required to couple together adjacent building parts. For example, as shown in FIG. 7B—assemblies 710b and 710c have a small contact surface area, and may therefore require only two fasteners 714. In contrast, assemblies 710d and 710a have a larger contact surface area and may therefore require three or four fasteners 714.

In at least some cases, determining the mounting configuration at act 604a is performed using a three-dimensional R-tree data structure. For sake of clarity, FIG. 8A shows a simplified two-dimensional (2D) illustration of an R-tree data structure. In this example, a building structure includes multiple building parts 802-808. The positional configuration of each building part is determined in an initial, unmodified state 800a. In the initial state, it is determined whether any two building parts intersect (e.g., intersection 810 corresponding to components 804 and 806). The area of each building part is then expanded slightly to a modified, expanded state 800b. In the expanded state, it is again determined whether building parts intersect (e.g., intersections 812 and 814). Building parts that only intersect in the expanded state 800b are determined to be originally adjacent (e.g., intersection 814 corresponding to components "A" and "B"), and should therefore be mounted adjacently. FIG. 8B exemplifies the same concept using a three-dimensional model 800c.

Referring back to FIG. 6A, in at least some example embodiments, at 606a, an adjacency graph is generated. The adjacency graph may provide a visual representation of the mounting configuration of various building parts, as determined at 604a. As provided herein, the adjacency graph can assist in determining an optimal assembly sequence for a building structure.

Figure 9:
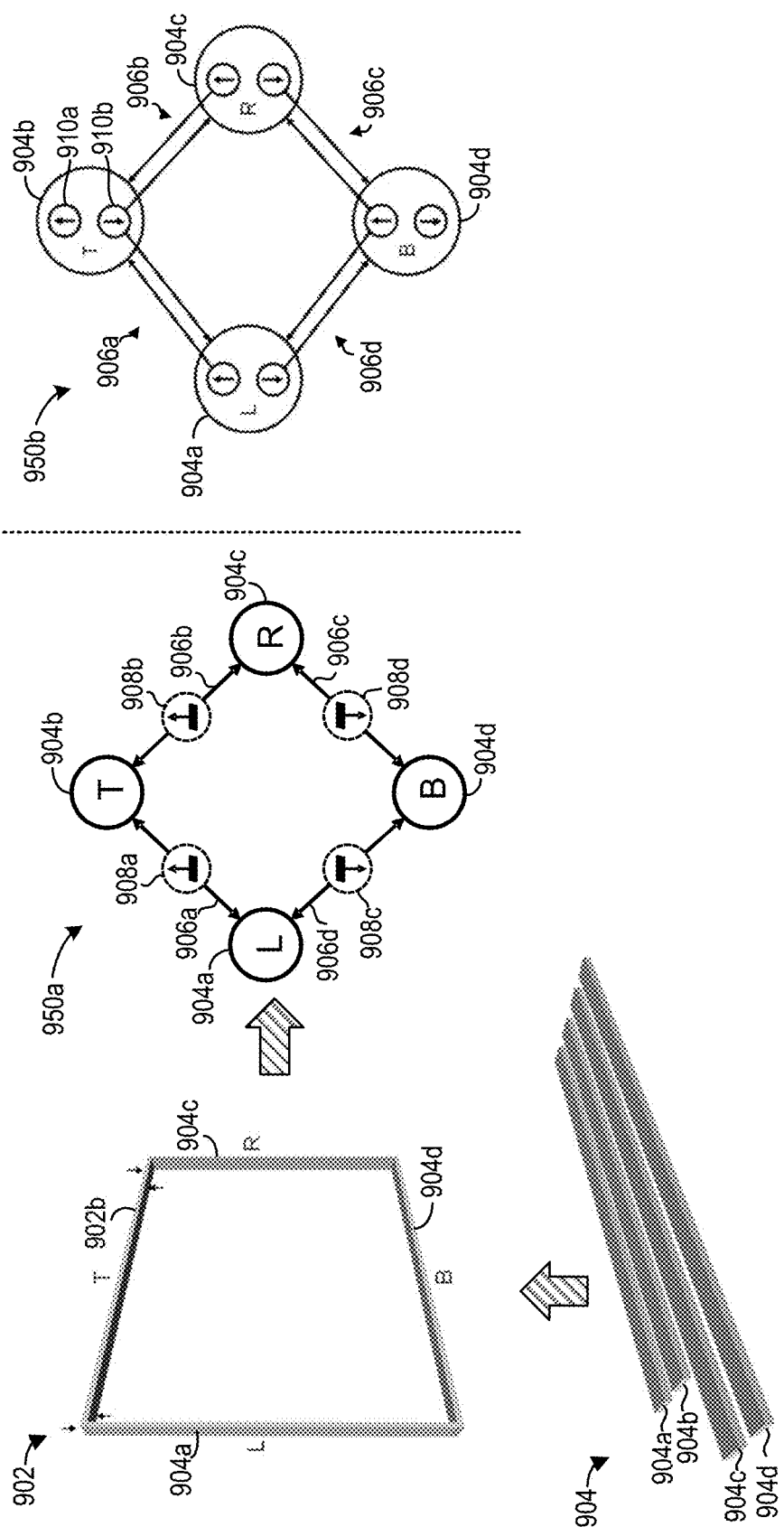
FIG. 9 are example adjacency graphs generated for a building structure.

FIG. 9 shows example adjacency graphs 950a, 950b which may be generated at act 606a. The adjacency graphs in FIG. 9 are generated for an example window panel structure 902. As shown, the window panel 902 is formed of four beams 904a-904d (e.g., top (T), left (L), right (R) and bottom (B)). Each building part 904a-904d is represented in the adjacency graphs 950a, 950b as a discrete node. Adjacent, or connected parts are represented with connected lines or arrows 906a-906d.

In example adjacency graph 950a, contact axis data 908a-908d is expressed within each connecting link 906a-906d. In adjacency graph 950b, each node 904a-904d includes corresponding contact axis data 910a, 910b. In particular, each node 904a-904d, in adjacency graph 950b, includes all possible contact axes for a given part. The relevant contact axis is then linked to the corresponding node (e.g., 910b to node 904a).

As provided in greater detail, the adjacency graphs 950a, 950 can be used to identify blocking constraints during assembly. For example, it can be determined from graphs 950 that top beam 904b should be mounted from above beams 904a, 904b, 904c, rather than from below.

By way of further clarification, as shown in FIG. 10A, where the top beam 1006a is assembled from above (i.e., above a bottom beam 1006b), the assembly robot 1002 has a clear path. In contrast, in FIG. 10B, where the assembly robot 1002 attempts to translate the top beam 1006a from below—the bottom beam 1006b interferes with a collision area 1004 defining the volume of the assembly robot end effector.

To this end, the collision area 1004 may have any dimensional configuration (e.g., shape, size, etc.). For example, while FIGS. 10A-10B show the collision area 1004 as only surrounding the end effector, the collision area 1104 may additionally extend to include all or part of the robotic arm 1002. Accordingly, the collision area 1104 can ensure that no collision occurs along any part of the assembly robot. In other examples, the collision box 1004 may have a more granular definition. For instance, rather than simply comprising a box (as shown), the collision area 1004 may more closely mirror the shape of the end effector and/or robot. For example, a high-resolution collision area 1004 may very accurately capture the shape of the robot, while a lower resolution collision area 1004 may capture the shape with less definition.

In some examples, several types of collision areas can be defined. For example, initially, a low-resolution collision area can be defined. The low-resolution collision area can correspond to a simple box, or a loose representation of the tool. If a collision is detected in the low-resolution area, a higher resolution collision box can be used and the simulation repeated. The higher resolution collision box can take a closer form to the shape of the robot, and therefore can be used to more closely identify the collision locations in greater detail (or perhaps confirm a lack of collision at the more granular level).

As shown in FIGS. 11A and 11B, the contact axis data can also define the direction of applying fasteners to couple beams together. For instance, the assembly robot 1002 must approach from above the top beam 1006a to apply fasteners in a downward direction 1008 to couple the beams 1006a, 1006b together.

In view of the foregoing, it will be appreciated that the adjacency graphs 950a, 950b can provide a convenient, and simplified nodal relational representation of the mounting configuration between different building parts. This nodal representation can be stored in memory (e.g., server 106's memory) and referenced with ease. In other cases, any other representation can be used to express the relative mounting configuration between different building parts.

Referring back to FIG. 6A, at 608a, an assembly sequence is determined for assembling the building parts to form the building structure. The assembly sequence can be determined based on the determinations made at 604 and 606.

In some examples, the assembly sequence may be determined based on additional constraints. For example, the following set of constraints may be defined for assembling a wall panel—

C1: The building parts must be positioned before being fastened.
C2: Headers must be positioned before jack studs.
C3: The top and bottom plates must be positioned and fastened before the wall backings are fastened.
C4: Studs cannot be placed with the suction gripper after the top plate is placed and clamped.
C5: All non-OSB parts must be positioned and fastened before the OSB parts are positioned.
C6: All routing actions must occur after the OSB parts are positioned.
C7: Any tools used during assembly must not collide with other building parts during an assembly task.

In other examples, different sets of constraints may be defined for wall panels and/or other building structures. In various further examples, the order in which the constraints are applied or prioritized may be varied depending on the task at hand, configuration of the robotic cells and/or other factors.

Reference is now made to FIG. 6B, which shows a process flow for an example method 600b for determining an assembly sequence for a building structure (i.e., act 608a in FIG. 6A). Concurrent reference is also made to FIG. 12, which shows an example tree diagram 1200 to clarify method 600b.

In more detail, at 602*b*, an initial assembly state is selected for the purpose of simulating an assembly sequence. For example, in the initial iteration of method 600*a*, the initial assembly state may simply be that nothing is assembled (e.g., the start state 1202 in FIG. 12).

At 604*b*, all possible assembly actions associated with the initial assembly state are determined. For example, as shown in the tree diagram 1200 in FIG. 12—in assembling a wall panel, the initial assembly state 1202 is associated with a number of possible assembly actions, including: (i) installing a top beam, (ii) installing a bottom beam, (iii) installing a left beam, and/or (iv) installing a right beam. Other assembly actions which are not illustrated include, for example, fastening two building parts together, commanding the assembly robot to swap to a new tool to prepare for a new action, and/or rotating the assembly structure to facilitate further assembly (e.g., rotating the assembly on top of the building platform table 210).

At 606*b*, an assembly action, of the one or more assembly actions determined at 604*b*, is selected for further simulation.

At 608*b*, for the selected assembly action, the system can determine all possible action variants. An action variant refers to any possible technique for performing that assembly action. For example, in respect to installing a beam (e.g., top, bottom, right or left), the action variants can include: (i) placing the beam from above, (ii) placing the beam below, (iii) placing the beam from the left side, (iv) placing the beam from the right side, (v) placing the beam from the front side, or (vi) placing the beam from the back side (e.g., on the building platform inside the robotic cell 104). Further action variants can also include determining whether the action should be performed by a first or second assembly robot inside the robotic cell 104, e.g., depending on the number of assembly robots.

At 610*b*, it is determined whether variants are available for a given assembly action. For instance, in some example cases, all variants may be blocked. This may be a consequence of previously performed assembly actions, which block any variant for a current assembly action. Act 610*b* may be negligible in the initial iteration of method 600*b*, where there are no previous assembly actions.

At act 610*b*, if an action variant is available, then at 612*b* one of the action variants can be selected for further simulation. At 614*b*, it is determined if the simulated assembly is complete as a result of applying the selected action variant. If the assembly is complete, then the method may end at 616*b*. That is, a viable assembly sequence path (e.g., 1250 in FIG. 12) has been identified that results in an assembled building structure, and accordingly the method is complete. This assembly sequence may then form the basis for generating control instructions for a robotic cell 104. The assembly sequence may comprise a plurality of assembly tasks, whereby each assembly task corresponds to an action variant in the sequence.

If the assembly is not complete, method 600*b* can continue to act 618*b*. At 618*b*, the assembly state is updated to the next assembly state. For example, in FIG. 12, once the top beam is simulated to be mounted (e.g., from above), the assembly state is updated from the initial state 1202 to the updated assembly state 1204. Assembly state 1204 indicates that the top beam is now simulated to be mounted on an assembly platform 210.

Method 600*b* may then return to act 604*b* to re-determine all possible actions associated with the updated assembly state. For example, in FIG. 12, this can correspond to now placing the bottom beam, left beam or right beam. The method 600*b* may then select one of the assembly actions 606*b*, and may continue to iterate until the assembly is complete at 614*b* (e.g., all beams have been mounted).

As stated previously, in subsequent iterations of method 600*b*—at 608*b*, some action variants may be blocked owing to previously performed actions. For instance, in FIG. 12, once the top beam is placed—if it is desired to place the bottom beam next, then the bottom beam can only be mounted from below the top beam. Blocked action variants include, for example, translating the bottom beam from above the top beam and into a position below the top beam, which would require the bottom beam to physically pass through the top beam.

In some examples, determining possible action variants that are not blocked, at act 608*b*, is performed with reference to the adjacency graph generated at 606*a*. For example, the adjacency graph can indicate that once the top beam is installed, it blocks any other beam from being inserted from over top of it. Accordingly, act 608*b* attempts to only determine the remaining "possible" action variants.

At 610*b*, it may be determined that no action variants exist for a given assembly action (i.e., all action variants are blocked). This indicates a dead-end, and that the method 600*b* needs to backtrack and select a different assembly action.

Before selecting a different assembly action, at 620*b*, the method can initially determine whether all possible assembly actions—determined at 604*b*—have been assessed (i.e., attempted). If not, then at 606*b*, method 600*b* backtracks to select a different assembly action and tries again (e.g., placing the left beam 1214 rather than placing the bottom beam 1216 in FIG. 12). If all assembly actions have been assessed at 620*b*—and no variants are available for any assembly action—then the method 600*b* needs to further backtrack and select an alternative assembly state at 622*b*.

For example, if the assembly state 1204 (FIG. 12) was initially selected, and a dead-end was determined at stages 1250*c* or 1250*d* for that assembly state, method 600*b* may backtrack to 1250*a* to explore selecting assembly state 1206 (e.g., placing the bottom beam first, rather than the top beam). Method 600*b* may again iterate until the assembly simulation is complete.

Figure 12:
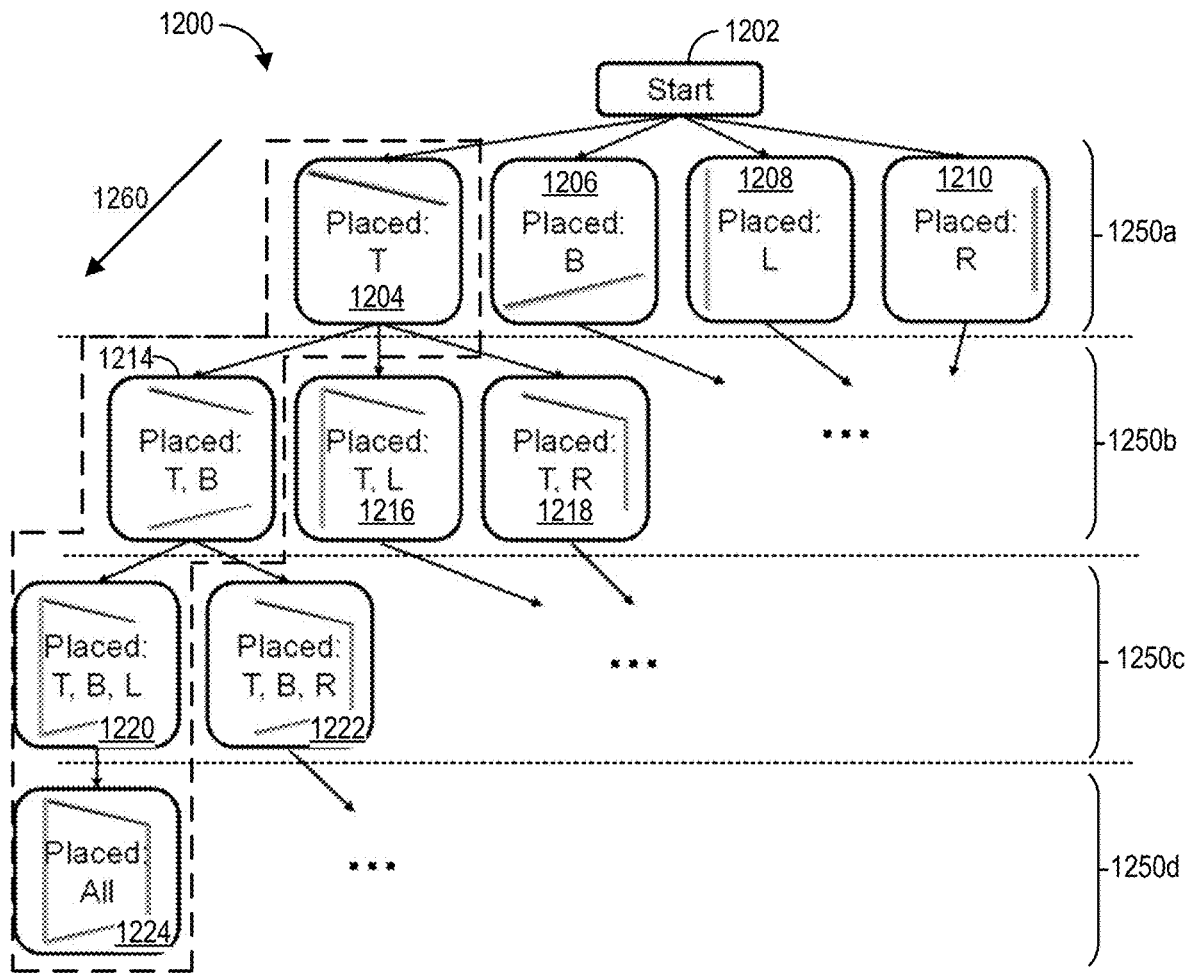
FIG. 12 is an example tree diagram showing possible assembly states for assembling a building structure.

Accordingly, and in effect, method 600*b* traverses the tree graph 1200 (FIG. 12) to consider all possible root-to-leaf node path trajectories until a path is located which allows for successful assembly (1260 in FIG. 12).

Reference is now made to FIG. 6C, which shows a process flow for an example method 600*c* for determining an assembly sequence for a building structure. Method 600*c* is an expanded version of method 600*b*.

In contrast to method 600*b*, which completes the method after the assembly is complete—method 600*c* continues exploring other possible assembly sequences, and then attempts to select the most optimal assembly sequence.

As shown, once an assembly sequence is identified at 614*b*, the assembly sequence is stored in memory, at 602*c*, as a candidate assembly sequence.

At 604*c*, it is then determined whether all assembly states have been assessed (e.g., 1204-1224 in FIG. 12). If not, then the method can return to act 622*b* to select a different assembly state. For example, in FIG. 12, the method can backtrack to the first stage 1202*a* to explore a new root-to-leaf node path, or may backtrack to any other stage 1202*b*-1202*d* that has not yet been fully explored or assessed.

Otherwise, if all assembly states have been evaluated—then at 606*c*, the system can assess each candidate assembly sequence based on one or more optimization factors. Optimization factors can include, for example, determining the difficulty or convenience of different assembly sequences. Other optimization factors include time, cost, alignment and stability score of the final structure, as well as stress on the assembly robot (e.g., robot arms).

At 608c, an optimal assembly sequence is selected, whereby the assembly sequence comprises a sequence of assembly action variants defining assembly tasks.

In some example cases, the optimization factors may be applied dynamically during method 600b (FIG. 6B), rather than at the end. For example, at 606b—while attempting to select between possible assembly actions, the system can rank assembly actions based on the optimization factors. For example, the system can evaluate the difficulty and convenience of each assembly action. That is, the system can explore each available assembly action and look forward one to more steps to determine the number of variants for that action (i.e., difficulty), as well as the number of future action/action variants blocked by selecting each action (i.e., convenience). The assembly action having the lowest difficulty and/or highest convenience may then be selected as the next assembly action 606b to simulate for that iteration. In this manner, the system can determine the most optimal assembly sequence "on the go".

An example set of optimization factors that may be used to determine the most optimal assembly sequence for a wall panel is listed below—
   Stability: Prioritizes actions that fastens (e.g., nail, staple, etc.) parts against stable parts.
   Deflection: Prioritizes nailing in a direction that does not deflect the part.
   Tool use: Prioritizes actions with the same robot (if a single tool is available) or alternating robots (if multiple tools are available).
   Persistence: Prioritizes fastening actions for the same part.
   Consistency: Prioritizes actions that nail parts from the same direction.
   Clamping: Prioritizes placing full studs and plates to clamp and stabilize the wall panel early in the assembly process.
   Alignment: Prioritizes placing precut parts against plates for better alignment.
   Blockage: Prioritizes actions that need to be performed before others to avoid excessive backtracking.
   Distance: Prioritizes actions that are closer to the last robot position.
   Direction: Prioritizes actions that are closer to the north side of the table for consistency.

Different combinations of these and other optimization factors may be used to determine the most optimal assembly sequence for other wall panels and/or other building structures. In various further examples, the order in which the optimization factors are prioritized may be varied depending on the task at hand, configuration of the robotic cells and/or other considerations.

In some examples, once the optimal assembly sequence is identified, it can be replicated for similar building structures. This avoids having to re-determine the assembly sequence for each new building structure. For example, a similarity index can be used to identify, or designate similar building structures that have been sequenced in the past, and the index can be used to replicate the assembly sequence if above a given threshold.

Figure 6D:
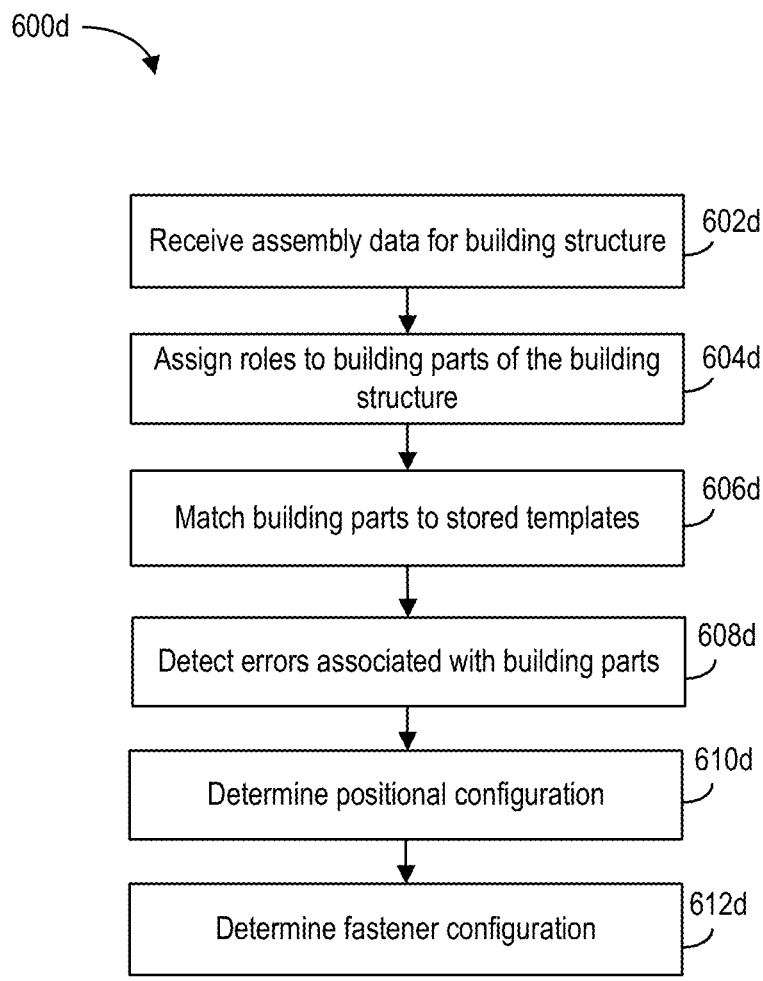
FIG. 6D is a process flow of still another example method for determining an assembly configuration for a building structure.

Reference is now made to FIG. 6D, which illustrates a process flow for an example method 600d for receiving assembly data for a building structure and analyzing the assembly data to determine an assembly configuration for the building structure.

Method 600d can be performed by server 106. Method 600d can be an expansion on acts 304b-308b of method 300b in FIG. 3B or acts 602a-604a of method 600a in FIG. 6A. In some cases, method 600d can also be performed by any computing system in communication with the robotic cell 104.

As shown, at 602d, server 106 receives assembly data for a building structure requiring assembly (e.g., a building model file). The assembly data can be retrieved from memory, or otherwise received from the computer terminal 102 or still otherwise received from any other computing system.

At 604d, the assembly data is analyzed to assign roles to the different building parts required for assembling the building structure. The roles may be assigned to the building parts based on various attributes of the building parts, for example, orientation, dimensions, and the relative position of the building part within the building structure. For an example building structure of a wall panel, the assigned roles can include studs, plates, sills, and headers.

At 604d, the assembly data may also be analyzed to identify openings or gaps between the building parts. For example, doors and windows may be identified in an example building structure of a wall panel. The roles assigned to the building parts may be further refined based on their positional configuration in relation to the openings and other building parts. For example, the studs of an example wall panel may be assigned different roles including a regular stud, a king stud, a jack stud, an inner cripple stud and an outer cripple stud based on their relative positioning with respect to doors, windows, and adjacent studs.

The assigned roles may be stored in a database. For example, server 106 may store the assigned roles in a database included in memory 506a (shown in FIG. 5A).

The assigned roles for the building parts may enable assembly of complex building structures using a single assembly building platform. For example, a wall panel including multiple windows may be assembled using a single assembly building platform. This may provide higher efficiency compared with separately assembling window sub-assemblies followed by combining the different sub-assemblies.

The assigned roles may be used in determining the assembly sequence of the building parts. For example, an applicable building code regulation may specify fastening requirements for different parts based on the role of the part. The assigned roles may be used to determine the required fastening tasks to be included in the assembly sequence.

At 606d, each building part may be matched to a stored template corresponding to a standard building part. The templates may be stored in a database, for example, in a database in memory 506a (shown in FIG. 5A) of server 106. The position and orientation of each building part relative to its matching template may be determined and stored in the database.

The template matching may be based on the role assigned to the building part at 604d. A preferred template may be stored for each role. For example, a preferred lumber template (2 in×4 in, 2 in×6 in) may be matched based on the role (regular stud, king stud, jack stud, inner cripple stud, outer cripple stud) assigned to the building part at 604d.

In some examples, there may not be a preferred template matched to a given role. A matching template may be determined based on one or more properties of the part. For example, a matching template may be determined by comparing the shape of a building part with the shape of stored templates based on edge counts and edge lengths. As another example, two-dimensional template matching may be performed by determining a two-dimensional bounding box for the building part and identifying the length of the unmatched dimension.

A building part may be marked with an error indicator if no template is matched to the building part at 606*d*. A notification may be provided to a user (e.g., via computer terminal 102 shown in FIG. 1) based on the error indicator.

At 608*d*, one or more errors associated with the building parts may be detected. For example, error detection may be performed to detect overlap errors where two or more building parts overlap in the assembled structure. Any suitable overlap detection method may be performed to detect the overlap errors. For example, a three-dimensional R-tree data structure (as described hereinabove with reference to FIGS. 8A and 8B) may be used to detect three-dimensional intersections. Other errors that may be detected at 608*d* include, for example, a wall panel having no building parts, a building part with no matching templates, an oriented strand board (OSB) sheet with excessive overhang, and assembly configurations of the building parts that are incompatible with the robotic cell.

In some examples, an error notification may be provided to a user (e.g., via computer terminal 102 shown in FIG. 1) in response to a detected error. One or more error resolution actions may be performed at 608*d* in response to a detected error. For an example overlap detection between building parts A and B, at least one of part A or part B may be modified to resolve the overlap error. In some examples, a user may be provided multiple resolution actions in response to an error notification. For example, 20 feet long wall plates may be preferred for increased efficiency during assembly. In response to an error notification indicating a wall plate with a length shorter than 20 feet, a user may be provided with two options—"resolve error by extending wall plate to 20 feet" or "make no changes".

At 610*d*, a positional configuration may be determined for the building parts to be assembled into the building structure. The positional configuration may be determined for optimal robotic assembly. For example, the positional configuration may be determined so that the assembled building structure (for example, a wall panel) is resting in a flat position on the assembly building platform. Rotation and/or translation of the building parts may be performed based on the determined positional configuration.

In some examples, the positional configuration determined at 610*d* may include one or more dummy studs and/or dummy spacers. The dummy studs may provide additional mechanical support and prevent sag/deflection during assembly of long wall panels. The dummy spacers may be added around large openings to provide additional mechanical support and prevent sag of the OSB sheets. The dummy studs and/or dummy spacers may not be fastened to the other building parts and may be removed after the building structure is assembled.

In some examples, one or more building parts may be replaced in the determined positional configuration by the corresponding matched template. The replaced building parts can be building parts that are modified after assembly. For example, a wall plate that is shorter than the matched wall plate template may be replaced by the full-length wall plate template in the determined positional configuration. The full-length wall plate may be subsequently cut after assembly.

In some examples, one or more building parts may be identified to be excluded from the positional configuration. For example, the identified parts may be manually assembled after robotic assembly based on the positional configuration. The excluded building parts may include for example backings, building parts associated with template errors, double headers, or a first stud that is less than a threshold distance from a header.

In some examples, building parts may be assigned aliases for identification during the assembly process. The building parts may also be grouped by role and/or sorted based on the position coordinates of the building parts. The updated positions, orientations, and/or any other changes associated with the building parts may be saved in the database.

At 612*d*, a fastener configuration may be determined based on the positional configuration of the building parts. Determining the fastener configuration may include determining the number, type, position and/or orientation of the fasteners.

In some examples, a set of pre-defined rules may be stored in a database. The set of pre-defined rules may be stored, for example, in a database included in memory 506*a* (shown in FIG. 5A). Each pre-defined rule may define a fastener configuration for a specific pair of adjacent building parts. For examples, the pre-defined rule may define the fastener configuration based on roles assigned (at act 604*d*) to a pair of adjacent building parts. If multiple fasteners are required for a pair of adjacent building parts, a group including the multiple fasteners may be created. The determined fastener configuration including the groups of fasteners may be stored in the database.

As one example, a pre-defined rule for nailing a regular stud to a king stud may include the following methods and parameters—

*GroupsFastenMethod*

$$\text{count} = 2$$

$$\text{group\_spacing} = 750 \text{ mm}$$

$$\text{group\_margin} = 76 \text{ mm}$$

*ParallelFastenMethod*

$$\text{depth\_margin} = 3 \text{ mm},$$

*MinHeightFastenMethod*

$$\text{angle} = 13 \ deg,$$

$$\text{angle\_threshold} = 67 \text{ mm},$$

$$\text{limit} = 40 \text{ mm}$$

In the above example rule, GroupsFastenMethod creates groups of 2 nails with 750 mm spacing (up to 76 mm from each edge), ParallelFastenMethod ensures that the nails do not protrude from the other side (by leaving a depth margin of 3 mm), and MinHeightFastenMethod ensures nails below z=67 mm get rotated by 13 degrees, with a z=40 mm limit to prevent collision of the nail gun with the assembly building platform. Other pre-defined rules may include different methods, parameters and/or parameter values.

V. Example Robotic Assembly Cell

The following is a discussion of an example robotic assembly cell 104. The robotic assembly cell 104 may be used stand-alone or in any combination or sub-combination with any other feature or features described herein (e.g., systems 100a and/or 100b).

Figure 13A:
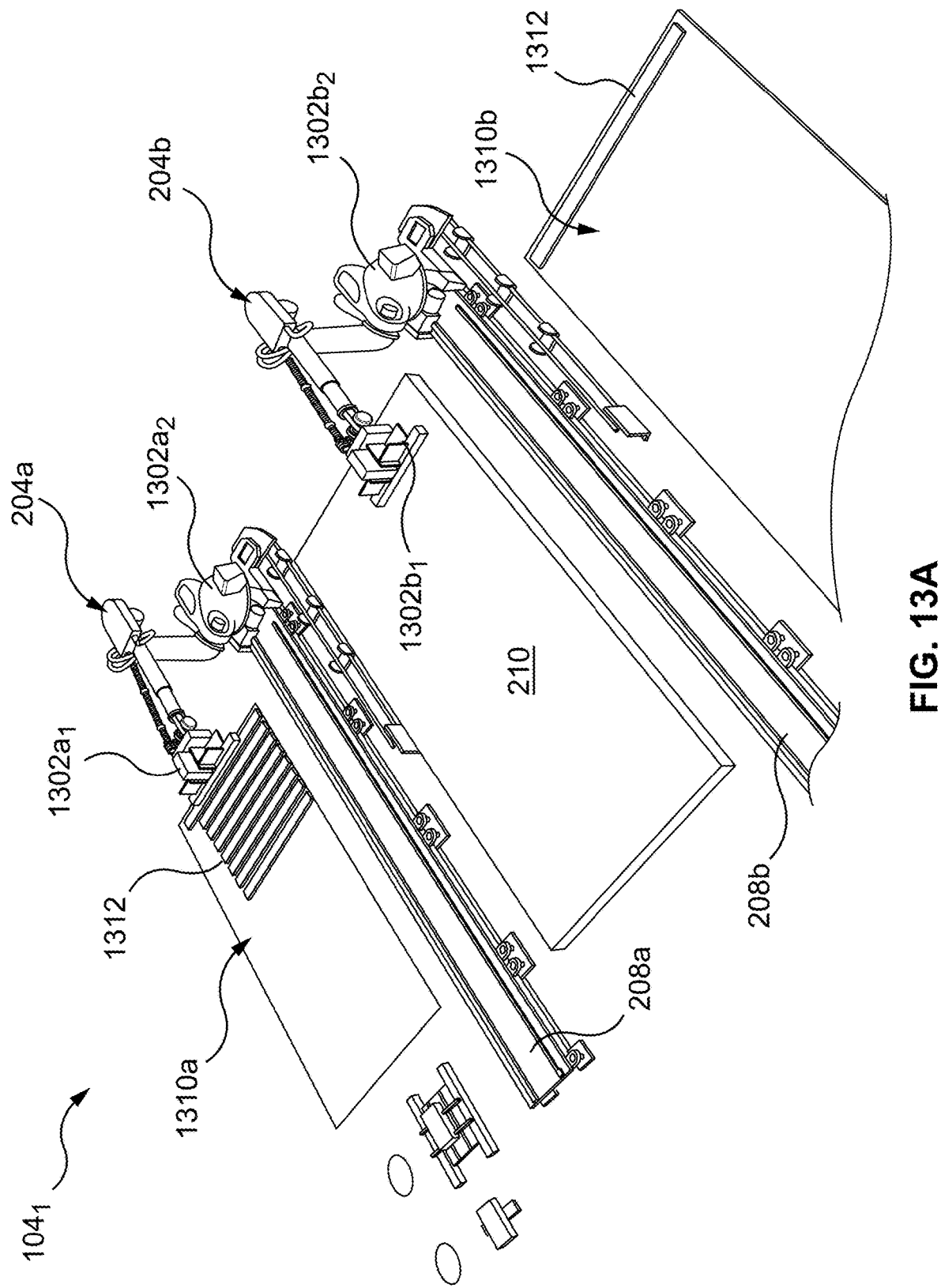
FIG. 13A is an illustration of an example configuration for a robotic assembly cell.
Figure 13B:
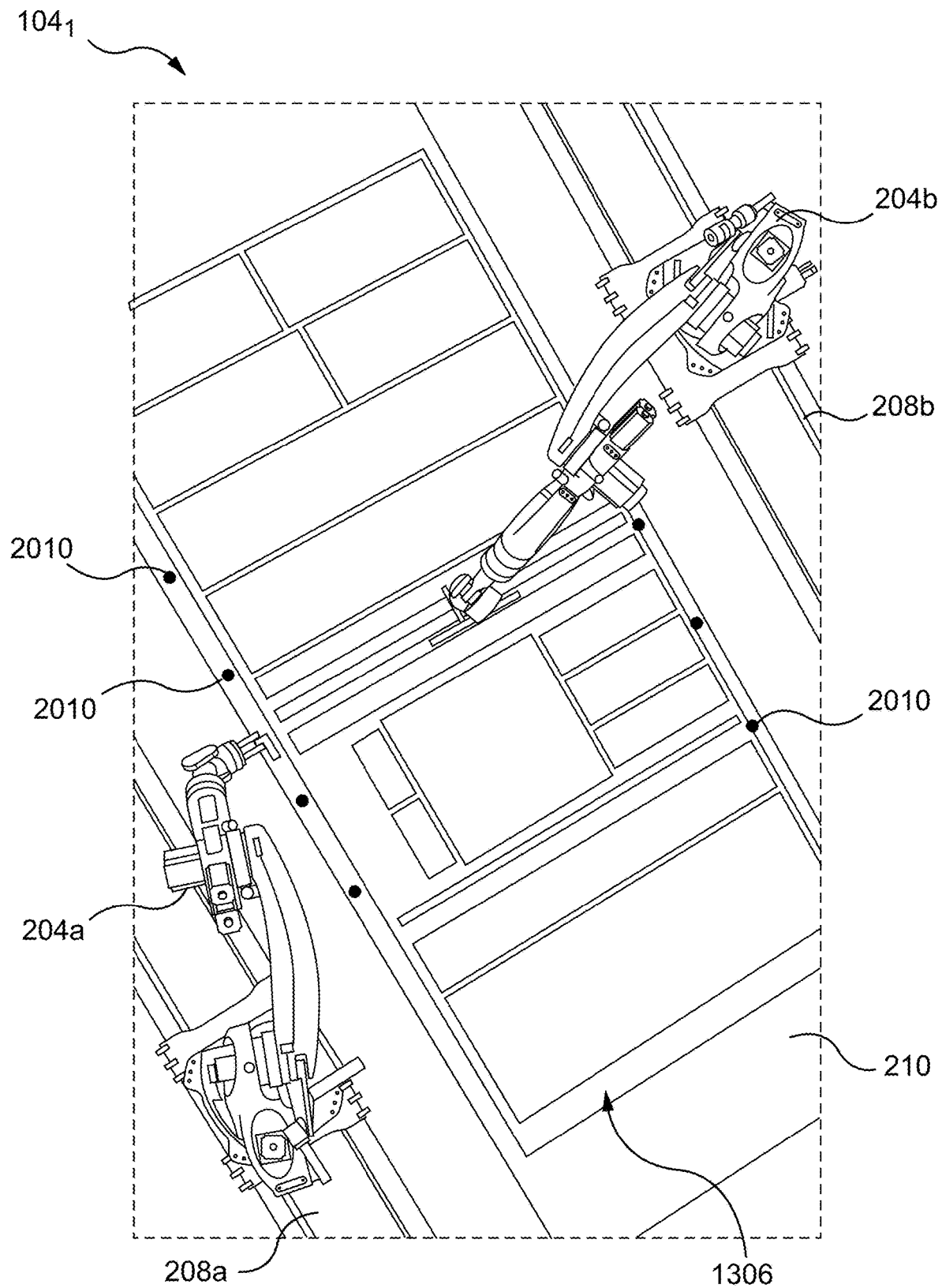
FIG. 13B is an illustration of another example configuration for a robotic assembly cell.
Figure 13C:
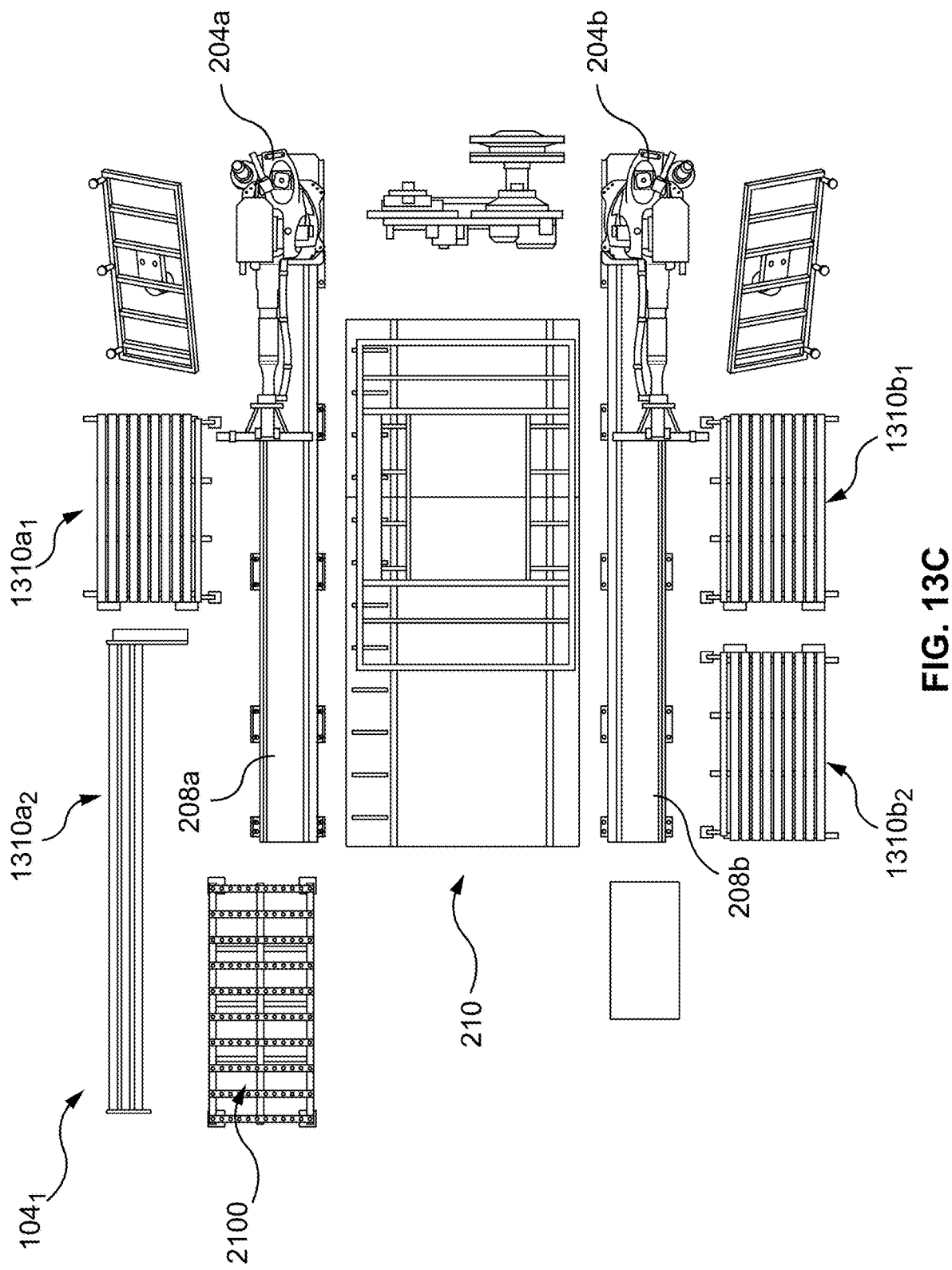
FIG. 13C is an illustration of still another example configuration for a robotic assembly cell.

Reference is now made to FIGS. 13A-13C, which illustrate various schematic illustrations of an example configuration for a robotic assembly cell 1041.

As shown, the robotic cell 1041 may include one or more assembly robots 204. In the illustrated example, only two assembly robots 204a, 204b are shown, however, the robotic cell 104 may include any number of assembly robots 204. As provided herein, each assembly robot 204 can perform various functions including, by way of example, picking-up and dropping-off building parts, moving/translating building parts to different areas of the robotic cell 104, mounting and fastening building parts together, as well as picking-up and dropping-off partially or fully assembled building structures.

In the illustrated example, each assembly robot 204 comprises a robotic arm. The robotic arms may be configured for six degrees of motion freedom to provide sufficient rotational flexibility. In other examples, more or less than six degrees of motion freedom can be provided. In still other example, the assembly robots 204 can comprise any other desired system (e.g., a robotic gantry system).

To this end, in the exemplified embodiment, each robotic arm 204 extends between a respective first end 1302a1, 1302b1 and a respective second end 1302a2, 1302b2 (FIG. 13A). The first end 1302a1, 1302b1 of each robotic arm can comprise an end effector. The end effector can be used, for example, to retain various assembly tools including tools used for fastening (e.g., nailing, stapling, etc.), picking-up and dropping-off building parts, applying sheeting, mounting studs, cutting pockets and holes, etc. The end effector can also incorporate various sensors, including imaging sensors, force/toque sensors, proximity sensors, distance measurement sensors, etc.

The second end 1302a2, 1302b2, of each robotic arm 204, can include a drive or motion system. The drive or motion system can facilitate movement and translation of the robotic arm. For instance, the second end 1302a2, 1302b2 may include a drive system which slidably engages over a respective track 208a, 208b. As explained herein, the drive system may allow the assembly robots 204 to access different areas within the robot cell 1041. For example, this includes accessing different parts of the assembly building platform 210 or a staging area 1310. The assembly robot's drive system may also comprise any other suitable mechanism. For example, the assembly robots 204 can be mounted on moving wheels, etc.

As further shown, a building platform 210 may be interposed between the assembly robots 204a, 204b. Building platform 210 provides a surface for placing building parts during assembly. For example, as shown in FIG. 13B, the building platform 210 can be used as a mounting surface for mounting, assembling and fastening various building parts into a structure 1306. In some examples, the building platform 210 may comprise a table.

Robot cell 1041 may also include one or more staging areas 1310 (FIG. 13A). Staging areas 1310 can define areas within the robotic cell 104 where an inventory of building parts 1312 can be placed for use in assembly. For example, these can include raw and/or pre-cut building parts (e.g., studs, beams, sheets, etc.). The staging area 1310 can be continuously, or intermittently, replenished with new building parts. For example, the building parts can be stocked, re-stocked and/or replenished in the staging areas 1310 manually (e.g., by human operators). In other cases, the staging area 1310 can be re-stocked or replenished through automated mechanisms. For example, automated guided vehicles (AGVs) can deliver building parts to the staging area 1310.

As shown in FIG. 13A, each assembly robot 1304 may have a corresponding staging area 1310 from which to pick-up building parts. For instance, staging area 1310a may be associated with assembly robot 204a, while staging area 1310b may be associated with assembly robot 204b. In some example cases, the staging areas 1310 are stocked with building parts based on assembly tasks assigned to that robot (e.g., 310 in FIG. 3B). In other cases, as shown in FIG. 13C, there may be multiple staging areas 1310a1-1310a2 and 1310b1-1310b2 associated with each assembly robot 204a, 204b, respectively. For example, different staging areas may be dedicated to stocking different building part types. In other cases, there may be a single common or shared staging area 1310 for multiple assembly robots.

Figure 13D:
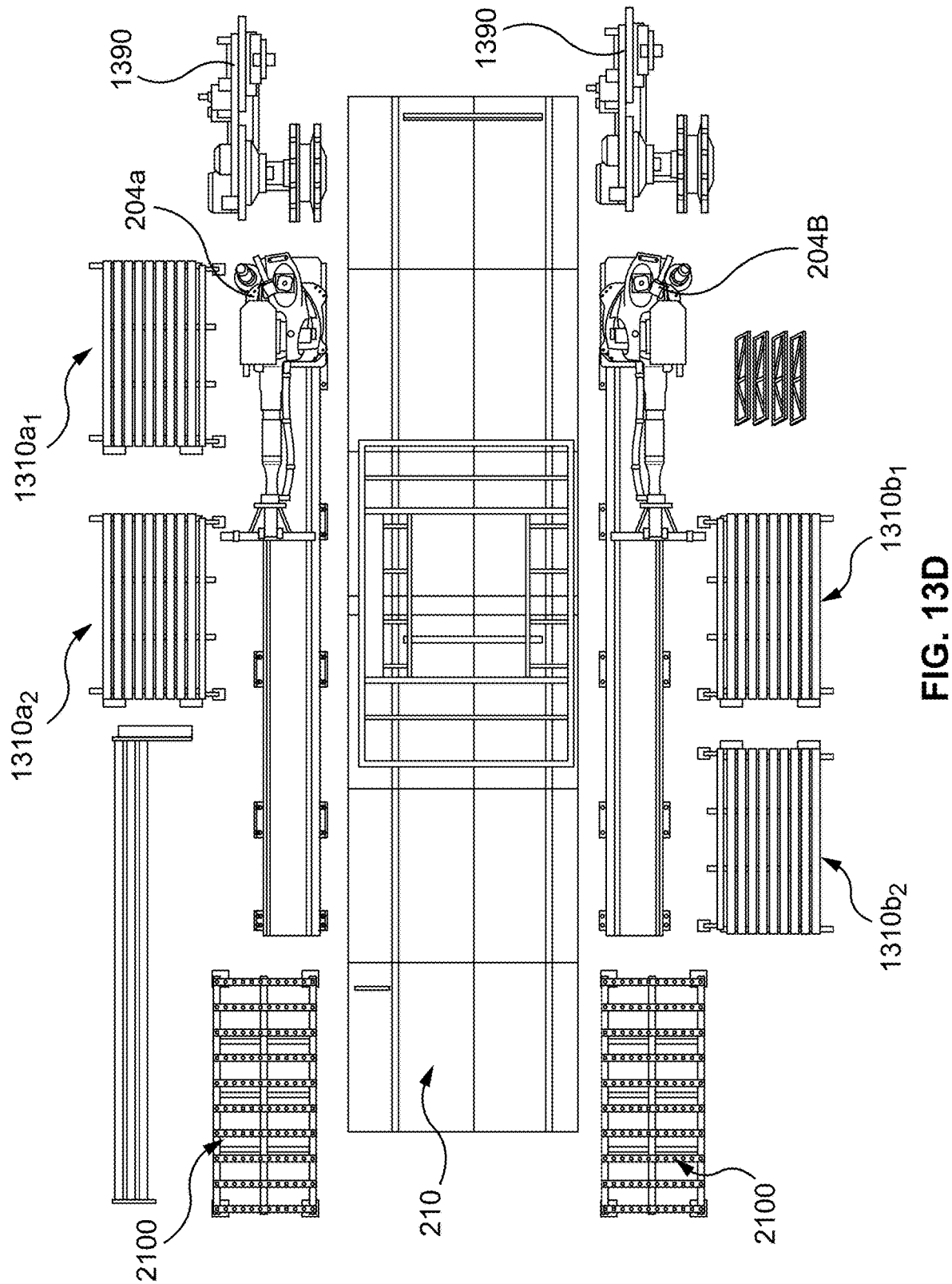
FIG. 13D is an illustration of still yet another example configuration for a robotic assembly cell.

FIG. 13D shows another example configuration for a robotic cell 104 providing a large assembly platform 210, as well as pre-cut stations 2100 and tooling stations 1390 provided on either side of the platform 210.

Figure 14A:
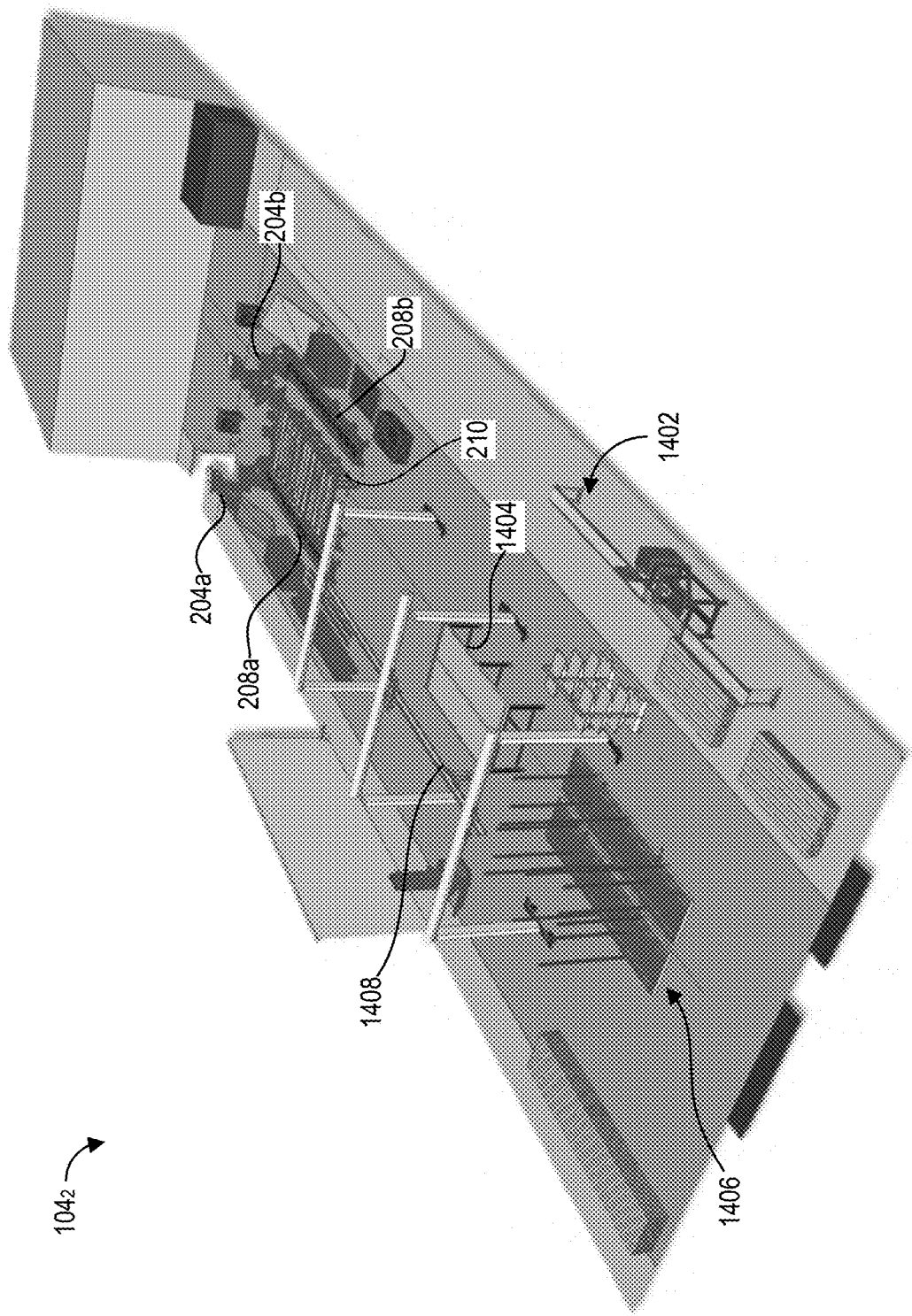
FIG. 14A is an illustration of an example configuration for a robotic assembly cell.
Figure 14B:
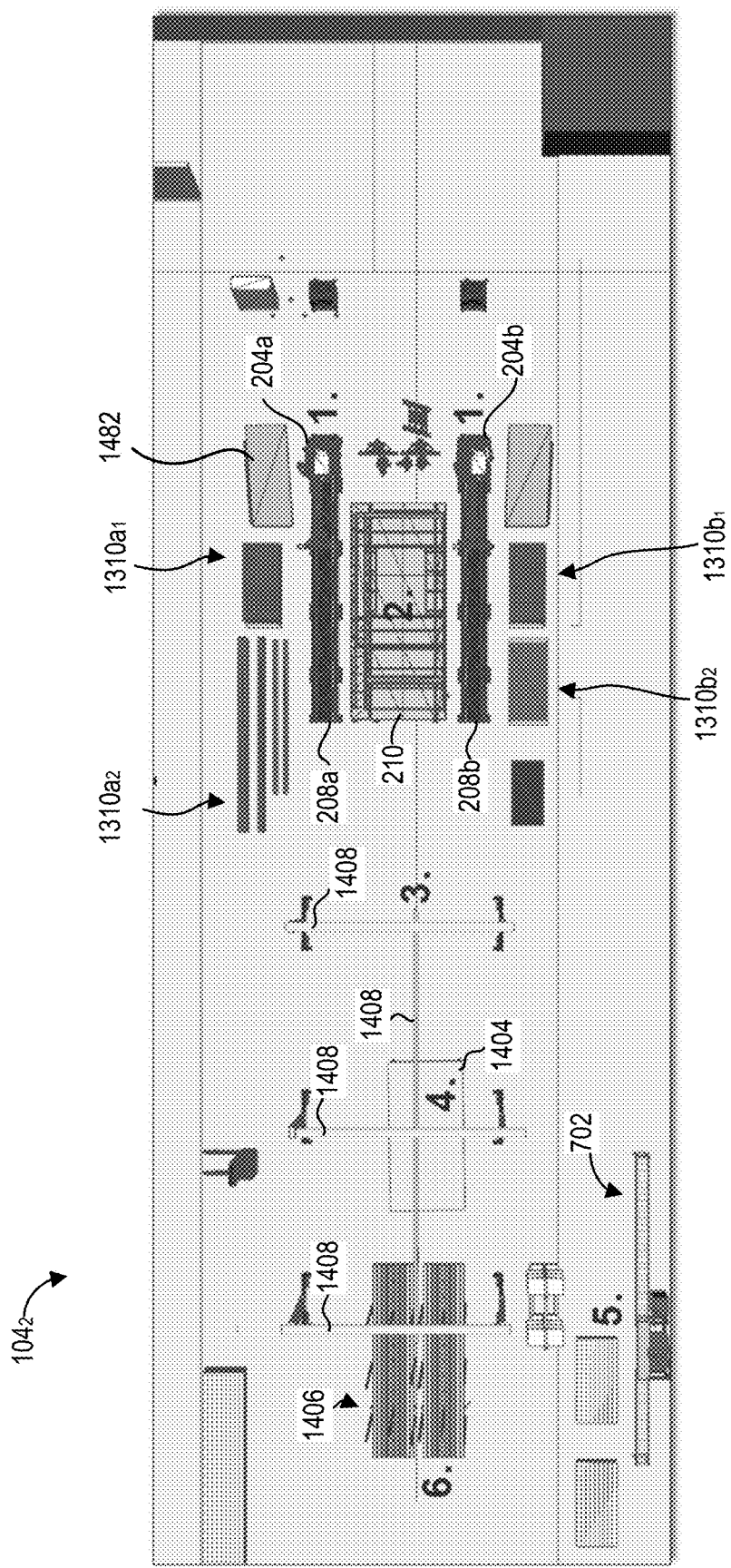
FIG. 14B is a top-down schematic illustration of an example configuration for a robotic assembly cell.

Reference is now made to FIGS. 14A and 14B, which illustrate another example configuration for a robotic assembly cell 1042.

Robotic cell 1042 is an augmented version of the robotic cell 1041 shown in FIGS. 13A-13C. As exemplified, the robotic cell 1042 may include additional systems and hardware to facilitate end-to-end assembly. For example, the robotic cell 1042 may include a cutting station 1402. Cutting station 1402 can cut building parts in preparation for assembly. In some examples, the cutting station 1402 can be an automated cutting station. For example, the cutting station 1402 may receive parts, and may automatically cut the parts to the correct dimensions. The correct dimensions may be determined, for example based on the type of building part, as well as the building structure incorporating the building part. In at least some cases, the cutting station 1402 may be connected to the cloud platform 106, and can be controlled based on commands received from the cloud platform 106.

Robotic cell 1042 can also include one or more features that integrate manual intervention, e.g., by human user operators, during automatic robotic assembly. For example, the robotic cell 1042 may include a manual adjustment station 1404. The manual adjustment station 1404 can allow manual adjustments to fully, or partially assembled structures. For example, depending on the structure being assembled, the assembly robots 204 may not be able to perform all of the tasks required, and manual assembly may be necessary. For instance, some building parts may be too small for the assembly robots 204 to pick-up and/or some areas may not be accessible due to the size of the robot and/or the tool used by the robot. In such cases, the assembled or partially assembled building structure is transferred to the manual adjustment table for manual modification.

In at least one example, there may be a conveyance mechanism to move parts or structures between the manual intervention areas, and the automated assembly areas. By way of example, the robotic cell 104 may include an overhead crane 1408 for transferring components between the building platform 210 and the manual intervention station 1404. In other cases, any other transport mechanisms can be used (e.g. AGV, conveyor belt or specialized forklift).

Robotic cell 104 can also include a handling station 1406 for handling the final product and/or transporting the final product outside the robotic cell 104.

VI. Example Perception Sensor System

The following is a discussion of a perception sensor system. The perception sensor system may be used stand-alone or in any combination or sub-combination with any other feature or features described herein.

As provided herein, the perception sensor system can include one or more imaging sensors that are installed, or positioned at various locations within and around the robotic assembly cell 104. For example, this can include imaging sensors installed on the assembly robots 204, building platform 210, among other locations. The imaging sensors can include, for example, cameras or laser sensors (e.g., LIDAR, structured light vision systems, etc.). In some embodiments, any captured images may be processed to generate high dynamic range (HDR) images. Conversion of the captured images to HDR images may reduce shadowing and overexposure effects in the captured images.

In other examples, the perception sensor system can also include one or more force sensors. The force sensors can add another dimension to the perception capabilities of the system, and enables the sense of touch. A real-time force/torque feedback is provided by the force sensors located at the end effector, and allow for numerous applications such as: (i) detection of collision between the tool and environment for safety applications (ii) detection of touch between the tool, load and the frame during assembly process to ensure two adjacent elements are touching; (iii) mitigating a potential harm to the robot, tool, load and the environment; (iv) aligning components (e.g. OSB panels); and/or (v) sensing the touch of the tool (e.g. nail/staple gun, screw driver, glue gun, taping gun, router, scraper etc.) and the component and applying proper torque and force.

In some example cases, a perception software system is provided, which receives sensor data (e.g., images or videos, or force or torque data) from the perception sensor system, and analyzes the sensor data. The perception software system may be hosted on a local server or processor of the robotic cell 104 (including local server 112), or otherwise, on the cloud platform 106. In some examples, one or more sensors (e.g., a camera used to acquire images) may include edge computing capabilities to process the acquired data. Edge computing may enable reduction in latency and/or reduction in communication resource requirements.

To this end, images (e.g., 2D or 3D image) or videos captured by the imaging sensors of the perception system can be analyzed by the perception software system for various purposes including quality assessment of building parts, post-assembly inspection of building structures and/or real-time collision avoidance. With respect to collision avoidance, the perception system can identify potential collisions in real-time or near real-time by monitoring robots and dynamic objects in the surrounding environment. The perception system can also be used, more generally, for enhanced safety by detecting human users in the vicinity, checking if the assembly platform 210 is clear, as well as for robot pose correction relative to objects (or building parts) requiring picking-up or dropping-off.

Figure 15:
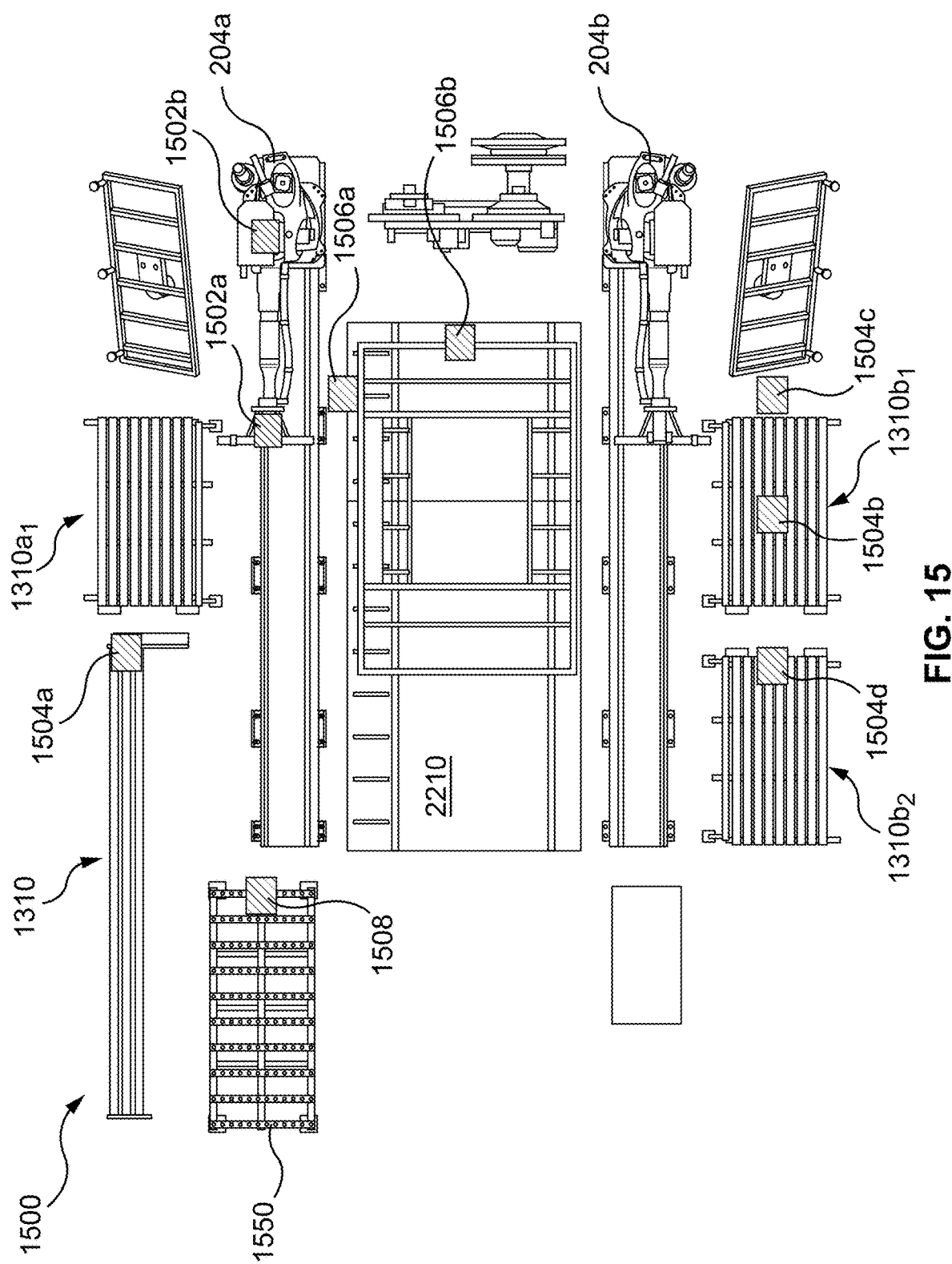
FIG. 15 is an example configuration of a perception sensor system.

Reference is now made to FIG. 15, which shows an example configuration for a perception sensor system 1500.

As explained above, the perception sensor system (e.g., 508c in FIG. 5C) may include one or more sensors positioned at various locations around, and within, a robotic cell 104. The sensors can include one or both of imaging and force sensors. The imaging sensors can include one or more of 2D images and/or 3D images. The images can also be color and/or grey scale images.

Figure 17:
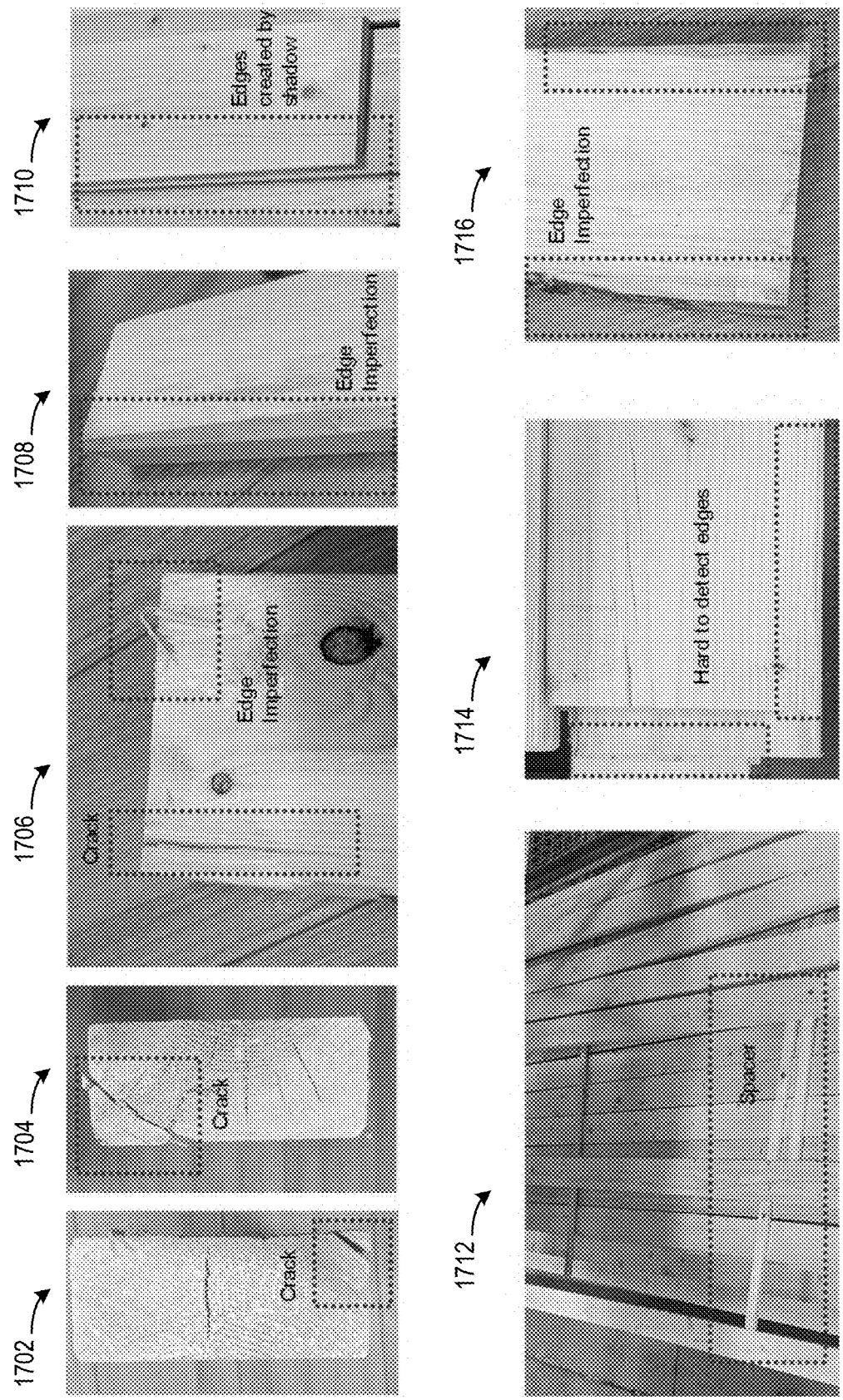
FIG. 17 shows various images of building parts having various defects.

In the illustrated example, the position sensor system can include one or more imaging sensors 1502, 1504 located over, or around the assembly robots 204. In some example cases, images captured by imaging sensors 1502, 1504 can be used for: (i) real-time collision avoidance and safety—monitoring for obstacles in the assembly robot's motion pathway that may otherwise obstruct motion of the assembly robot. Obstacles may include other assembly robots, or otherwise any dynamic objects moving in the environment (e.g., near-by human operators); (ii) object detection and verification—capturing images to locate objects (or building parts) requiring pick-up and assembly, and further verifying that the correct object has been picked-up, or the object is picked-up in the correct orientation; (iii) object grasp verification—verifying that a picked-up object is grasped correctly by the assembly robot; and/or (iv) object quality inspection—after (or before) a building part is picked-up, it may be imaged to detect any flaws that compromise the quality of the building part. Building parts that are poor quality may not be used for assembly. For example, as shown in images 1702 and 1704 (FIG. 17), this can include detecting various cracks and fissures; (v) building part re-alignment, or otherwise robot pose correction; and/or (vi) post-assembly inspection of building structures—images of assembled, or partially assembled, building structures can be inspected to automatically identify defects in requiring modification.

Figure 16:
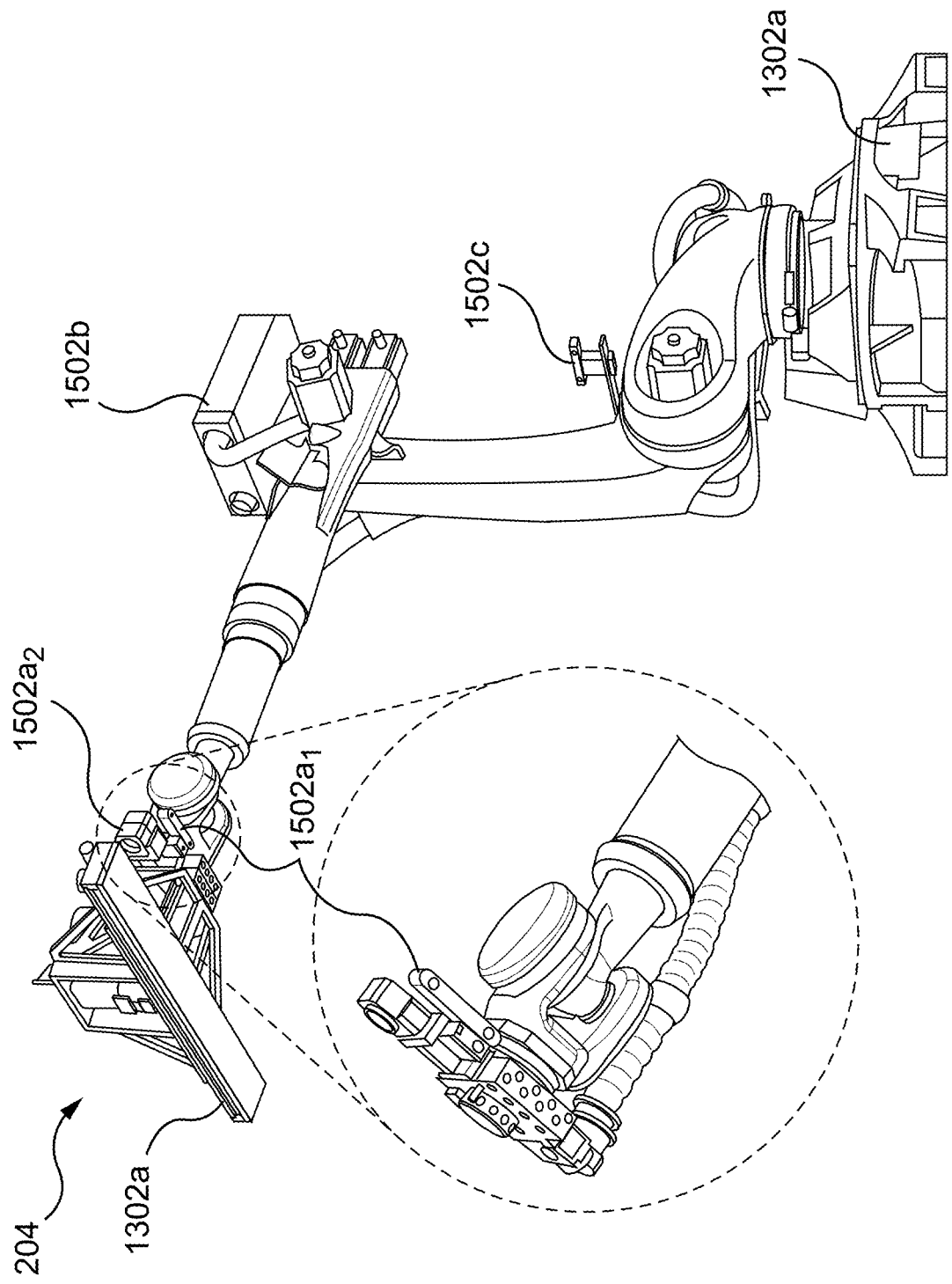
FIG. 16 illustrates an example assembly robot and example locations of imaging sensors on the assembly robot.

In more detail, FIG. 16 shows example locations around an assembly robot 204 where imaging sensors can be installed. As shown, one or more imaging sensors 1502a1 may be installed around the end effector 1302a. In this position, the imaging sensors can be used for object detection, object verification, object feature detection and quality inspection, post-assembly inspection, as well as pre-production inspection (e.g., scanning if the building table 210 is clear for assembly). One or more imaging sensors 1502a2 can also be installed rearward of the end effector 1302 to achieve the same result.

In some examples, imaging sensors 1502b, 1502c can be also mounted along a mid-portion of the assembly robot 204. These imaging sensors may be able to capture a more wide-view perspective of the assembly robot's actions. Accordingly, images captured by sensors 1502b, 1502c can be used for collision avoidance, object verification, grasp verification as well as object feature detection. These imaging sensors can also be used to verify that the building platform 210 is clear for assembly.

Referring back to FIG. 15, one or more imaging sensors 1504a-1504d may also be installed around staging areas 1310. These imaging sensors can be used to identify, detect and verify which building parts are located at which staging areas. This can be used by the perception software system to guide the assembly robot to picking-up the correct building part from the correct staging area 1310.

Imaging sensors 1506a-1506b may also be mounted to, or around, the assembly building platform 210. Images captured by these sensors can provide a view of both the assembly on the building platform 210, as well as a view of the assembly robot 204 positioned over the building platform 210.

Figure 18A:
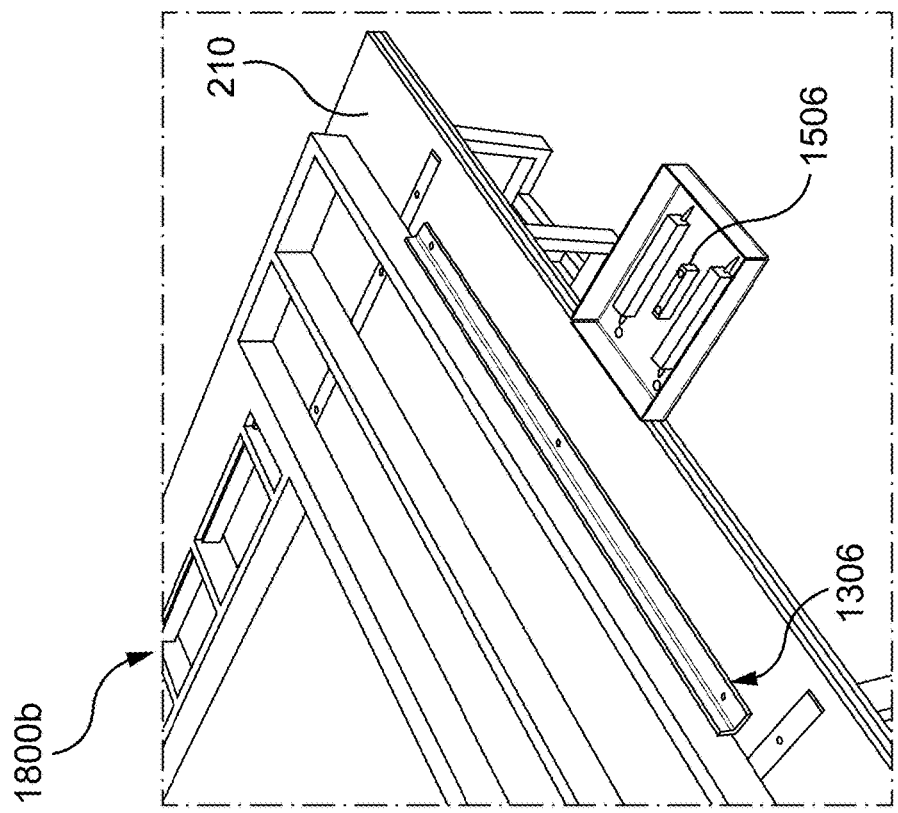
FIG. 18A is an example positional setup for an imaging sensor on an assembly building platform.
Figure 18B:
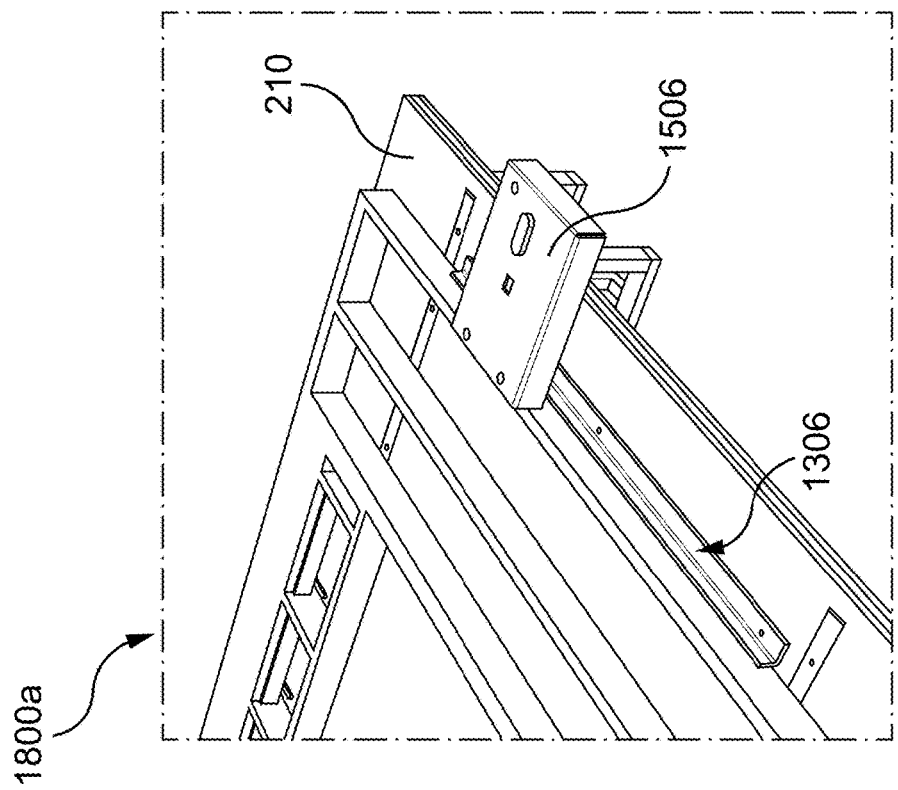
FIG. 18B is another example positional setup for an imaging sensor on an assembly building platform.

To this end, images captured by these sensors can be used to verify correct alignment of building parts on the assembly platform 210. Captured images can also be used for object verification (e.g., verifying the assembly robot has picked-up the correct object), as well as grasp verification by the assembly robot. FIGS. 18A and 18B illustrate different orientation poses 1800a, 1800b for imaging sensors 1506 relative to the assembly building platform 210. In some embodiments, imaging sensors 1506 may be movable along each side of assembly platform 210 to capture images corresponding to different portions of assembly platform 210.

One or more sensors 1508 may also be positioned over a pre-cut table 1550. Sensors 1508 can be used, for example, to detect objects (e.g., building parts) located on the pre-cut table, as well as their position and orientation. This can assist the assembly robots 204 in properly engaging and picking-up these parts.

Figure 19A:
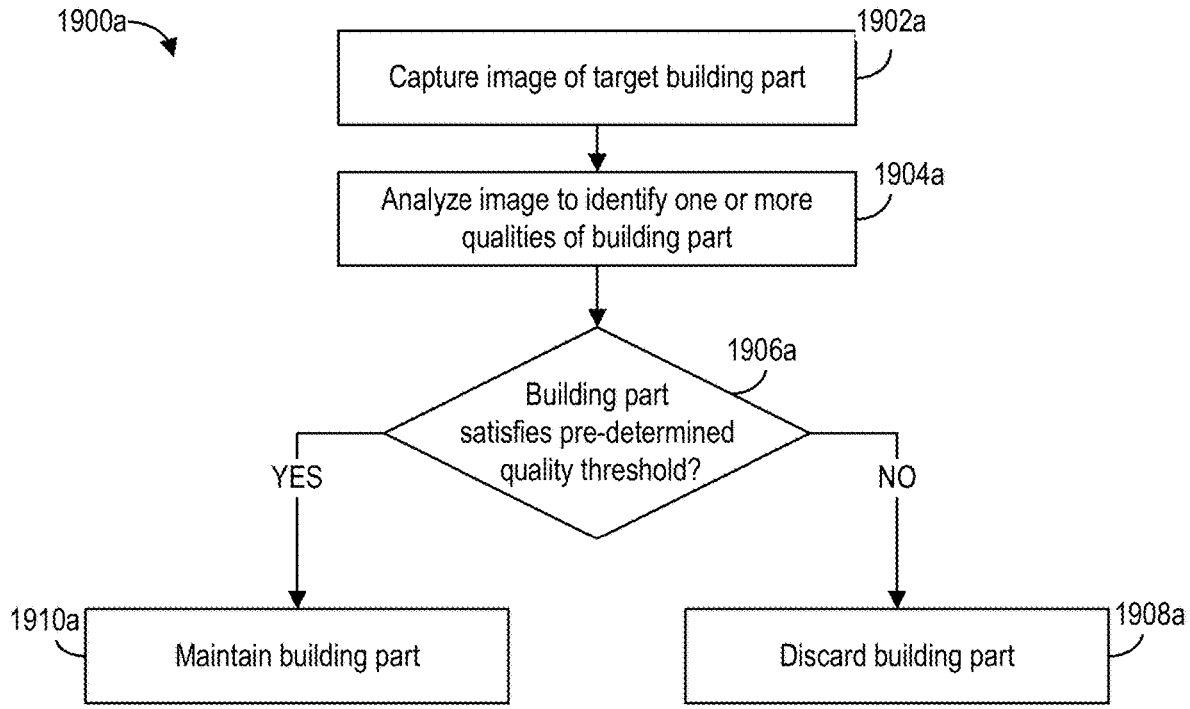
FIG. 19A is a process flow for an example method for initial quality inspection of building parts.

Reference is now made to FIG. 19A, which shows an example method 1900*a* for initial quality inspection of building parts using the perception sensor system. Method 1900*a* can be performed in real-time or near real-time by a local processor of the robotic cell 502*c* (FIG. 5C), or otherwise by the cloud platform 106.

More particularly, the quality inspection in method 1900*a* can be conducted prior to assembly of a building structure. For example, method 1900*a* can be performed to sort building parts in the staging area 1310 (e.g., FIG. 13C) as qualified or unqualified for use in assembly.

At 1902*a*, an image of a target building part is captured. The target building part may be, for instance, a stud which requires quality inspection. The images can be captured using image sensors in the perception system. In one example, the images are captured using one or more imaging sensors 1502 on the assembly robot 204 (FIG. 16). The images can be captured from various angles and perspectives. For example, an assembly robot 204 can pick-up building parts one by one, from a stack in the staging area 1310, and may image each building part in turn.

At 1904*a*, the captured images are analyzed to determine one or more properties of the corresponding building part. For example, this can involve determining whether the building part includes any cracks (e.g., images 1702-1706 in FIG. 17), or edge imperfections (1706-1708 in FIG. 17). In the case of studs, this can also involve determining whether the stud has a stud crown, etc. Various image analysis techniques can be used to determine properties of the imaged building parts. For instance, these include edge detection and edge analysis methods, image classification using trained machine learning models, three-dimensional (3D) image analysis for shape analysis using either machine learning-based or iterative closest point (ICP)-based methods to determine deviations from expected shape.

In some example cases, the properties assessed at act 1904*a* may vary depending on the building part. For example, the system may analyze different building parts for different types of imperfections. Accordingly, at 1904*a* the system may initially determine the building part type that is being imaged, and may then analyze the image for one or more properties associated with that building part type. The system may initially determine the building part type either by analyzing the image, or based on pre-defined knowledge of where the building part was retrieved from.

The properties assessed at 1904*a* may also vary based on the building structure being assembled. For example, building parts can be evaluated for different properties having regard to the requirements of the building structure being assembled.

At 1906*a*, a determination is made as to whether the building part meets a pre-determined minimum quality threshold. This determination is made based on the one or more properties determined at act 1904*a*. For example, the minimum quality threshold may involve determining that a building part does not include any imperfections (e.g., cracks or edge imperfections). Therefore, if any imperfections are detected at act 1904*a*, then the minimum quality threshold is not met.

In other cases, imperfections may be tolerated, but only to a certain degree. For example, cracks can be categorized as small/minor, medium or large/significant (e.g., depending on their length, width and/or depth). If the crack is categorized as large/significant, then the building part may not meet the minimum quality threshold. In still other cases, the quantity/number of imperfections can be a determinator of whether or not the minimum quality threshold has been met.

In at least some cases, the minimum quality threshold is building part specific. That is, different types of building parts may have different corresponding criteria for meeting the minimum quality threshold. The minimum quality threshold can also vary based on the building structure which incorporates the building part. For example, different types of building structures (e.g., wall panels, etc.) may again have different minimum quality threshold requirements.

In some examples, the minimum quality threshold can simply determine whether the building part can be used in robotic assembly. If the minimum quality threshold is not met, the building part may still be useful for manual assembly, which can more easily accommodate for certain defects in the building part, e.g., defects relative to the level of crown or the twist in a stud.

Accordingly, in at least one example, act 1906*a* can involve determining whether the building part meets two thresholds—a higher threshold for robotic assembly, and a lower threshold for manual assembly.

At 1908*a*, if the building part does not meet a pre-determined minimum threshold—it may be discarded at 1908*a*. For example, it may be moved to a separate area of the robot cell 104 corresponding to a discard pile or stack. In other cases, the part is only discarded if it does not meet the lower threshold, for manual assembly. If the part meets the manual threshold, but not the robotic assembly threshold—it may be moved to a separate area designated for manual assembly parts.

Otherwise, at 1910*a*, if the building part satisfies the minimum quality threshold, it can be maintained for assembly. For example, the assembly robot 204 can move the building part to a qualified pile or stack. In other cases, the assembly robot 204 may simply assemble the building part by mounting it (i.e., installing it) into the building structure.

Figure 19B:
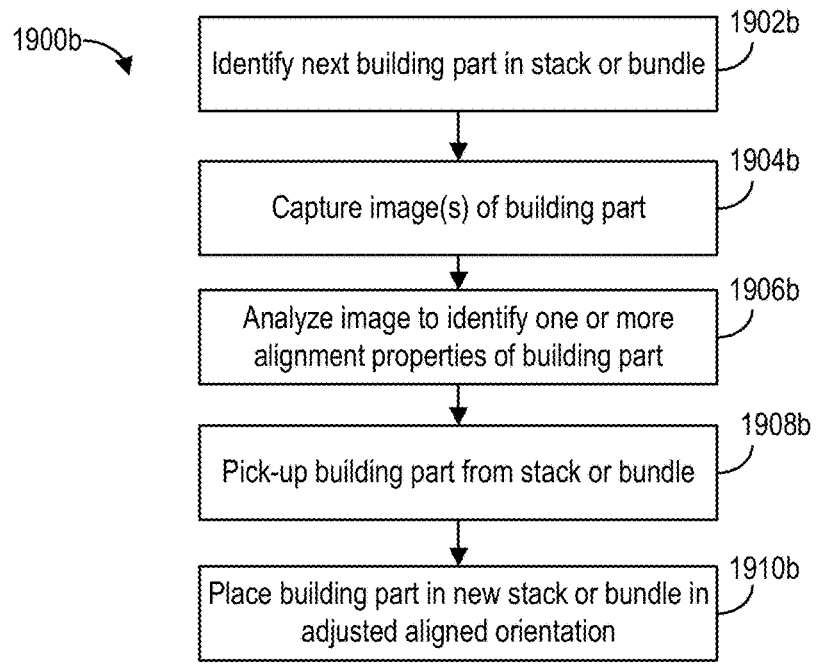
FIG. 19B is a process flow for an example method for detecting alignment properties of building parts, and in some examples, aligning a stack or bundle of building parts.

Reference is now made to FIG. 19B, which shows an example method 1900*b* for aligning building parts.

Building parts, which are stacked in the staging areas 1310, may not be initially stacked in proper alignment. For example, some building parts (e.g., studs, etc.) may be shifted or rotated in the stack relative to other stacked parts. This may cause problems when the building parts are later picked-up from the stack for assembly. Prior to assembly, it may therefore be desirable to align the stack such that all building parts are aligned in the same orientation.

At 1902*b*, the assembly robot 204 can identify an initial or next building part, in a stack of building parts. For example, this can simply correspond to the building part located at the top of the stack. In a stack of unaligned building parts, act 1902*b* may require applying an edge detection technique to separately identify the building part at the top of the stack from other building parts located underneath. For instance, as shown in images 1710 and 1714 in FIG. 17, in some cases the edges of stacked building parts can be challenging to identify, e.g., as a result of shadows produced by overlapping building parts. In more detail, a three-dimensional image of the stack can be captured (e.g., rather than a 2D image), and the edge detection can be applied to the 3D image which facilitates overcoming issues with shadows, etc. that may obscure edges in a 2D image.

At 1904*b*, one or more images can be captured of that building part (i.e., identified at act 1902*b*). For example, as stated previously with respect to act 1902*a*, the images can be captured by imaging sensors located throughout the robotic cell 104, including imaging sensors located on the assembly robot 204.

At 1904*b*, the images of the building part are analyzed to determine one or more alignment properties of the building part. The alignment properties can refer, for example, to the orientation of the building part.

At 1906*b*, the building part can be picked-up from the stack and bundle. At 1908*b*, the building part can be placed in a new stack in an adjusted aligned orientation. The determination as to how to re-orient each building part can be based on the alignment properties, corresponding to that part, as determined at act 1904*b*. Accordingly, in applying method 1900*b* iteratively, a new stack is produced having aligned building parts which can be used for assembly.

In other cases, once act 1904*b* is complete—the alignment properties can be used to immediately and properly mount, or install the building part into the target building structure.

Figure 19C:
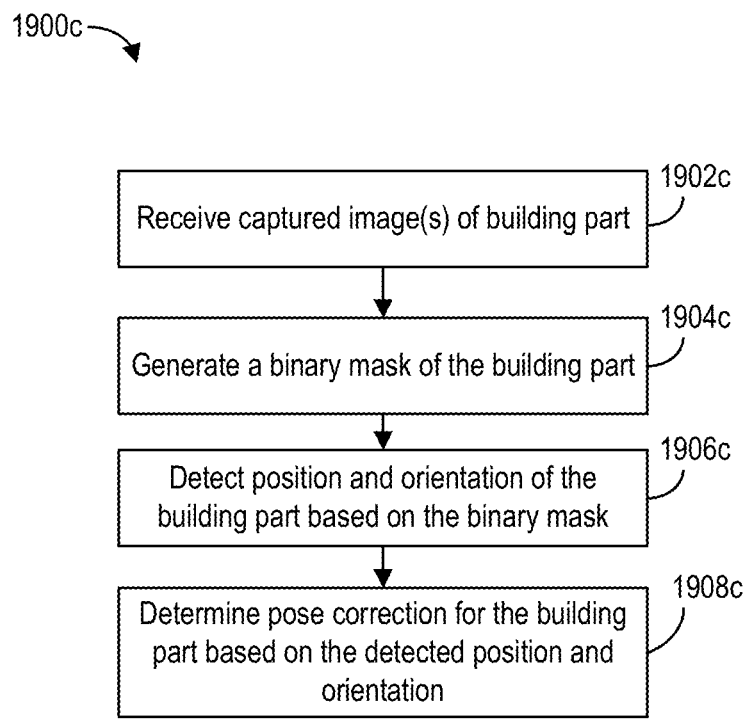
FIG. 19C is a process flow for an example method for pose correction of a building part.

Reference is now made to FIG. 19C, which shows an example method 1900*c* for pose correction of a building part. Method 1900*c* can be an expansion of act 1904*b* of FIG. 19B.

Figure 19D:
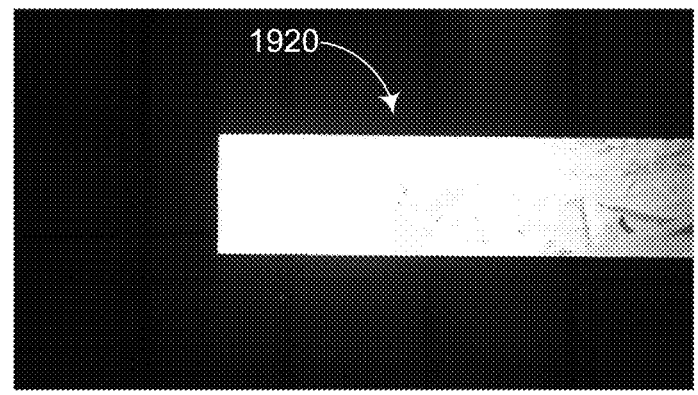
FIG. 19D is an example captured image of a building part.

At 1902*c*, one or more captured images of a building part may be received. Reference is now made to FIG. 19D, which shows an example captured image of a building part 1920. The images can be captured by imaging sensors located throughout the robotic cell 104, including imaging sensors located at the end effector of assembly robot 204.

Multiple captured images may be used for a building part that is too large to be captured in a single image. Any suitable stitching algorithm may be used to stitch together the multiple captured images. Alternatively, a higher-resolution imaging device at a zoom-out setting sufficient to capture the large building part may be used. However, higher computing resources may be required for processing the higher-resolution images acquired by the higher-resolution imaging device.

In some embodiments, multiple captured images may be processed to generate HDR images at 1902*c*. Conversion of the captured images to HDR images may enable improved segmentation of the building parts by increasing image sharpness and/or reducing shadowing and overexposure effects in the captured images.

Figure 19E:
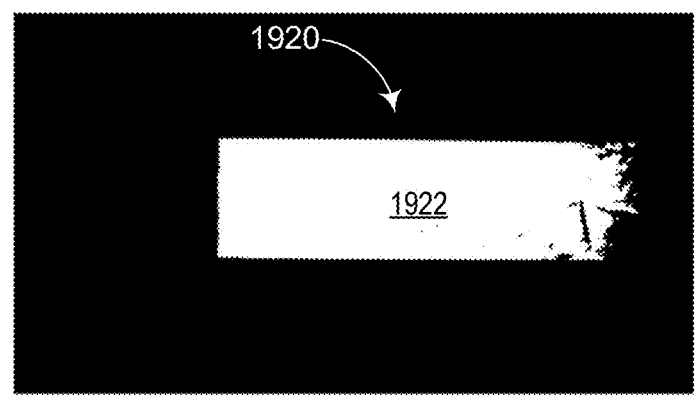
FIG. 19E is an example binary mask image generated by processing the example captured image of FIG. 19D.

Referring back to FIG. 19C, at 1904*c*, a binary mask of the building part may be generated. The binary mask can isolate a surface of the building part that is perpendicular to the imaging device. Reference is now made to FIG. 19E, which shows an example binary mask that isolates surface 1922 of building part 1920 by processing the captured image shown in FIG. 19D. The binary mask may be generated using any suitable image-processing algorithm. For example, the binary mask may be generated using a k-means clustering algorithm. In some embodiments, the binary mask may be generated using a machine learning model. Any suitable machine learning model may be used, for example, Segment Anything Model (SAM), Vision Transformer Detector (ViTDet) etc.

Figure 19F:
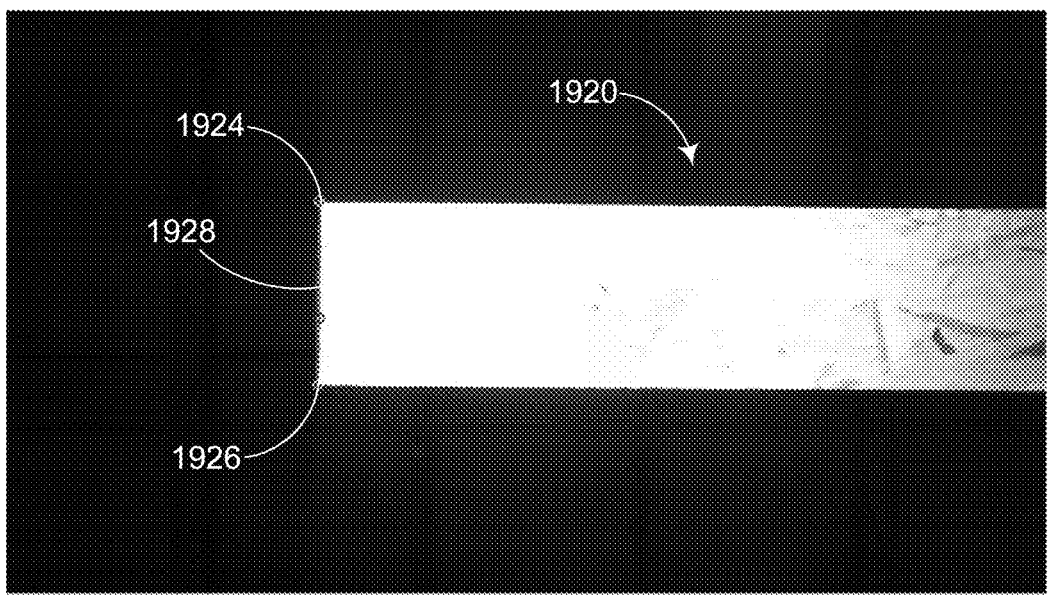
FIG. 19F is an example image showing corner and orientation detection of the building part based on the example binary mask image of FIG. 19E.

Referring back to FIG. 19C, at 1906*c*, the position and orientation of the building part may be detected based on the generated binary mask. A detection algorithm may be used to detect any suitable features of the binary mask to detect the position and orientation of the building part. For example, the detected features may include a line, a corner etc. In some embodiments, the detected corner feature may include a right-angled corner that is detected using a right-angle matching algorithm, for example, using a Hough transform and Iterative Closest Points (ICP) algorithm. Reference is now made to FIG. 19F, which shows two right-angled corners 1924 and 1926 detected for building part 1920. An orientation of edge 1928 of building part 1920 can be detected based on the detected corners.

Referring back to FIG. 19C, at 1908*c*, a pose correction may be determined for the building part by comparing the position and orientation detected at act 1906*c* with a reference position and orientation of the building part. Assembly robot 204 may be commanded to execute actions to transform the position (e.g., execute x-y displacement action) and orientation of the building part from the detected orientation to the reference orientation.

In some examples, alternative methods (to method 1900*c*) may be used for pose correction of a building part. One example alternative method uses a structured light method where a known light pattern can be projected onto the building part.

Figure 19G:
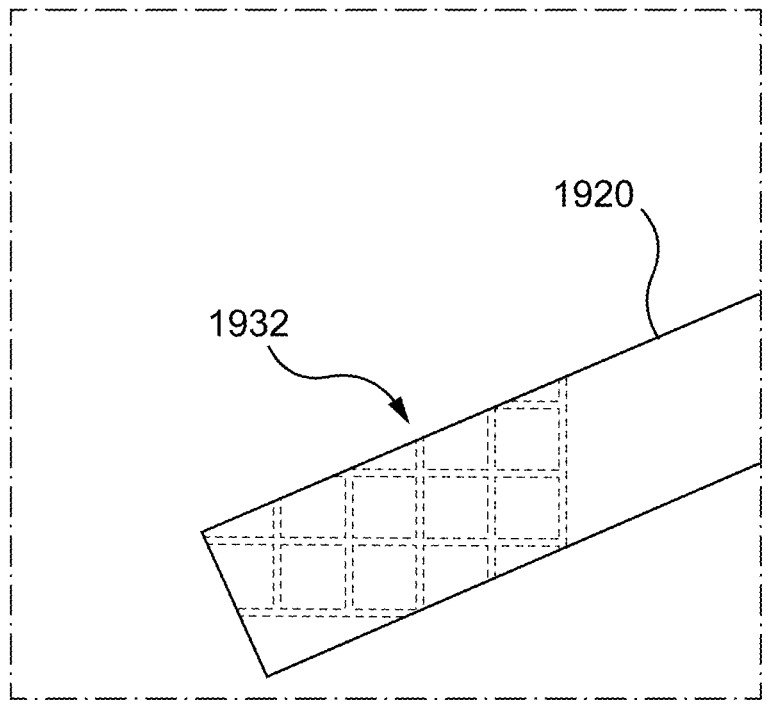
FIG. 19G is an example image of a grid pattern structured light projection onto a building part.
Figure 19H:
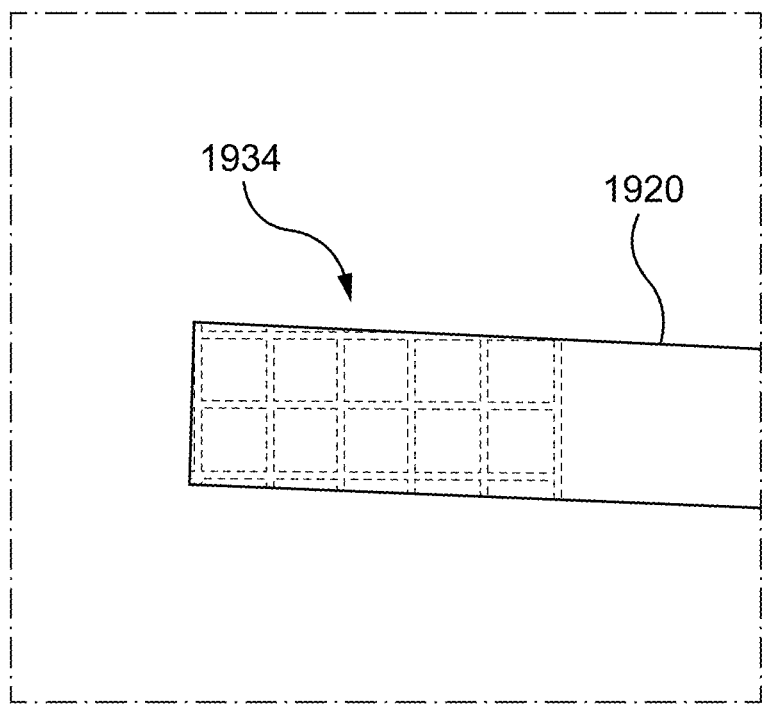
FIG. 19H is an example image of a reference structured light projection corresponding to a reference orientation of the building part shown in FIG. 19G.

Reference is now made to FIGS. 19G and 19H. FIG. 19G shows an example image of a grid pattern structured light projection 1932 onto building part 1920. FIG. 19H shows an example image of a reference structured light projection 1934 corresponding to a reference orientation of building part 1920. A fitting algorithm may be used to compare the structured light projection 1932 with reference structured light projection 1934. The fitting algorithm can determine the required pose correction for building part 1920 so that structured light projection 1932 matches reference structured light projection 1934. The determined pose correction also corresponds to reorienting building part 1920 into its reference orientation. The structured light method may be less sensitive to ambient lighting conditions and material properties of the building part compared with method 1900*c*.

Figure 19I:
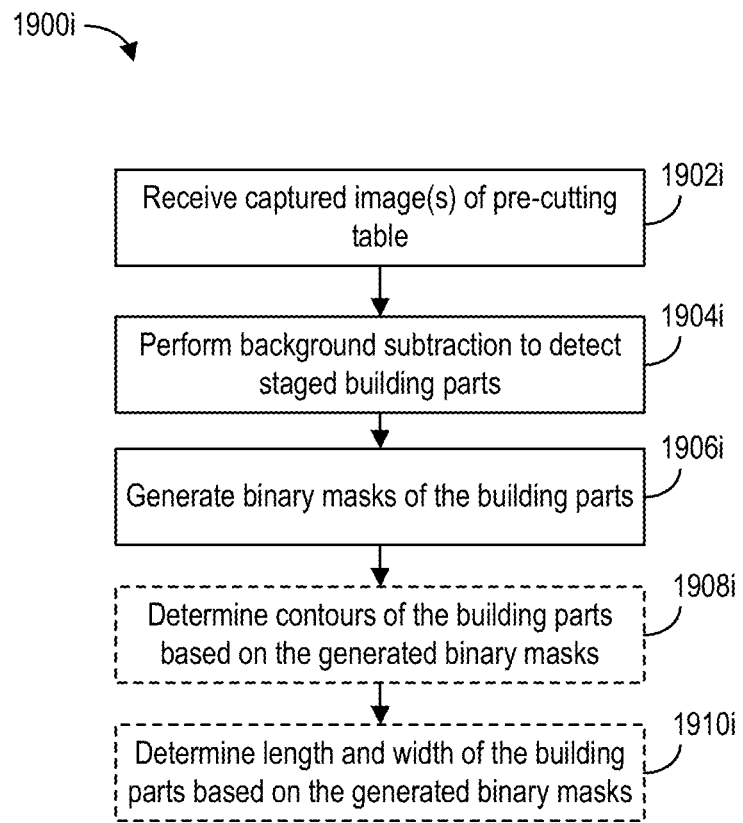
FIG. 19I is a process flow for an example method for verifying that building parts are correctly staged (position and orientation) on a pre-cut table.

Reference is now made to FIG. 19I, which shows an example method 1900*i* for verifying that building parts are correctly staged (position and orientation) on a pre-cut table. The pre-cut table can be for example, pre-cut table 2100 shown in FIGS. 21A-21C or pre-cut table 2160 shown in FIG. 21D.

Figure 19J:
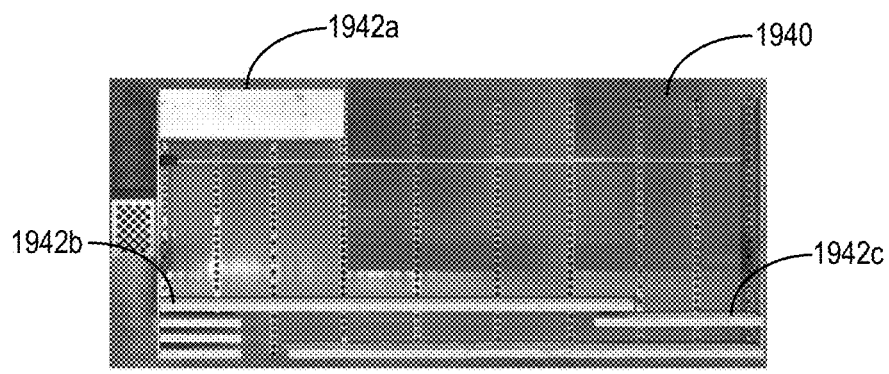
FIG. 19J is an example captured image of a pre-cut table.

At 1902*i*, one or more captured images of a pre-cut table may be received. Reference is now made to FIG. 19J, which shows an example captured image of a pre-cut table 1940. In the illustrated example, the captured image is a top-view image of the pre-cut table. In other examples, an angled or oblique view may also be used. Pre-cut table 1940 may have multiple building parts (e.g., building parts 1942*a*-1942*c* labelled in FIG. 19J) staged for assembly.

Multiple captured images may be used for a pre-cut table that is too large to be captured in a single image. Any suitable stitching algorithm may be used to stitch together the multiple captured images. For example, three captured images are stitched together to form the example image illustrated in FIG. 19J.

In some embodiments, multiple captured images may be processed to generate HDR images at 1902*i*. Conversion of the captured images to HDR images may enable improved segmentation of building parts located on the pre-cut table by increasing image sharpness and/or reducing shadowing and overexposure effects in the captured images.

Figure 19K:
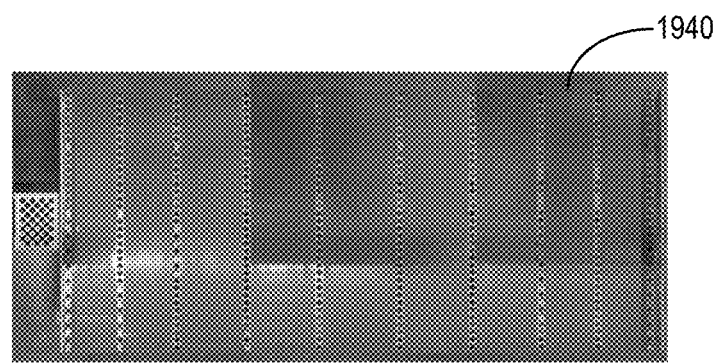
FIG. 19K is an example background image of the pre-cut table of FIG. 19J.

Referring back to FIG. 19I, at 1904*i*, background subtraction of the received image may be performed to detect staged building parts. The background subtraction may be performed using a background image of the pre-cut table having no staged building parts. In some examples, the background image may be stored in a database and retrieved at act 1904i. Reference is now made to FIG. 19K, which shows an example background image of pre-cut table 1940 having no staged building parts.

Figure 19L:
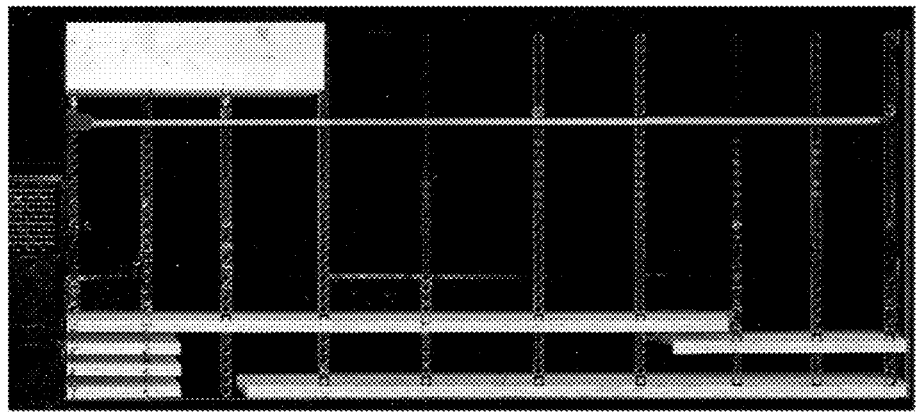
FIG. 19L is an example image generated by performing background subtraction on the image of FIG. 19J.

The background subtraction may be performed using any suitable algorithm. For example, MOG2 background subtraction may be used at act 1904i. Reference is now made to FIG. 19L, which shows an example image generated by performing the background subtraction at act 1904i.

Figure 19M:
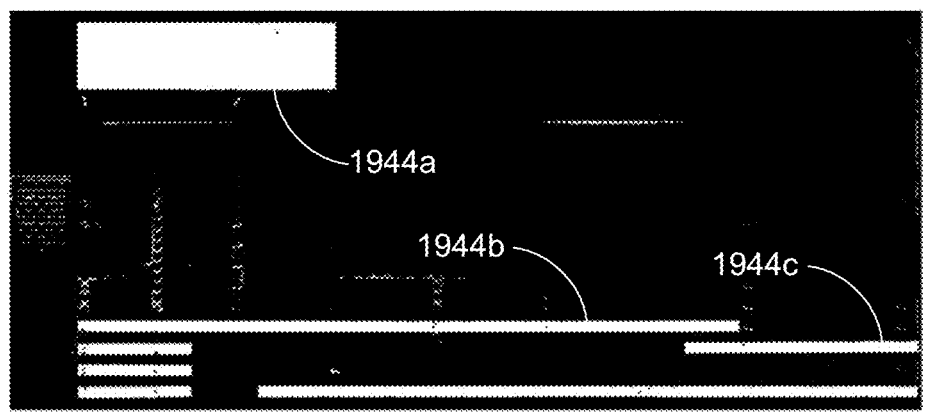
FIG. 19M is an example image showing binary masks generated for building parts staged on the pre-cut table of FIG. 19J.

Referring back to FIG. 19I, at 1906i, binary masks of the staged building parts may be generated based on the background subtraction. The binary masks can isolate the different staged building parts. Reference is now made to FIG. 19M, which shows example binary masks 1944a-1944c corresponding to staged building parts 1942a-1942c. The binary masks may be generated using any suitable image-processing algorithm. For example, the binary masks may be generated using a k-means clustering algorithm.

In some embodiments, the binary mask may be generated using a machine learning model. Any suitable machine learning model may be used, for example, Segment Anything Model (SAM), Vision Transformer Detector (ViTDet) etc. The machine learning model may directly generate the binary masks based on the captured images or the HDR images. Referring back to FIG. 19I, in such cases, the background subtraction at 1904i may not be performed and method 1900i may proceed directly from 1902i to 1906i. This may reduce the cost and/or complexity of method 1900i by avoiding the need for background images (with updated background images being generated periodically) and performance of the background subtraction.

Figure 19N:
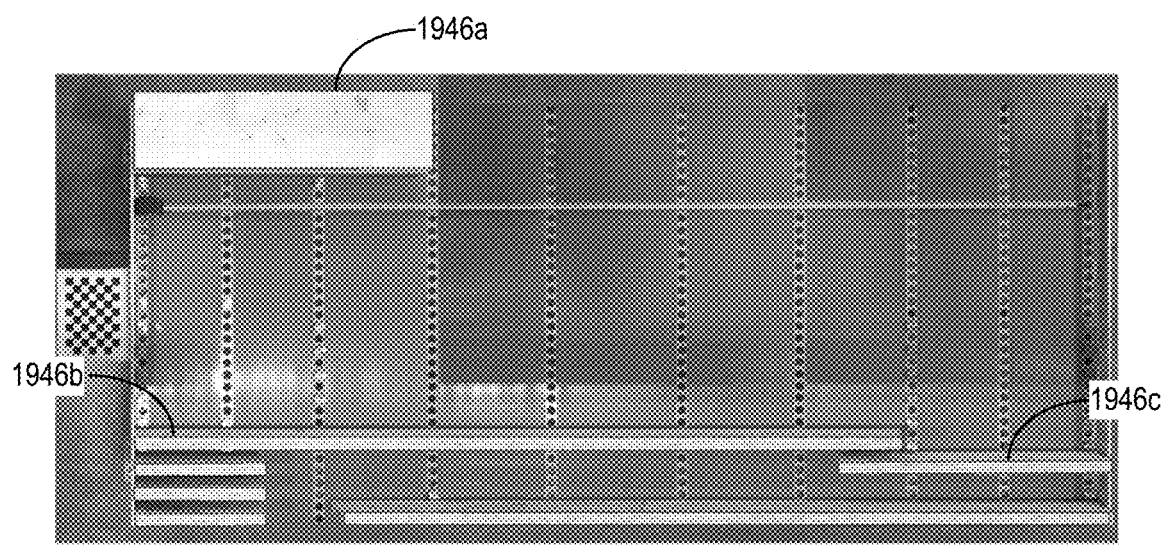
FIG. 19N is an example image showing contours determined for the building parts staged on the pre-cut table of FIG. 19J.

Optionally, at 1908i, the contours of the staged building parts may be determined based on the generated binary masks. Any suitable image processing algorithm may be used to determine the contours. For example, a bounding box algorithm may be used to define minimum area rectangles around each of the binary masks. Reference is now made to FIG. 19N, which shows contours 1946a-1946c defined corresponding to staged building parts 1942a-1942c. In other examples, contours with different shapes may be determined, e.g., circular contours.

The determined contours may be compared with reference contours of the staged building parts. The comparison can be used to verify whether the building parts are correctly staged (position and orientation) on the pre-cut table. An error notification may be generated for any detected mismatches. The error notification may be provided to a user (e.g., via computer terminal 102). The error notification may include an indication of the incorrectly staged building part and action may accordingly be taken to correctly stage the corresponding building part.

Optionally, contours may not be determined at 1908i and the length and width of the staged building parts may be determined at 1910i, based on the generated binary masks. For an example pre-cut table 2160 shown in FIG. 21D, all the staged building parts may be aligned at one side that is supported by a crossbeam. An average length may be directly determined based on a measurement of edge pixels corresponding to a side that is supported and aligned. The determined length may be compared with a reference length to verify that the building parts are correctly staged on the pre-cut table.

In some examples, alternative methods (to method 1900i) may be used for verifying that building parts are correctly staged (position and orientation) on a pre-cut table. One example alternative method uses a structured light method where a known light pattern can be projected onto the staged building parts. A suitable image processing algorithm may be used to compare the structured light projection patterns with reference structured light projection patterns corresponding to correctly staged building parts. The comparison results may be used to verify whether building parts are correctly staged on the pre-cut table.

Another example alternative method may use any suitable vision-based identifier that is positioned on each building part. For example, the identifier can be a barcode, a QR code, a label or any other visual cue. Captured images can be analyzed and the building parts can be verified based on a comparison of the detected identifier with reference identifiers corresponding to correctly staged building parts.

Figure 19O:
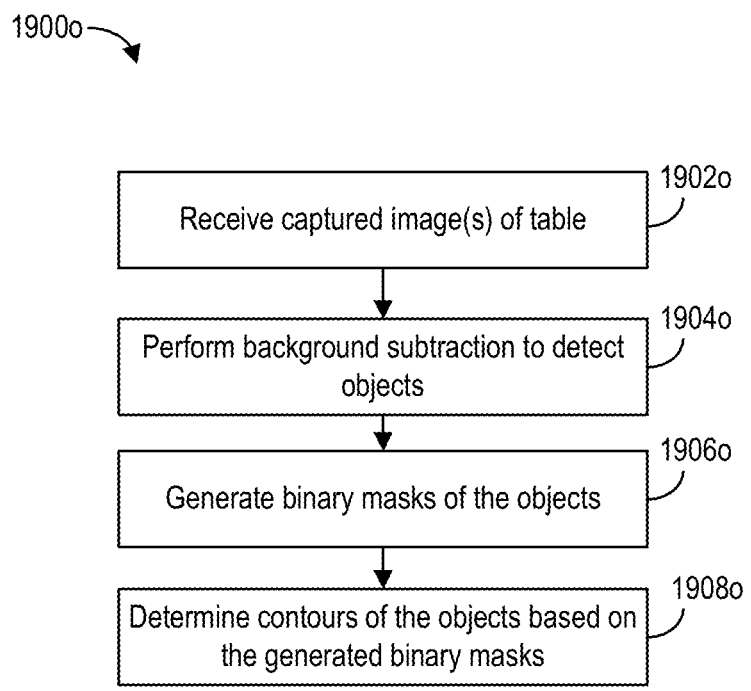
FIG. 19O is a process flow for an example method for verifying that a table used during assembly of the building structure is clear of objects.

Reference is now made to FIG. 19O, which shows an example method 19000 for verifying that a table (e.g., building platform 210) used during assembly of the building structure is clear of objects that may interfere with the assembly process. For example, the objects may include stray building parts, tools or fasteners used during a previous assembly process or debris (e.g., sawdust) generated during a previous assembly process.

At 19020, one or more captured images of a table may be received. The captured images may provide a top view or an angled view of the table surface. In some embodiments, the table surface may be painted with a distinct color (e.g., blue) that can make detection of objects easier.

Figure 19P:
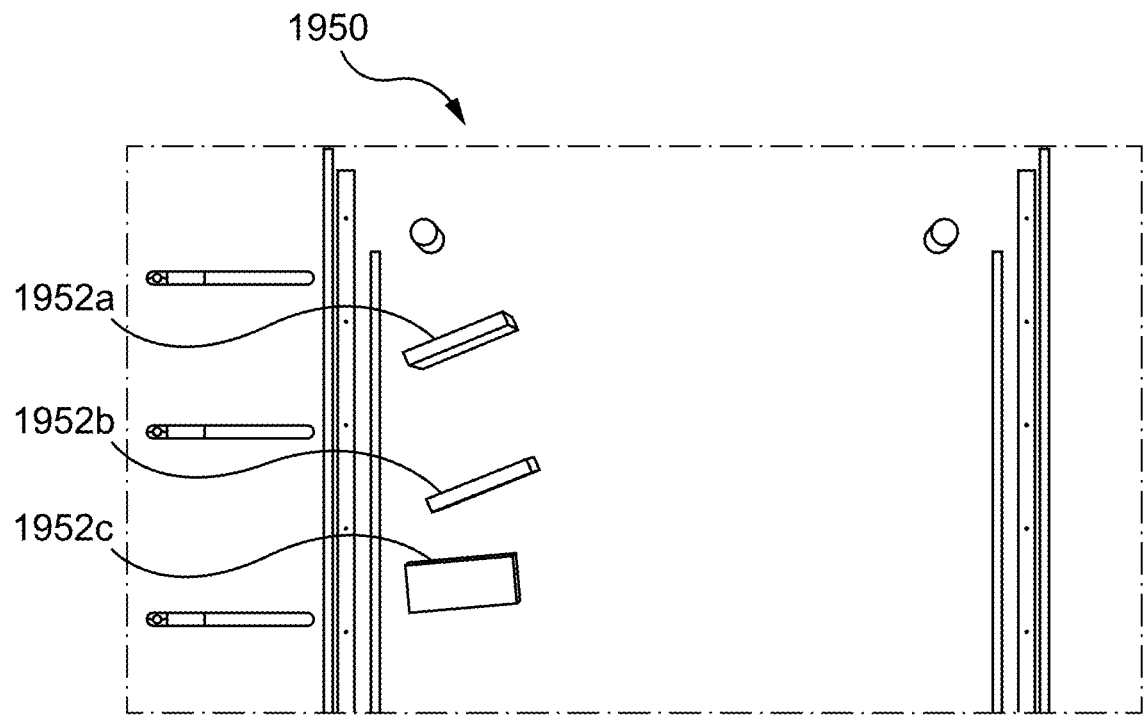
FIG. 19P is an example captured image of a table.

Reference is now made to FIG. 19P, which shows an example captured image of a table 1950. There may be multiple objects 1952a-1952c located on table 1950. Multiple captured images may be used for a table that is too large to be captured in a single image. In some examples, the multiple images may not be stitched together and objects may be separately detected for each captured image. In other examples, the multiple images may be stitched together using a suitable stitching algorithm and objects may be detected using the stitched image.

In some embodiments, multiple captured images may be processed to generate HDR images at 19020. Conversion of the captured images to HDR images may enable improved segmentation of any objects located on the table by increasing image sharpness and/or reducing shadowing and overexposure effects in the captured images.

Figure 19Q:
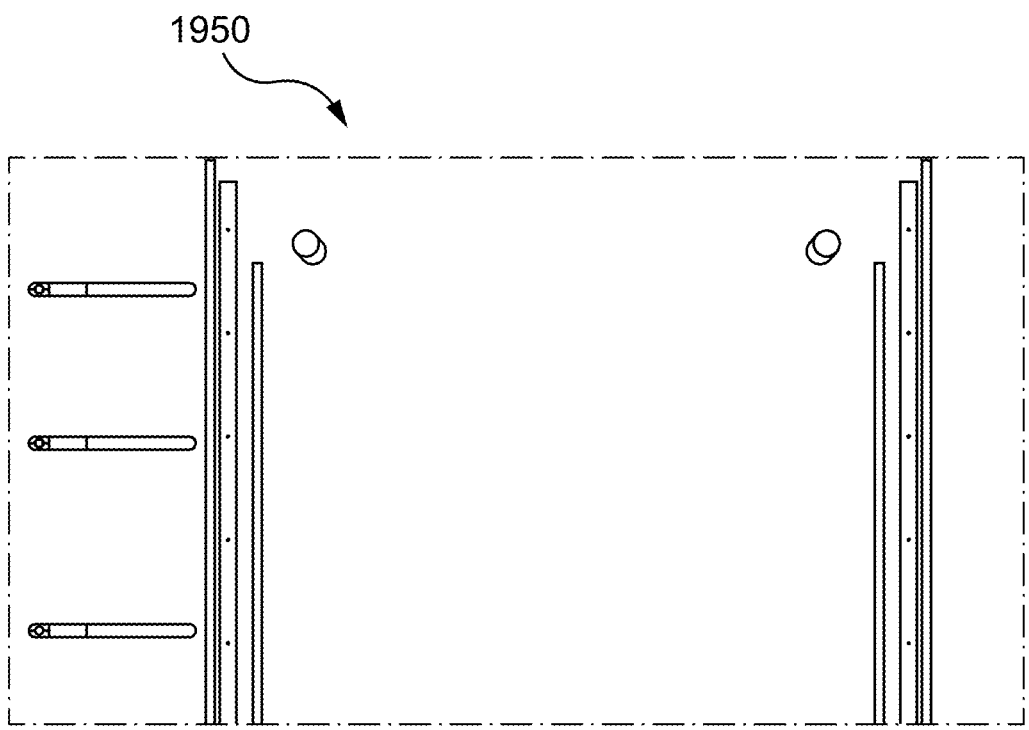
FIG. 19Q is an example background image of the table of FIG. 19P.

Referring back to FIG. 19O, at 19040, background subtraction of the received image may be performed to detect the objects located on the table. The background subtraction may be performed using a known good background image of the table where no objects are located on the table. In some examples, the background image may be stored in a database and retrieved at act 19040. Reference is now made to FIG. 19Q, which shows an example background image of table 1950 having no objects located on the table. The background subtraction may be performed using any suitable algorithm. For example, MOG2 or a machine-learning-based background subtraction may be used at act 19040. In some examples, an anomaly detection algorithm may be used to detect foreground objects.

Figure 19R:
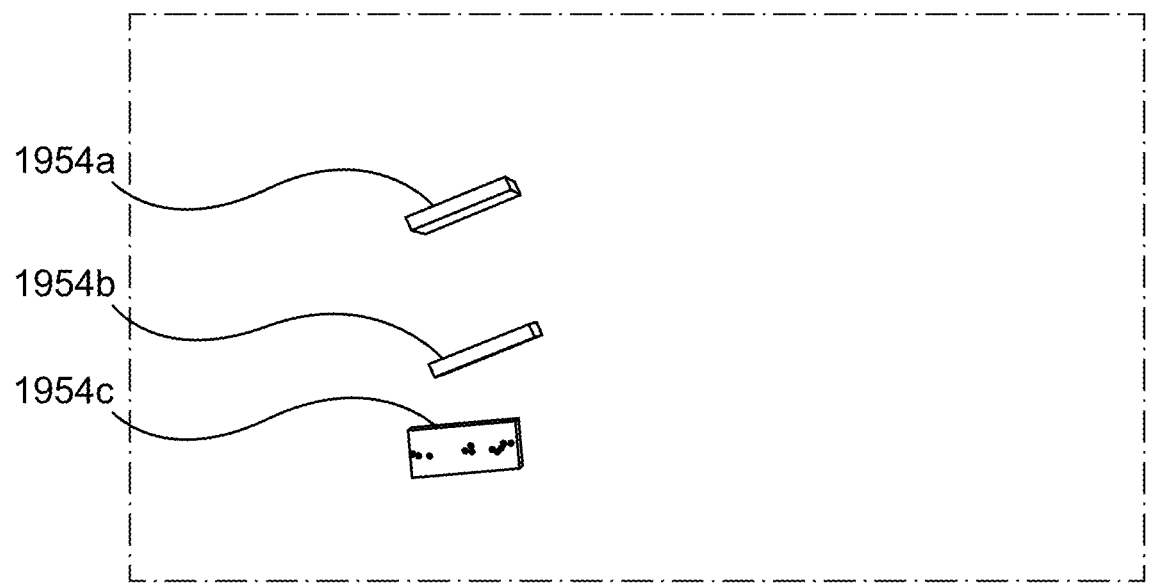
FIG. 19R is an example image showing binary masks generated for the objects located on the table of FIG. 19P.

Referring back to FIG. 19O, at 19060, binary masks of the objects may be generated based on the image generated using background subtraction. The binary masks can isolate the different objects. Reference is now made to FIG. 19R, which shows example binary masks 1954a-1954c corresponding to objects 1952a-1952c. The binary masks may be generated using any suitable image-processing algorithm.

For example, the binary masks may be generated using a k-means clustering algorithm.

In some embodiments, the binary mask may be generated using a machine learning model. Any suitable machine learning model may be used, for example, Segment Anything Model (SAM), Vision Transformer Detector (ViTDet) etc. The machine learning model may directly generate the binary masks based on the captured images. Referring back to FIG. 19O, in such cases, the background subtraction at 19040 may not be performed and method 19000 may proceed directly from 19020 to 19060. This may reduce the cost and/or complexity of method 19000 by avoiding the need for background images (with updated background images being generated periodically) and performance of the background subtraction.

Figure 19S:
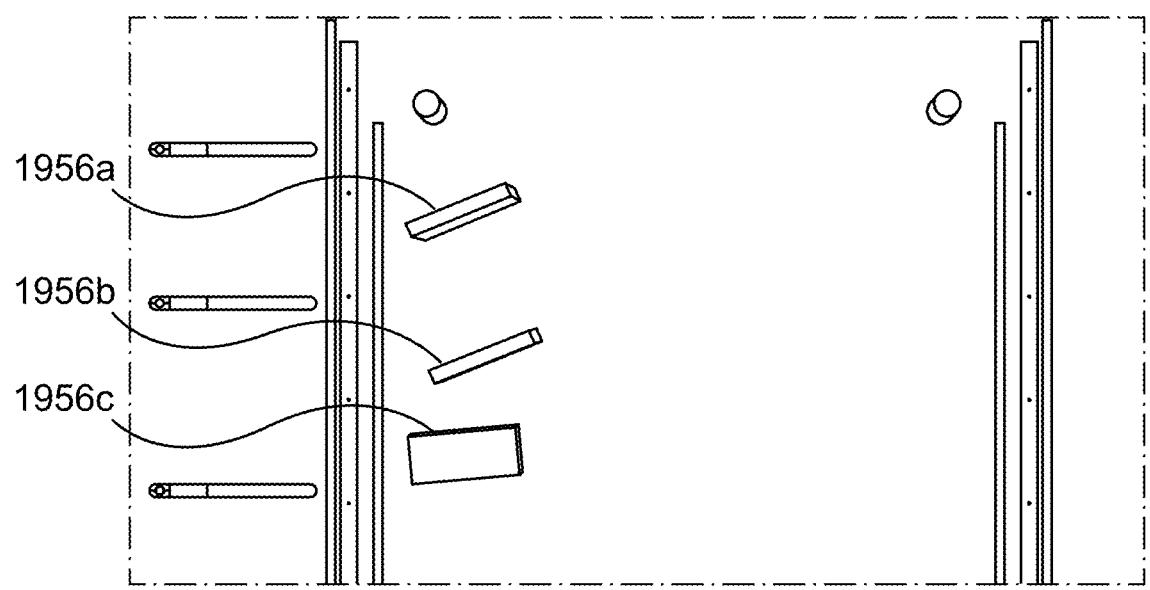
FIG. 19S is an example image showing contours determined for the objects located on the table of FIG. 19P.

At 19080, the contours of the objects may be determined based on the generated binary masks. Any suitable image processing algorithm may be used to determine the contours. For example, a bounding box algorithm may be used to define minimum area rectangles around each of the binary masks. Reference is now made to FIG. 19S, which shows contours 1956a-1956c defined corresponding to objects 1952a-1952c. In other examples, contours with different shapes may be determined, e.g., circular contours.

A notification may be generated for any detected objects. The notification may be provided to a user (e.g., via computer terminal 102). Corrective action can be taken in response to the notification to clear the detected objects from the table and verify that the table is clear for use.

In some examples, the data acquired by imaging sensors may also be used for bit verification. A robot of the robotic cell (e.g., assembly robot 204) may have a spindle or a tool that can pick different bits for performing different tasks. The data acquired by the imaging sensors may be used to verify that the correct bit has been picked up (i.e., the robot picked up the bit from the specified location and the correct bit was staged at the specified location).

Bit verification may be performed by capturing images of the robot before bit pick-up or drop-off. Bit verification may be performed to detect the absence of a bit or verify that the correct bit is present.

In some embodiments, multiple captured images may be processed to generate HDR images. Conversion of the captured images to HDR images may enable improved bit verification by increasing image sharpness and/or reducing shadowing and overexposure effects in the captured images.

Figure 19T:
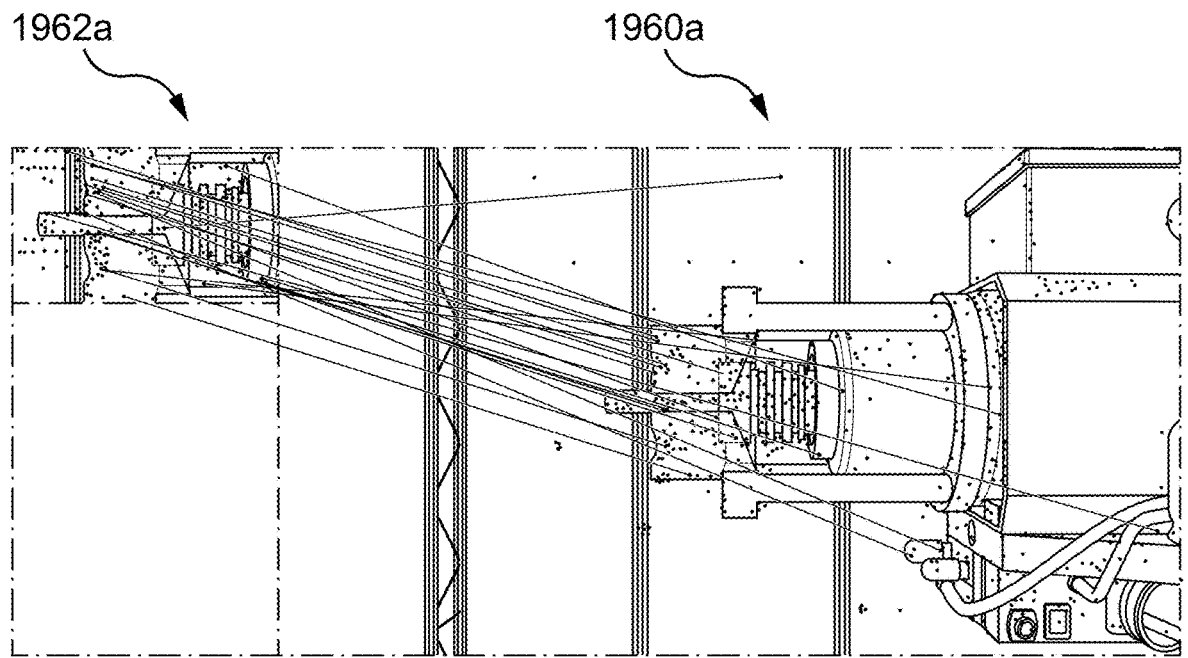
FIG. 19T shows an example matched reference image corresponding to a captured image of a tool/bit picked by a robot.
Figure 19U:
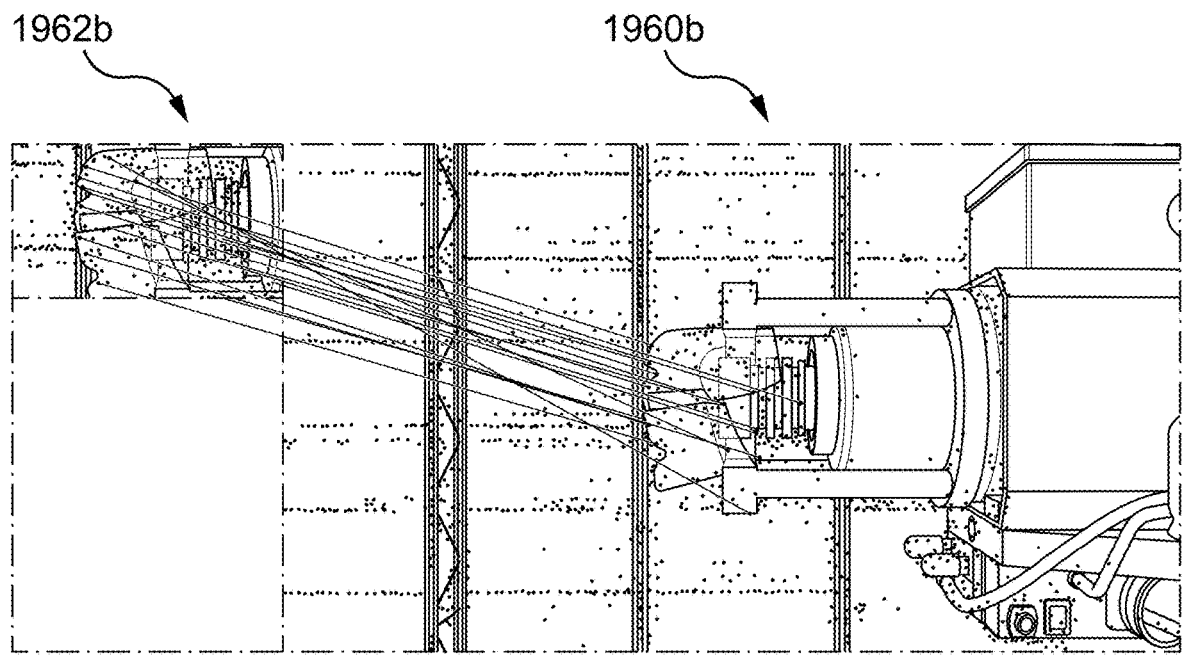
FIG. 19U shows another example matched reference image corresponding to a captured image of another tool/bit picked by a robot.
Figure 19V:
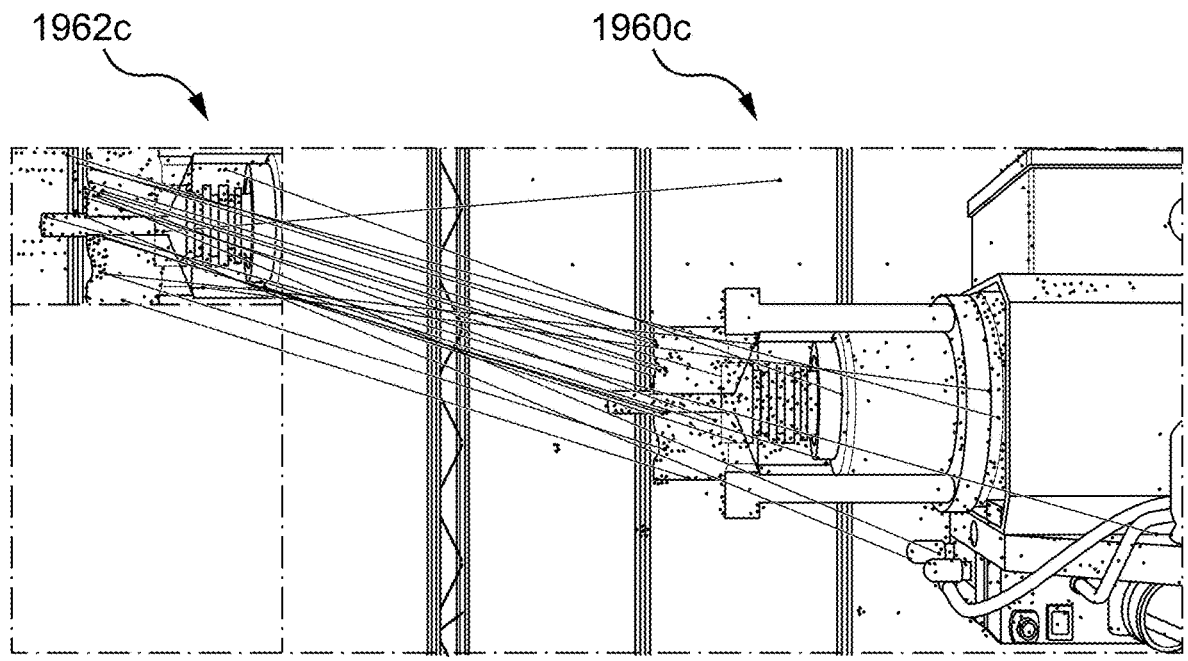
FIG. 19V shows another example matched reference image corresponding to a captured image of another bit/tool picked by a robot.

The bit verification may be performed by matching an image of the picked bit with a reference image of the bit. Any suitable machine learning model or matching algorithm may be used for the bit verification. The picked bit can be oriented in different directions and the Scale Invariant Feature Transform (SIFT) algorithm may be used based on its ability to perform matching irrespective of the bit orientation. The SIFT algorithm can match features in a captured image with features in reference images corresponding to different bits. The compared features may include corners, edges, and/or textures. A matching score may be determined for each of the reference images and the reference image with the highest score can be selected as the matching bit. Reference is now made to FIGS. 19T-19V, which show example matched reference images 1962a-1962c corresponding to captured images 1960a-1960c with different picked bits. The bit corresponding to the matched reference image can be identified and bit verification performed.

In some embodiments, at least a portion of the bits may be color-coded and the bit verification may be performed based on the detected colors.

VII. Example Modular Assembly Building Platform

The following is a discussion of an example modular assembly building platform 208. The assembly platform can be used stand-alone or in any combination or sub-combination with any other feature or features described herein. In some example cases, the assembly platform 208 can be incorporated into a robotic assembly cell (see e.g., FIGS. 6A-6C).

As provided in greater detail, the disclosed modular building platform includes an aggregate of multiple combined assembly platform sections. More or less sections can be combined to increase or decrease, respectively, the platform surface area. Accordingly, the assembly platform can be modified to accommodate different dimensions of building structures being assembled. For example, large walls and small window panels can be assembled on the same assembly platform.

Figure 20A:
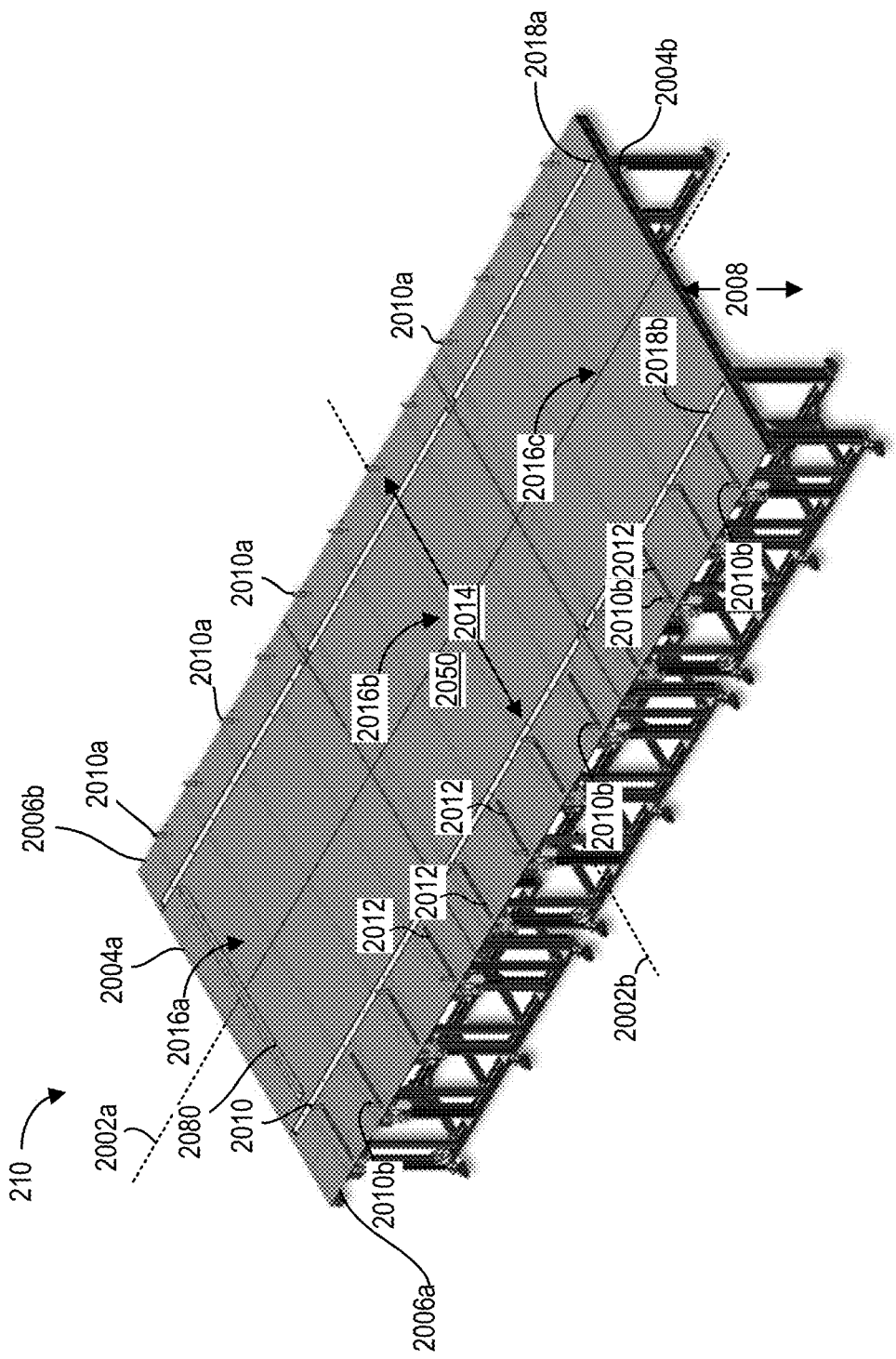
FIG. 20A is a top perspective view of an example modular assembly platform.

Reference is now made to FIG. 20, which shows a top perspective view of an example modular assembly building platform 210.

As shown, the assembly platform 210 may extend, along a longitudinal axis 2002a, between a first end 2004a and a distal second end 2004b. The platform 210 may also have lateral sides 2006a and 2006b, which extend along an orthogonal width axis 2002b.

In the upright position, the platform 210 includes a top platform surface 2050. The platform surface 2050 can provide a resting face for positioning building parts for assembly (e.g., wall panel 1306 in FIG. 13B). In some examples, the top surface 2050 may be vertically elevated from the ground (e.g., by vertical distance 2008), to allow the surface 2006 to be more accessible to the assembly robots 204.

As shown, assembly platform 210 may include one or more support pins 2010. The support pins 2010 may be disposed alongside and/or parallel the platform's lateral edges 2006a, 2006b. In the illustrated example, a first set of pins 2010a are lined parallel the first lateral edge 2006a, and a second set of pins 2010b are lined parallel the second lateral edge 2006b.

Each support pin 2010 may extend generally vertically (e.g., +35° from the vertical) from the platform surface 2050. The support pins 2010 can function as a support for assembling building parts. For example, as shown in FIG. 13B, the support pins 2010 can support a wall panel structure 1306 during assembly. That is, the wall panel 1306 is rested on its lateral side, and the support pins 2010 are positioned on either side of the structure to prevent the structure from shifting laterally. Longitudinal shifting can be prevented by a datum 2080 at the side of the table 2004a.

In some example cases, at least some the support pins 2010 may have an adjustable position, along the platform surface 2050. For example, the support pins 2010b, along the first lateral edge 2006a can have a laterally adjustable position, and may translate along an axis parallel to width axis 2002b. The translation may occur within corresponding pin slots 2012. In this manner, each support pin 2010 may translate closer to, or farther away, from a respective lateral edge 2006.

An advantage of this configuration is that a position of each pin 2010 is adjustable to accommodate different shapes, sizes and dimensions of assembled building structures. For example, wider building structures are accommodated by pins 2010b translating closer toward the lateral edge 2006b. This increases the distance 2014 between the pin sets 2010a, 2010b. For narrower building structures, pins 2010b can translate away from the lateral edge 2006a, and towards the opposite edge 2006b. In turn, this decreases the distance 2014 between opposing pins. Effectively, the lateral adjustment allow the pins to provide a tight-fit engagement around different shapes and sizes of building structures, as required.

At least some of the pins 2010 may also be controlled to translate vertically, up and down. In one example, the pins 2010 can be pulled downwardly when nailing is being performed at a pin location. In at least some embodiments, the platform surface 2050 is formed of magnetic material, e.g., carbon steel. In this manner, the platform 2050 is formed of a continuous steel top. Before assembling a component, the assembly robots 204 can mount magnets to the surface 2050. The magnets can serve as anchors and clamps for holding building parts in place during assembly. For example, the magnets can be used in the alternative to, or in addition to, the use of the support pins 2010. The use of magnets may provide greater flexibility than traditional anchors/grippers, as the magnets can be placed anywhere on the table, thereby accommodating for a wider variety of structures being assembled. In some example cases, the assembly robots 204 may receive control instructions from the cloud platform 106 in respect of mounting of the magnets.

Figure 20B:
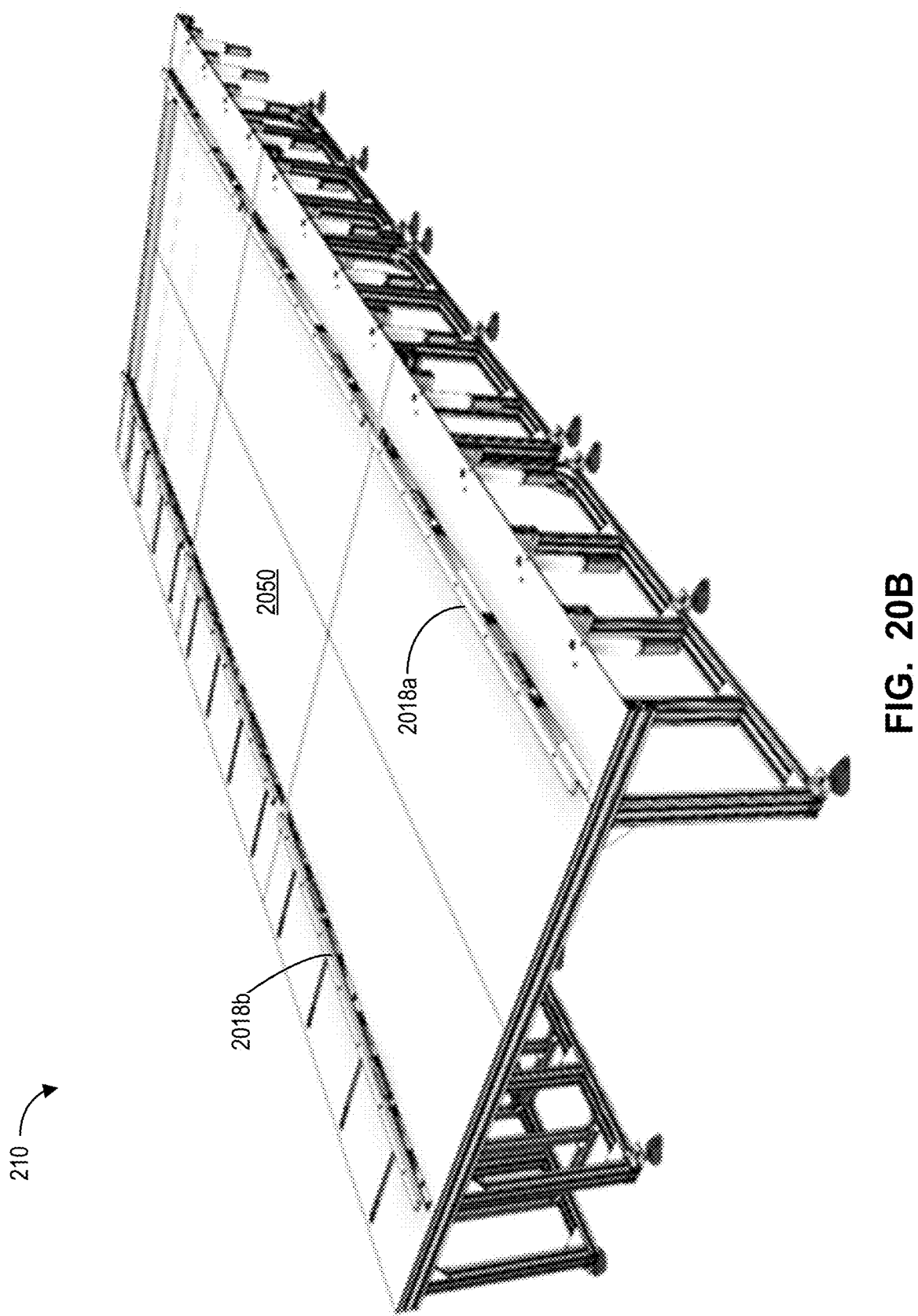
FIG. 20B is a side perspective view of an example modular assembly platform, with raised lifting rails.

In some examples, the assembly platform 210 may include lifting rails 2018a, 2018b placed along the length of the table. The rails can be activated to lift the assembled component away from the table, which can reduce friction when the assembled component is removed from the assembly station. For example, this includes a first lifting rail 2018a and a second lifting rail 2018b, positioned parallel to each of lateral edges 2006a, 2006b, respectively. In use, the building structure can be laid over the lifting members, such that the structure is slightly raised over the surface 2050. Lifting rails 2018 can be operated to extend vertically upwardly from surface 2050, to further raise the structure away from the surface 2050 (FIG. 20B). An advantage of this configuration is to allow the assembly robots 204 to access an underside of the raised building structure. In some examples the lifting rails 2018 can also extend to different vertical heights, such as to raise the building structure at different desired angles.

In at least one example, the platform is controllable by one or more of a local server 112 (FIG. 1C) and/or cloud platform 106. For example, the lifting rails 2018 are automatically controllable when it is determined that the assembly robot path requires access to the bottom surface of a building structure. Accordingly, the lifting rails 2018 can be lifted the appropriate extent to enable underside access (e.g., to complete a fastening task). By a similar token, when it is determined that the assembly robot requires access to fasten an object along a portion of the building structure, the support pins located in proximity of that portion can be controlled to descend vertically downwardly. In various cases, hydraulic mechanisms are used to effect vertical and lateral pin movement.

As indicated previously, the platform 210 may be a modulator platform. That is, the platform 210 may be formed of multiple adjoined platform sections 2016a-2016c.

The platform sections 2016a-2016c may be adjoined along the longitudinal axis 2002a (see e.g., FIG. 20C). The adjoining can be performed using various cross members 2022a, 2022b (FIG. 20D). An advantage of the modular design is to enable adapting the length of the platform 210 (e.g., along axis 2002a) to accommodate different assembly structures. For example, the same platform 210 can accommodate a large wall panel, as well as a smaller window panel. The modularity of the assembly platform 210 also facilitates ease of shipping and re-assembly. For example, the modular platform sections can be disassembled and shipped in a shipping container to a remote construction site where a robotic cell is installed. In other cases, the platform sections may also be adjoined along the lateral, width axis 2002b.

Figure 20E:
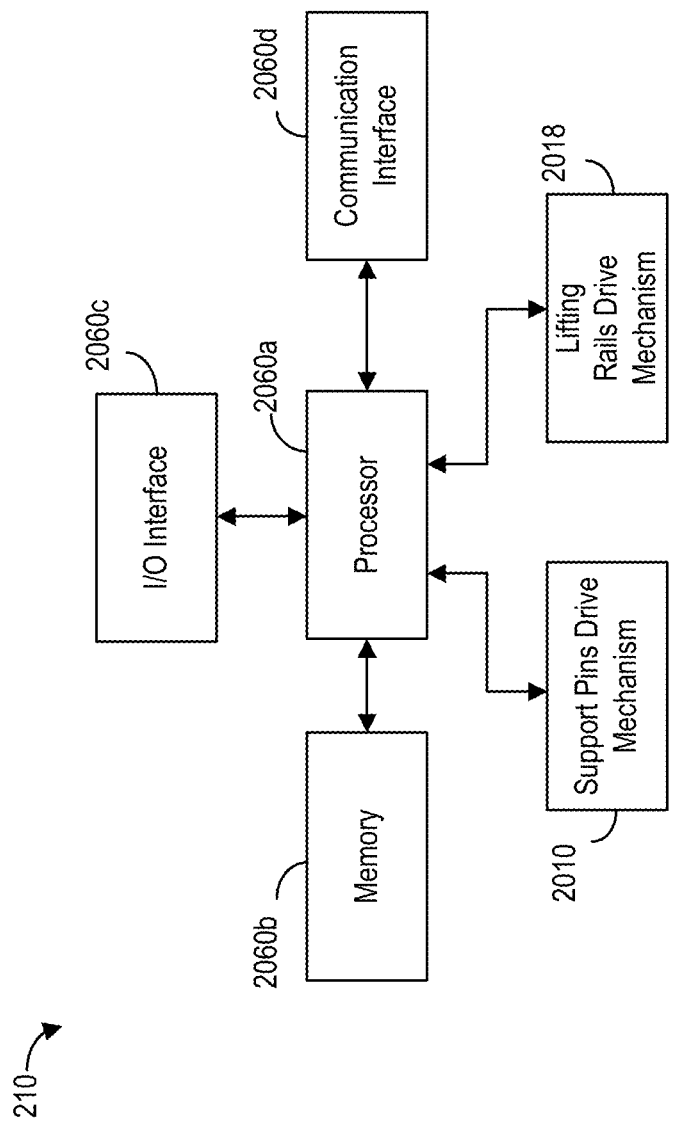
FIG. 20E is a simplified electrical hardware block diagram of an assembly platform.

FIG. 20E shows a simplified software block diagram for an example modular assembly building platform 210. As shown, the platform 210 may include a processor 2060a coupled to one or more a memory 2060b, an I/O interface 2060c and a communication interface 2060d. The architecture of these components can be analogous to the processor 502c, memory 506c, communication interface 504c, respectively. I/O interface 2060c can be any interface for coupling external systems. To this end, it will be understood by those of skill in the art that references herein to platform 210 as carrying out a function or acting in a particular way imply that processor 2060a is executing instructions (e.g., a software program) stored in memory 2060b and possibly transmitting or receiving inputs and outputs via one or more interface.

Processor 2060a may also be coupled to the one or more drive mechanisms for moving the support pins 2020, as well as the lifting rails 2018.

VIII. Example Pre-Cut Table

The following is a discussion of an example pre-cut table. Pre-cut table can be used stand-alone or in any combination or sub-combination with any other feature or features described herein. In some example cases, the pre-cut table can be incorporated into a robotic assembly cell (see e.g., FIGS. 6A-6C).

As provided herein, the pre-cut piece table may provide a surface over which pre-cut pieces may be placed, prior to assembly. In some example cases, the precut pieces table can be placed in the vicinity of the robotic tracks 208, in a robot cell 104, to allow the assembly robots 204 to pick up the pre-cut pieces during assembly of a building structure.

Figure 21A:
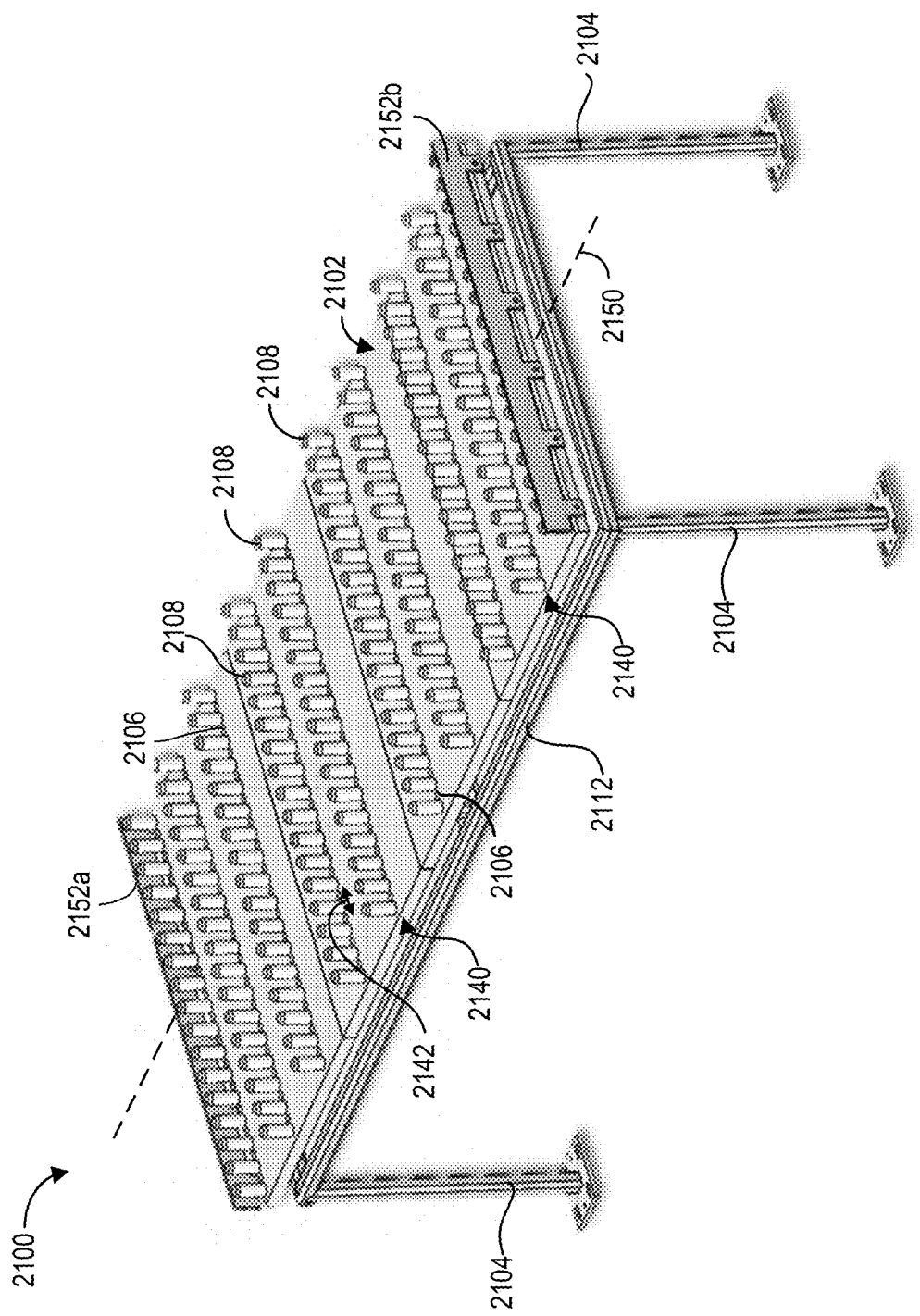
FIG. 21A is a perspective view of an example pre-cut table.
Figure 21B:
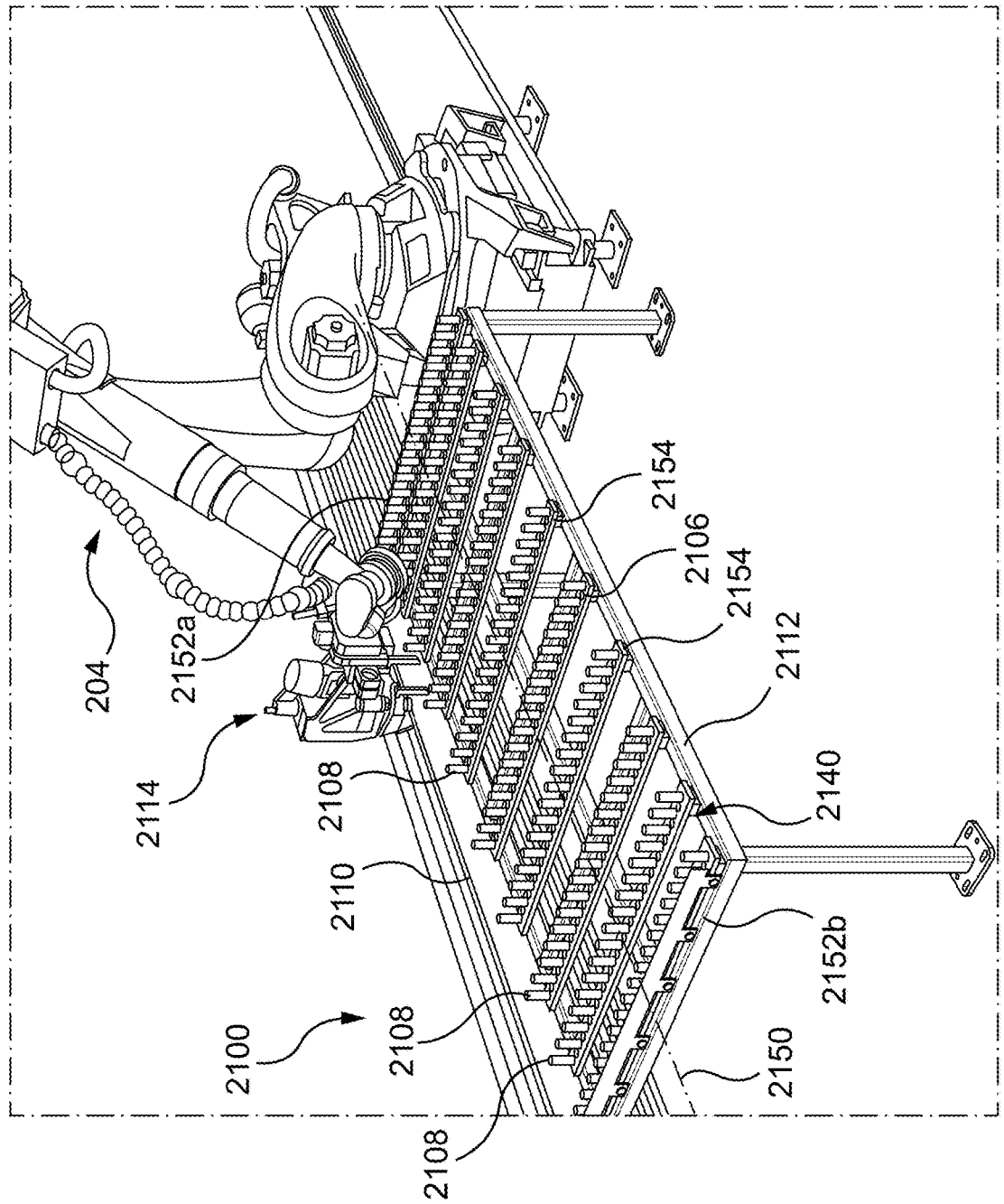
FIG. 21B is a perspective view of an example pre-cut table.
Figure 21C:
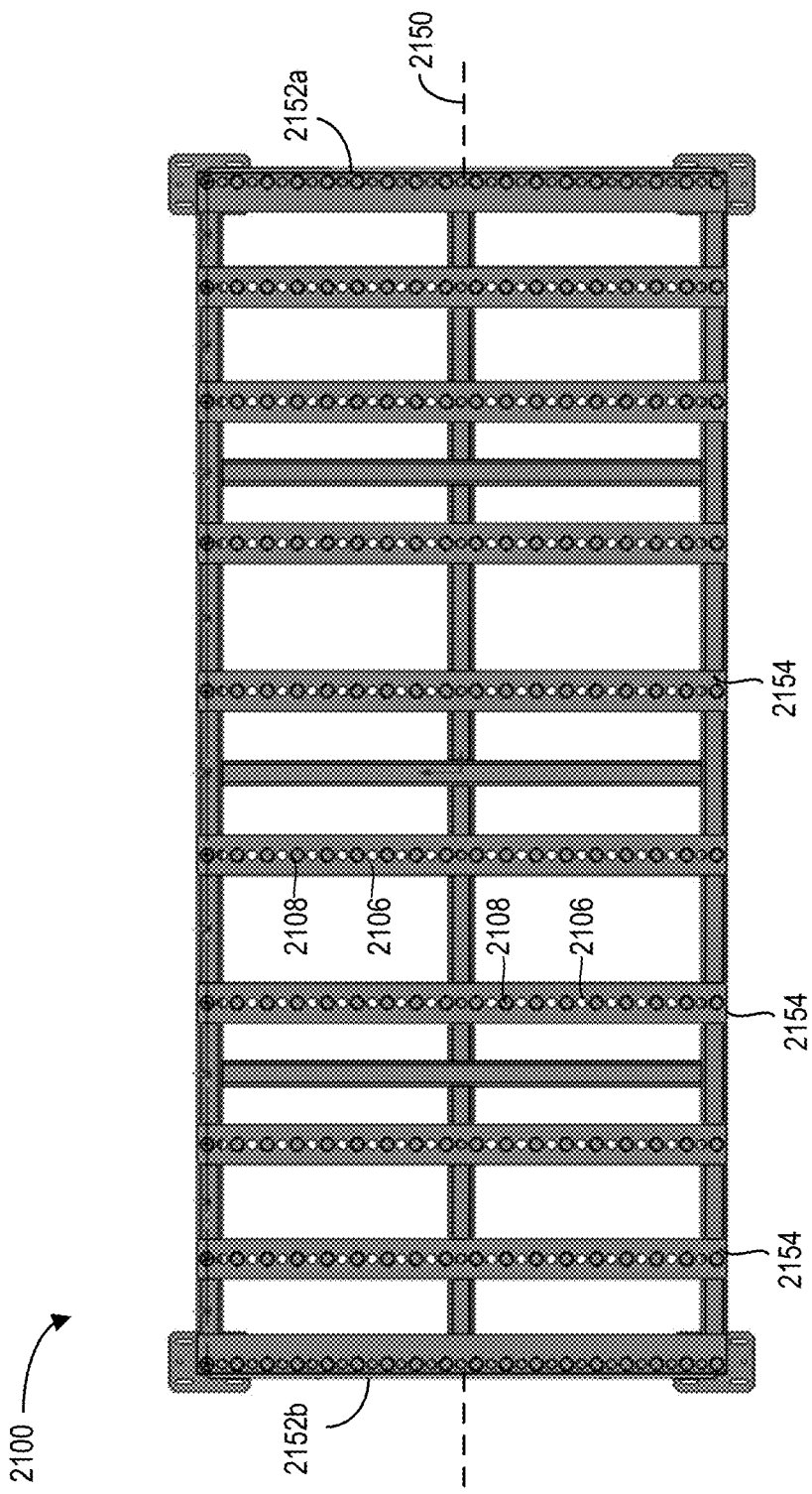
FIG. 21C is a top view of an example pre-cut table.

Reference is now made to FIGS. 21A-21C, which show example pre-cut tables 2100 (e.g., analogous to table 1550 in FIG. 15).

As shown, the pre-cut table 2100 may extend, along axis 2150, between a first end 2152a and an opposed second end 2152b. In some examples, the table 2100 may include a top surface 2102. The top surface 2102 can comprise an aluminum deck (FIG. 21A). In other examples, the top surface 2102 can comprise a frame 2112 with one or more cross-beams 2154 arranged orthogonally to axis 2150 (FIGS. 21B and 21C). The top surface 2102 is supported by one or more support members 2104 (e.g., table legs).

As shown, the top surface 2102 includes a hole pattern comprising a plurality of holes 2106 that are machined into the surface 2102 (e.g., machined into the aluminum deck or the cross-beams 2154). The holes 2106 can be arranged along parallel rows 2140 that extend orthogonally to axis 2150. Each hole can be spaced laterally by an inter-hole distance 2142 (e.g., 0.75" distance).

Each hole 2106 is dimensioned to receive a corresponding guide pin 2108. The guide pins 2108 can act as a support structure for holding and positionally securing various pre-cut pieces on the table 2100. This is shown by example in FIG. 21B, which shows a pre-cut piece 2110 positioned along its thin edge, and extending parallel to axis 2150. As shown, in this position, the piece 2110 is conveniently positioned to be picked-up by the assembly robot 204, e.g., using end effector 2114.

To this end, guide pins 2108 are translatable between a mounted position and a dismounted position. In a mounted position, a guide pin 2108 is mounted into a respective guide pin hole 2106. In the dismounted position, the guide pin 2108 can be removed, or extracted from the hole. The guide pins 21108 can be inserted and removed manually, e.g., by a human user, or by the assembly robot 204. Accordingly, the pattern configuration of mounted guide pins 2108 is varied by adding or removing guide pins.

In at least one example case, the pattern configuration of the guide pins 2108 (also known as the guide pin configuration) is adjustable to accommodate different dimensions and shapes of pre-cut pieces. The guide pin configuration is also adjustable to allow for different tool types to interact and pick-up pieces from table. In particular, by reconfiguring the pin arrangement, there is added flexibility to pick-up a piece from the table, with either a suction bar tool or compression gripper tool. Without the ability to reconfigure pins, a robot crash scenario may develop, which would limit picking raw material out of this table with only one tool type.

To further clarify this concept, the guide pins 2108 can be arranged in various configurations by aligning them in rows 2140 orthogonal to axis 2150. By closely spacing the pins 2108 along the same row, as shown in FIG. 21B, the pre-cut piece 2110 can be supported parallel to axis 2150, along its thin edge. This can facilitate picking up the piece using a compression gripper (FIG. 21B). However, the pins can also be arranged such that, along each row 2140, there is a larger axial space between adjacent pins. For example, pins can be removed from holes 2106 to allow for a greater spatial distance between adjacent pins in each row. This can now allow placing the pre-cut piece 2110 along its wide, flat surface edge. This position facilitates grabbing the piece using a suction gripper.

In the case a suction gripper is used, there can be other ways of engaging with pre-cut pieces. For example, the piece can be picked-up from the top and then dropped in the slopped datum 1482 (FIG. 14B), and picked up from the datum from the wider edge.

Figure 21D:
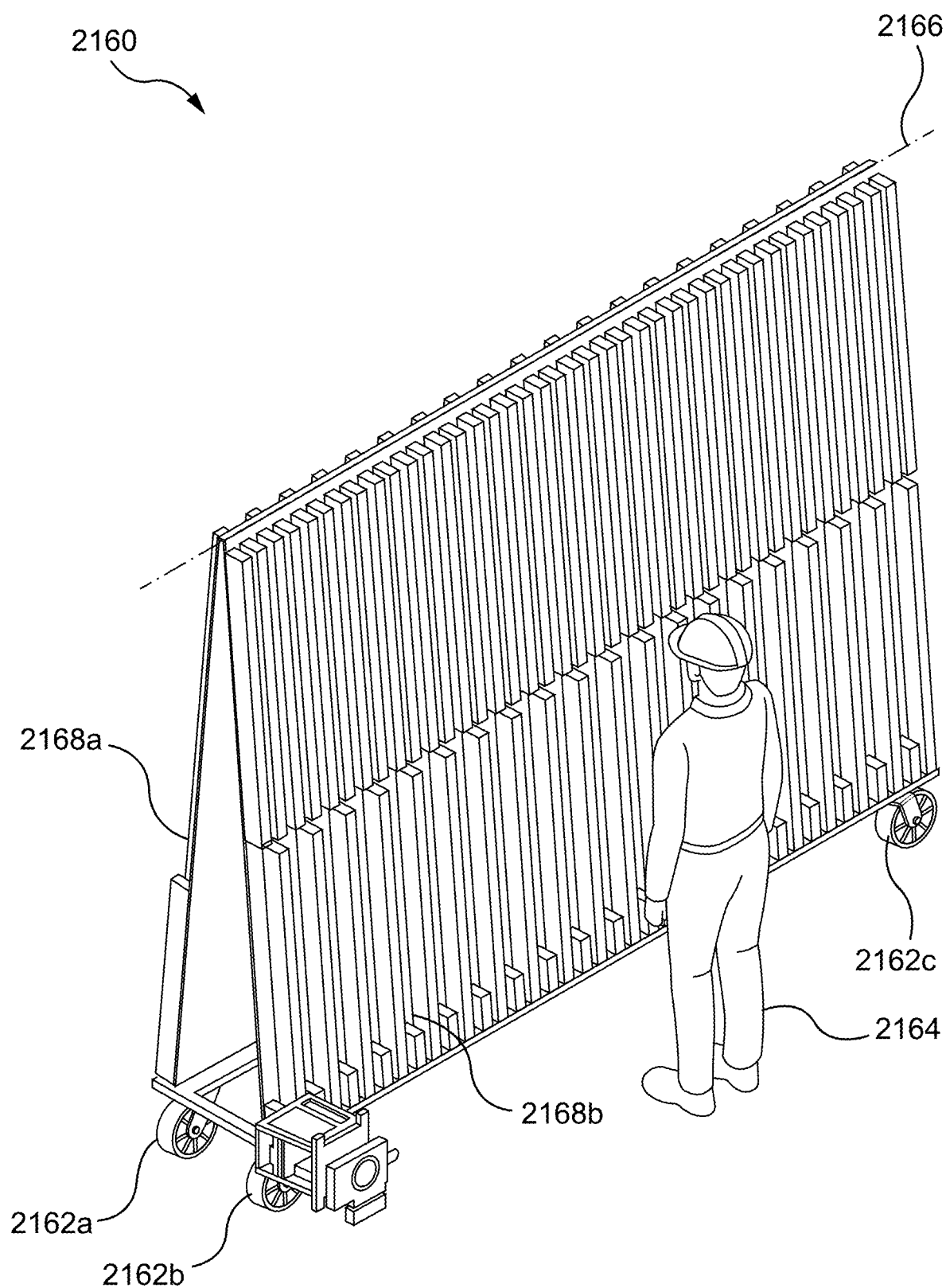
FIG. 21D is a perspective view of another example pre-cut table.

Reference is now made to FIG. 21D, which shows a perspective view of another example pre-cut table 2160. In addition to functionality provided by pre-cut table 2100, pre-cut table 2160 may provide increased mobility compared with pre-cut table 2100. For example, pre-cut table 2160 may include any suitable number of wheels 2162 (the illustrated example may include four wheels, three of which (2162a-2162c) are shown in FIG. 21D). The wheels 2162 can enable the pre-cut table 2160 to be easily moved away from an active assembly zone to be restocked with pre-cut parts. Accordingly, the assembly process may not be interrupted for restocking the pre-cut table with pre-cut parts and this may enable higher production efficiency. In examples where a human operator (e.g., operator 2164) restocks the pre-cut parts, the pre-cut table 2160 may enable higher safety for the operator by enabling restocking in a zone away from moving robots.

As shown, pre-cut table 2160 may include two inclined surfaces 2168a and 2168b that intersect along an axis 2166. As described herein above with reference to pre-cut table 2100, pre-cut table 2160 may include one or more crossbeams and a plurality of holes to receive guide pins. The cross-beams and guide pins can act as a support structure for holding and positionally securing various pre-cut pieces on table 2160. The floor footprint of inclined surfaces 2168a and 2168b can be smaller compared with the floor footprint of surface 2102 of pre-cut table 2100. Accordingly, pre-cut table 2160 may enable a larger number (e.g., three times larger) of pre-cut pieces to be staged for a given floor surface area of the robotic cell.

IX. Example Stud Push-Down Mechanism

The following is a discussion of a stud-push down mechanism, which may be used stand-alone or in combination or sub-combination with any other feature of features described herein (e.g., the assembly robots).

When installing certain building parts (e.g., studs, jack studs, king studs, cripples and sill plates), minor variations and imperfections in raw materials and pre-cut piece length precision may cause construction challenges. Accordingly, a stud push-down mechanism is disclosed which can improve process stability and eliminate the need to rely on perfect raw material seating.

Figure 22:
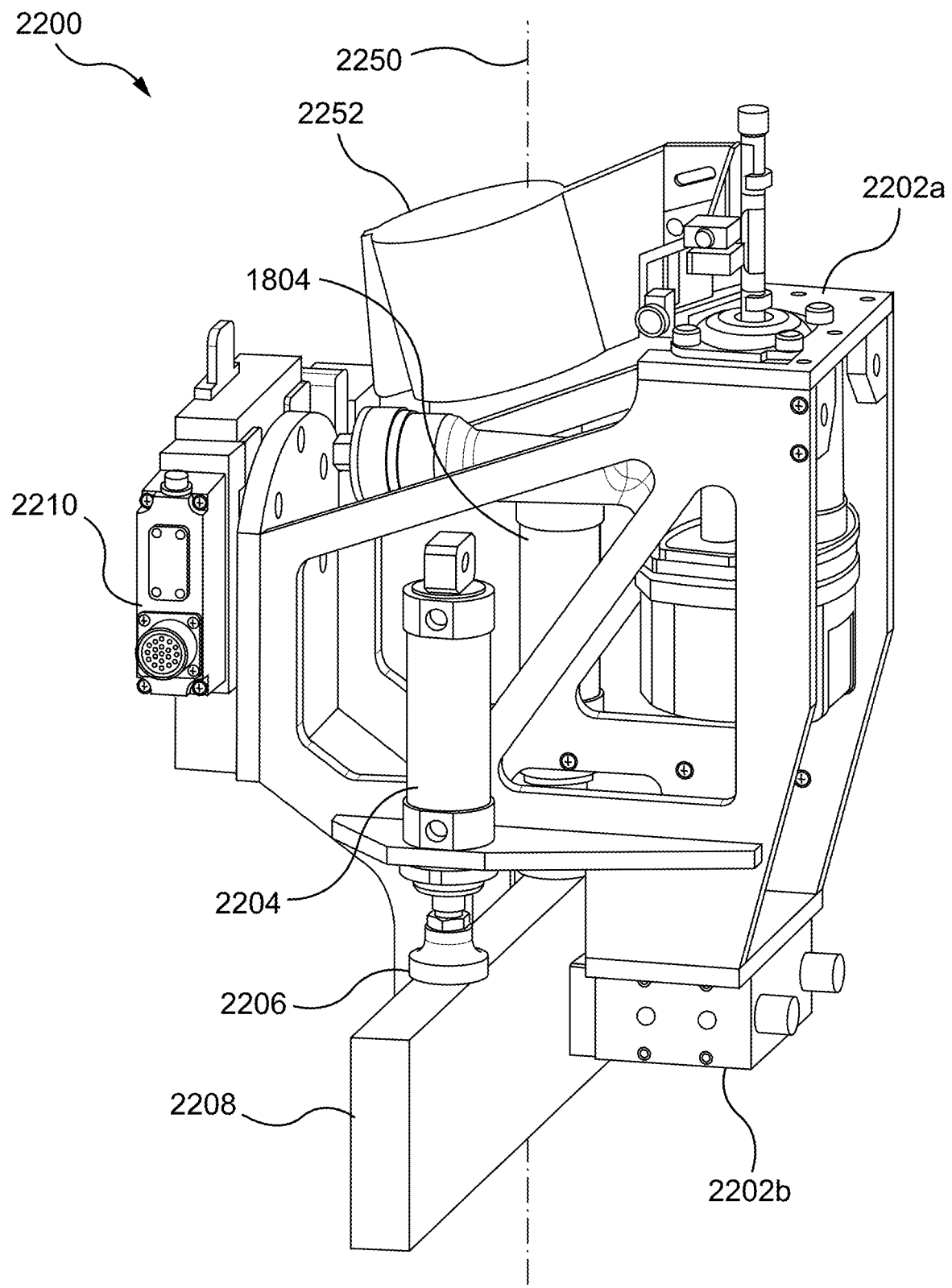
FIG. 22 is an example stud push-down device.

Reference is now made to FIG. 22, which shows an example stud push-down mechanism 2200. The stud push-down mechanism 2200 can be mounted to the distal end 1302a of an assembly robot 204 (FIG. 13A).

In the upright position, the push-down mechanism extends along a vertical axis 2250, between a top end 2202a and an opposed bottom end 2202b. The top end 2202a can include a connecting portion 2252, for connecting to the assembly robot 204.

The mechanism 2200 includes one or more pneumatic devices 2204, having a distal end 2206 which may retain a building part 2208. The pneumatic devices 2204 can also exert downward force (e.g., along axis 2250) to push the part component 2208 into place, as explained herein.

Reference is now made to FIGS. 23A-23E, which show an example top view process for assembling part components using the push-down mechanism 2200. Reference is also made to FIGS. 24A-24E, which shows a three-dimensional (3D) view of FIGS. 23A-23E, respectively.

Figure 23A:
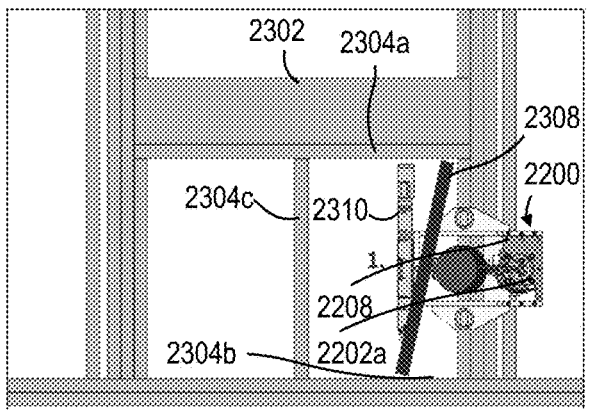
FIGS. 23A-23E show a top views of an example process for mounting a building part using the stud push-down device of FIG. 22.
Figure 23B:
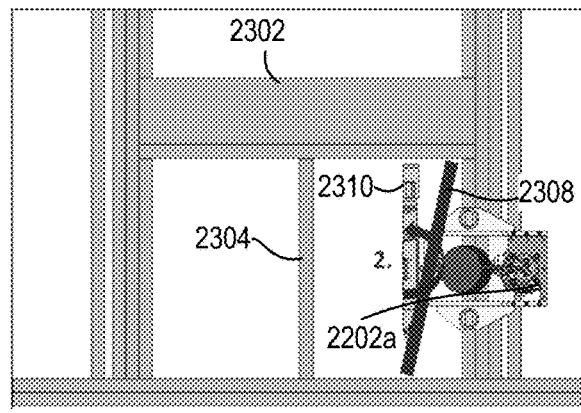
Figure 23C:
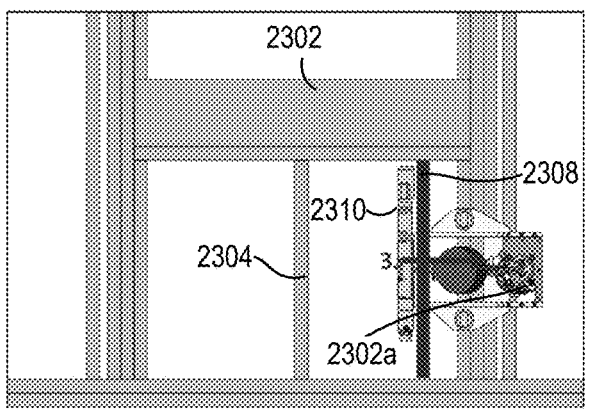
Figure 23D:
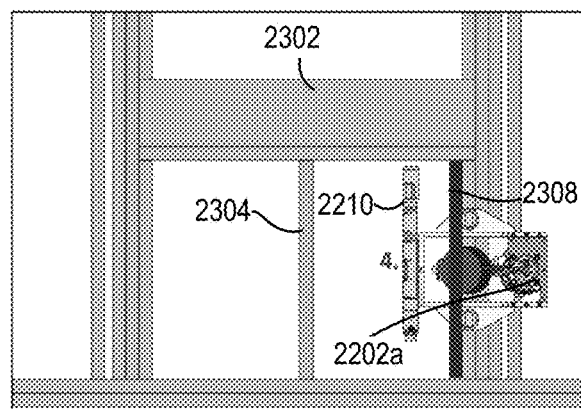
Figure 23E:
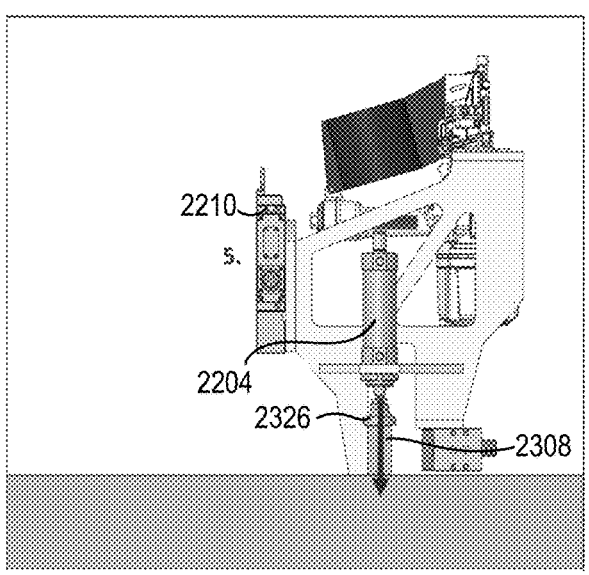
Figure 24A:
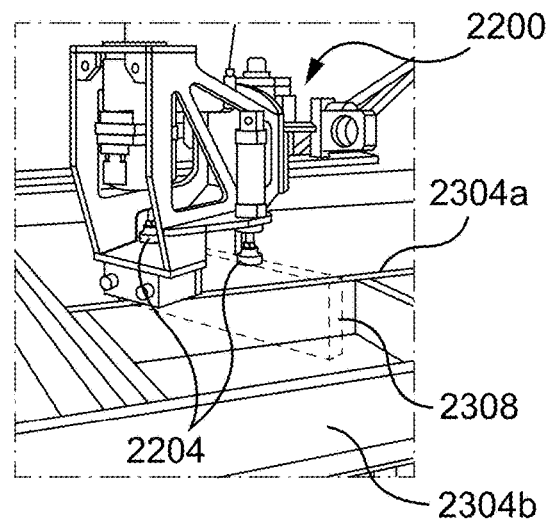
FIGS. 24A-24E show perspective views of an example process for mounting a building part using the stud push-down device of FIG. 22.
Figure 24B:
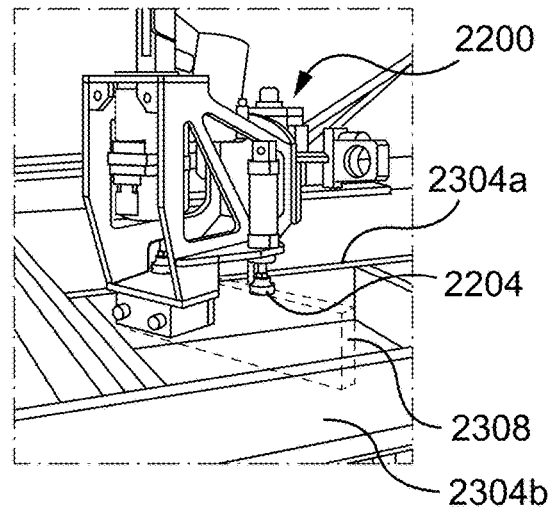
Figure 24C:
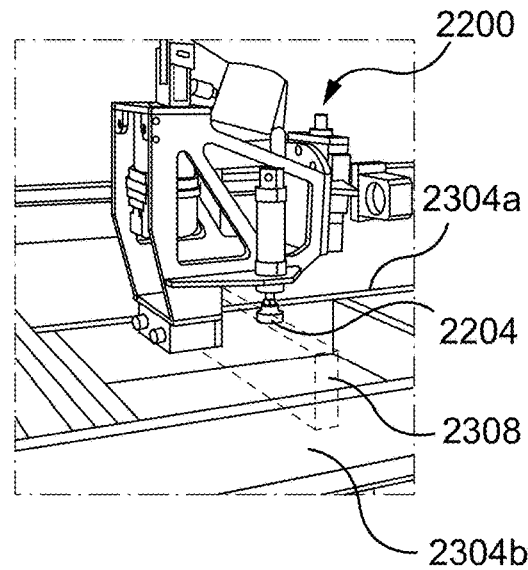
Figure 24D:
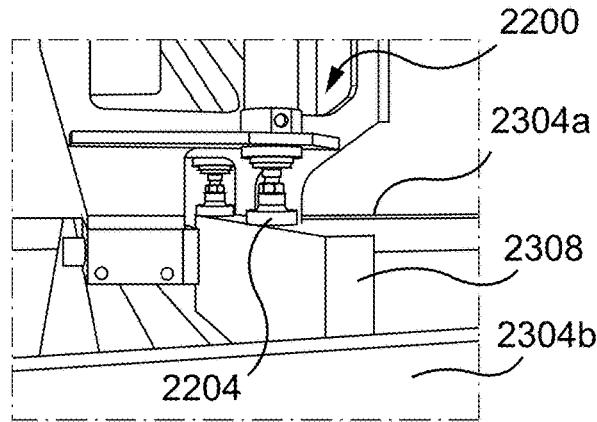
Figure 24E:
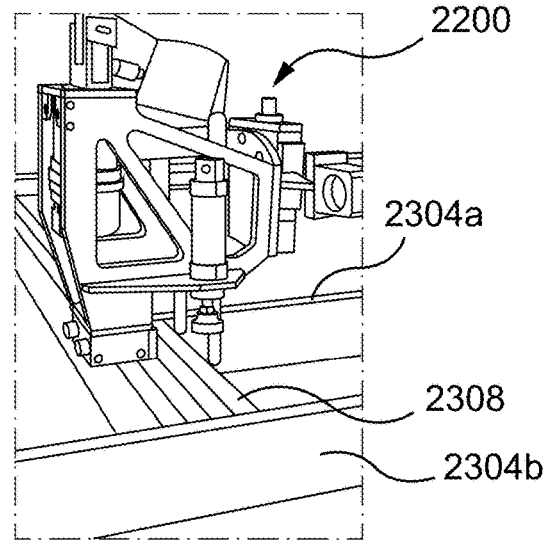

As shown, it may be desired to install the building part 2208 in a frame structure 2302 (e.g., corresponding to a wall panel). For instance, the component 2208 may be desired to be installed such that it extends between a beam 2304a, 2304b, and is otherwise oriented parallel to beam 2304c. Accordingly, initially, the building part 2208 is inserted from above the frame 2302 on an off-parallel axis relative to beam 2304c (FIGS. 23A, 24A). The assembly robot may then rotate the push-down mechanism 2200 in order to rotate the part 2308 into parallel alignment (FIGS. 23B-23C, 24B—24C). The pneumatic mechanisms 2204 (e.g., pistons) are used to vertically push the component 2308 into engagement (FIGS. 23D-23E, 24D—24E).

There are a number of appreciated advantages for the push-down mechanism 2200. In particular, due its complexity assembling a window module is a challenging task to automatize. The complexity results from various factors including, variable length and shaped building parts, small cavities for tool maneuvers, requirement for stabilizing building parts before fastening, and generally inserting building parts in an assembled frame. To add to the complexity, the wooden building parts may be slightly different in length and shape due to being a natural material, as well as inaccuracies in the cutting process. Accordingly, the stud-push down mechanism is designed to pick-up the precut pieces 2308, and insert them in the cavities using different maneuvers as shown in FIGS. 23A-23E, and 24A—24E. Moreover, the tool allows insertion of the parts in a small cavity and compensates for small size and shape variances.

Figure 25A:
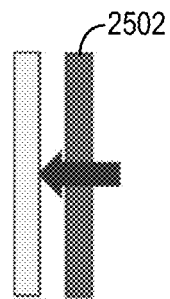
FIGS. 25A-25E show example maneuvers that can be performed by a stud push-down mechanism.
Figure 25B:
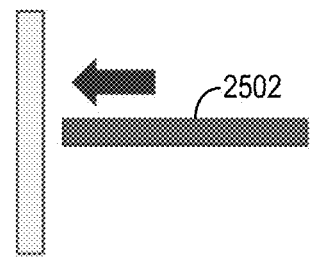
Figure 25C:
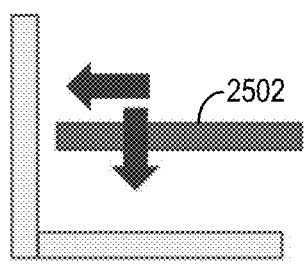
Figure 25D:
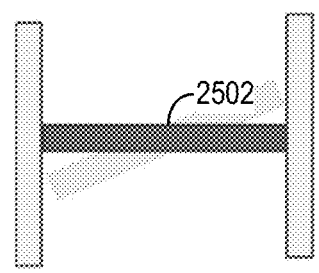
Figure 25E:
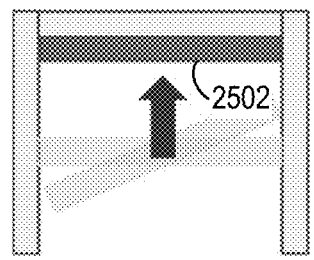

FIGS. 25A-25E show other example maneuvers that the mechanism 2200 can be used to perform for a pre-cut piece 2502. These include parallel sliding (FIG. 25A), perpendicular sliding (FIG. 25B), corner sliding (FIG. 25C), rotation inserts (FIG. 25D) and/or slide and rotation inserts (FIG. 25D).

In some examples, a passive stud alignment tool may be used in combination with the stud push-down mechanism. There can be stack-up tolerance errors in placement of studs using a gripper tool due to factors including raw material imperfections, movement during clamping tasks, and timing parameters associated with separating the building part from the tool during drop-off. These factors can cause the stack-up tolerance errors to exceed the typical accepted tolerance errors of ±3 mm. The passive stud alignment tool in combination with the stud push-down mechanism may enable reduction in the stack-up tolerance errors to below ±3 mm.

Figure 25F:
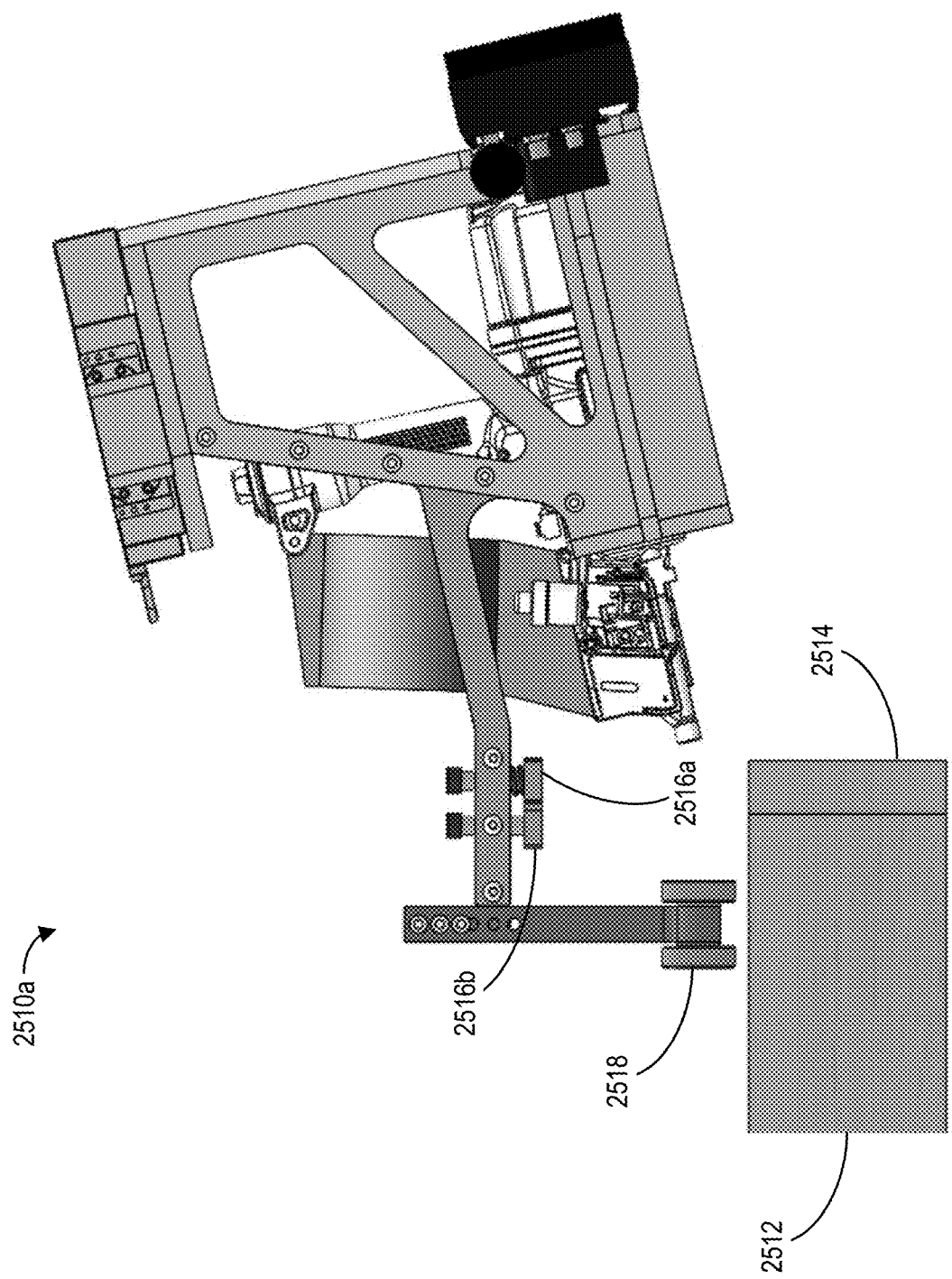
FIG. 25F shows a passive stud alignment tool being moved into an engaged position with a building part that is being installed in a frame structure.

Reference is now made to FIG. 25F, which shows a passive stud alignment tool 2510a being moved into an engaged position with a building part 2512 that is being installed in a frame structure 2514. Passive stud alignment tool 2510a may include one or more push-down members 2516 (e.g., push-down members 2516a and 2516b) and a pair of bearing rollers 2518 (one of which is visible in FIG. 25F).

Figure 25G:
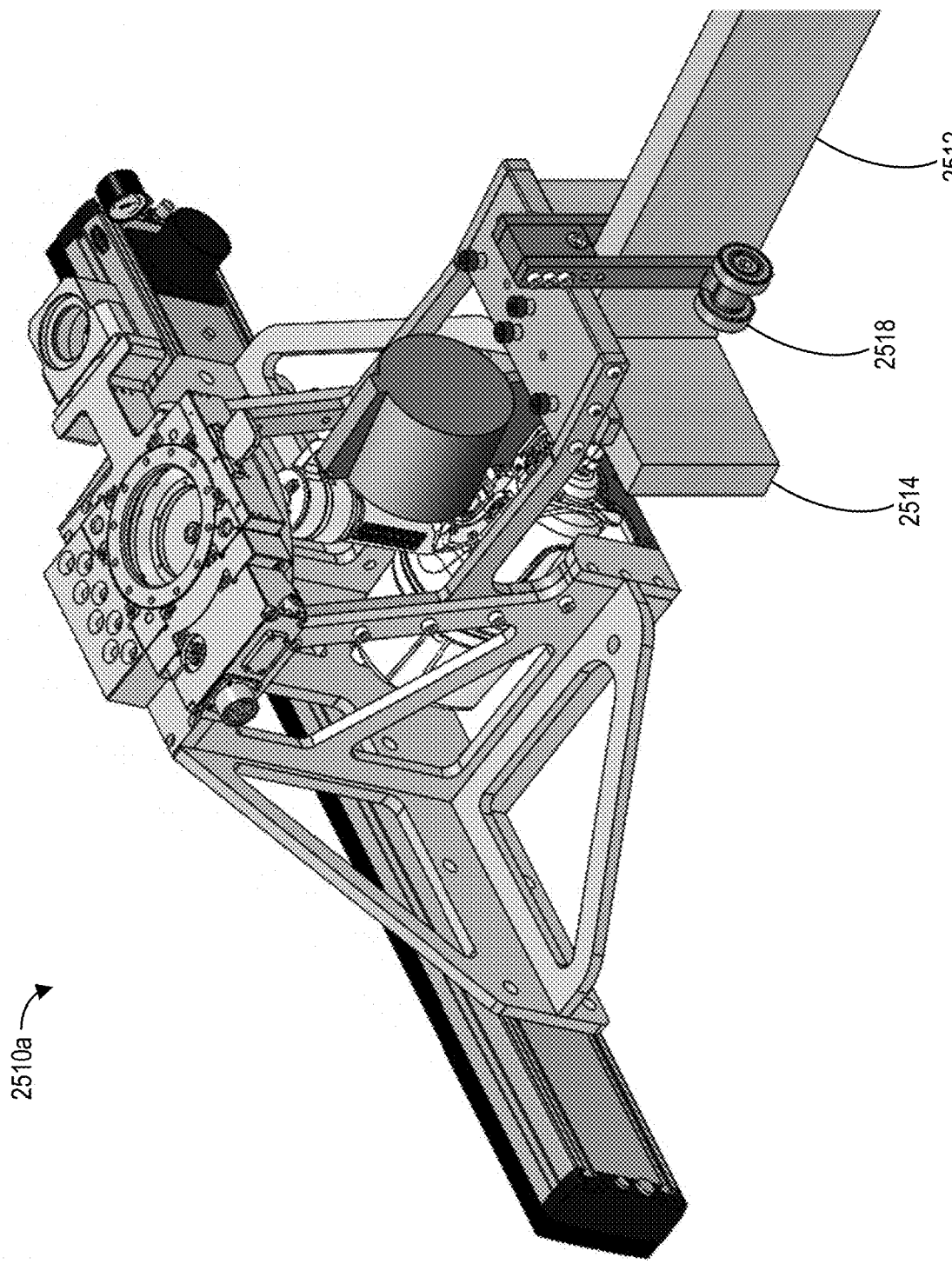
FIG. 25G shows the passive stud alignment tool of FIG. 25F in the engaged position.

Reference is now made to FIG. 25G, which shows passive stud alignment tool 2510a in an engaged position. The push-down members can provide push-down clamping force to enable a flush joint between building part 2512 and frame structure 2514. The pair of bearing rollers 2518 can capture building part 2512 in a lateral direction to re-center building part 2512 prior to fastening. This can enable passive stud alignment tool 2510a to limit tolerance errors to below ±3 mm (for example, below ±2 mm).

Figure 25H:
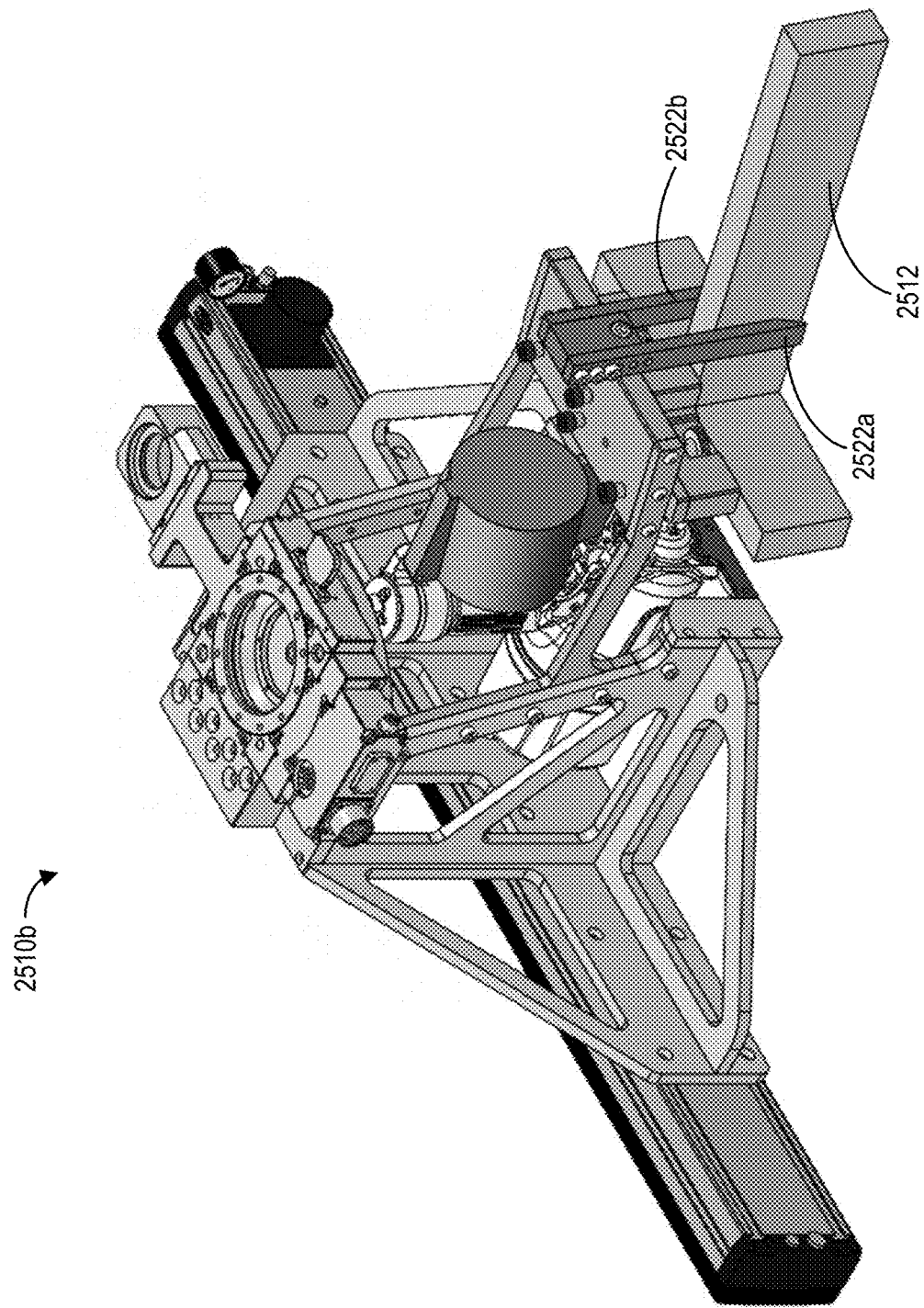
FIG. 25H shows another passive stud alignment tool that is in an engaged position with a building part that is being installed in a frame structure.

In some embodiments, the passive stud alignment tool may include a set of elongated members instead of bearing rollers. Reference is now made to FIG. 25H, which shows passive stud alignment tool 2510b in an engaged position. The set of elongated members (or fingers) 2522a and 2522b can capture building part 2512 in a lateral direction to re-center building part 2512 prior to fastening. This can enable passive stud alignment tool 2510b to limit tolerance errors to below ±3 mm (for example, below ±2 mm). Elongated members 2522a and 2522b can provide a smaller width footprint compared with bearing rollers 2518a and 2518b (shown in FIG. 25F). This may enable passive stud alignment tool 2510b to be used in frame structures with tighter space constraints compared with passive stud alignment tool 2510a.

X. Example Sheathing Nailer

The following is a discussion of an example sheathing nailer. The sheathing nailer can be used stand-alone or in any combination or sub-combination with any other feature or features described herein. For example, the sheathing nailer can be mounted to the distal end 1302a of an assembly robot 204 (FIG. 13A). The sheathing nailer may be used for performing sheathing fastening tasks.

Figure 26:
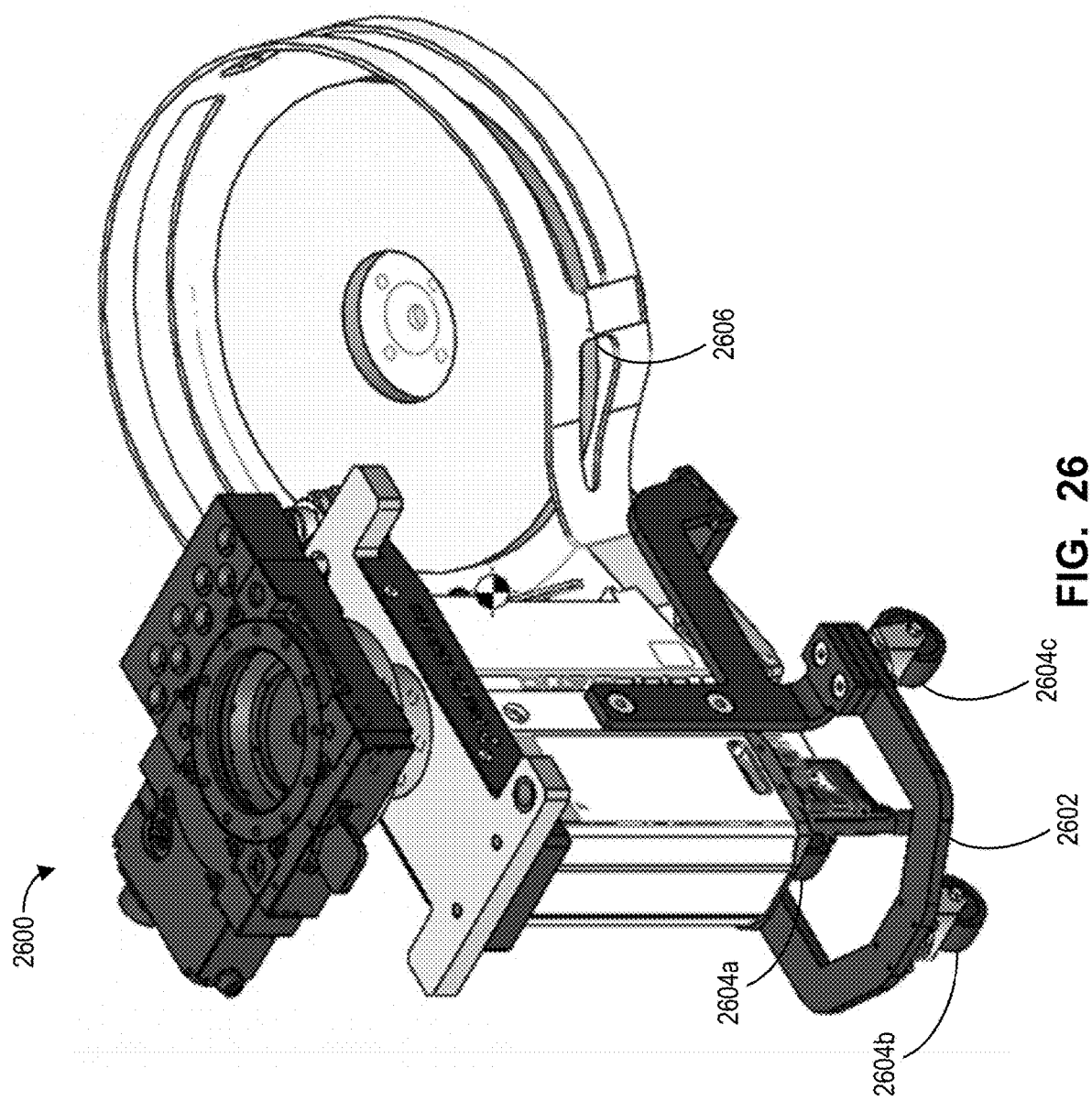
FIG. 26 shows a perspective view of an example sheathing nailer.

Reference is now made to FIG. 26, which shows a perspective view of an example sheathing nailer 2600. Sheathing nailer 2600 can be, for example, a pneumatic nailer. Sheathing nailer 2600 can provide increased speed and cycle-time compared with a pneumatic stapler.

As shown, sheathing nailer 2600 can include a caster assembly 2602. Caster assembly 2602 can include any suitable number of casters. In the illustrated example, caster assembly 2602 includes three casters 2604a-2604c. Caster assembly 2602 can roll on top of the sheet surface to be nailed and provide a broad distribution of force at the three caster points (corresponding to casters 2604a-2604c). The force provided by caster assembly 2602 can enable the sheet to be held down tightly in its position on top of the studs prior to nailing.

Sheathing nailer 2600 can include multiple sensors. For example, a first sensor may detect when nail coil 2606 is depleted. A second sensor may detect nailing jam-ups. In some embodiments, sheathing nailer 2600 may also include a misfire detection sensor. The misfire detection sensor can be, for example, a pressure sensor or a magnetic sensor that detects nail position based on magnetic induction of the nail material. In some embodiments, sheathing nailer 2600 may also include a force sensor. The distance between the materials being nailed may vary due to thickness or surface non-uniformities. The force feedback provided by the force sensor may enable sheathing nailer 2600 to perform nailing while maintaining uniform distance and/or pressure between the materials being nailed. The multiple sensors of sheathing nailer 2600 can improve cycle-time by enabling faster detection of issues.

XI. Example Dust Collection Shoe

The following is a discussion of an example dust collection shoe. The dust collection shoe can be used stand-alone or in any combination or sub-combination with any other feature or features described herein. For example, the dust collection shoe can be used in combination with a machining spindle having detachable cutting tools/bits that can be automatically changed. The machining spindle can be mounted to the distal end of an assembly robot (for example, distal end 1302a of assembly robot 204 in FIG. 13A).

The disclosed dust collection shoe can provide a 360° envelope around the cutting tool/bit being used and collect dust generated during cutting tasks. The disclosed dust collection shoe can also enable automatic changes of the cutting tools/bits installed on the machining spindle.

Figure 27A:
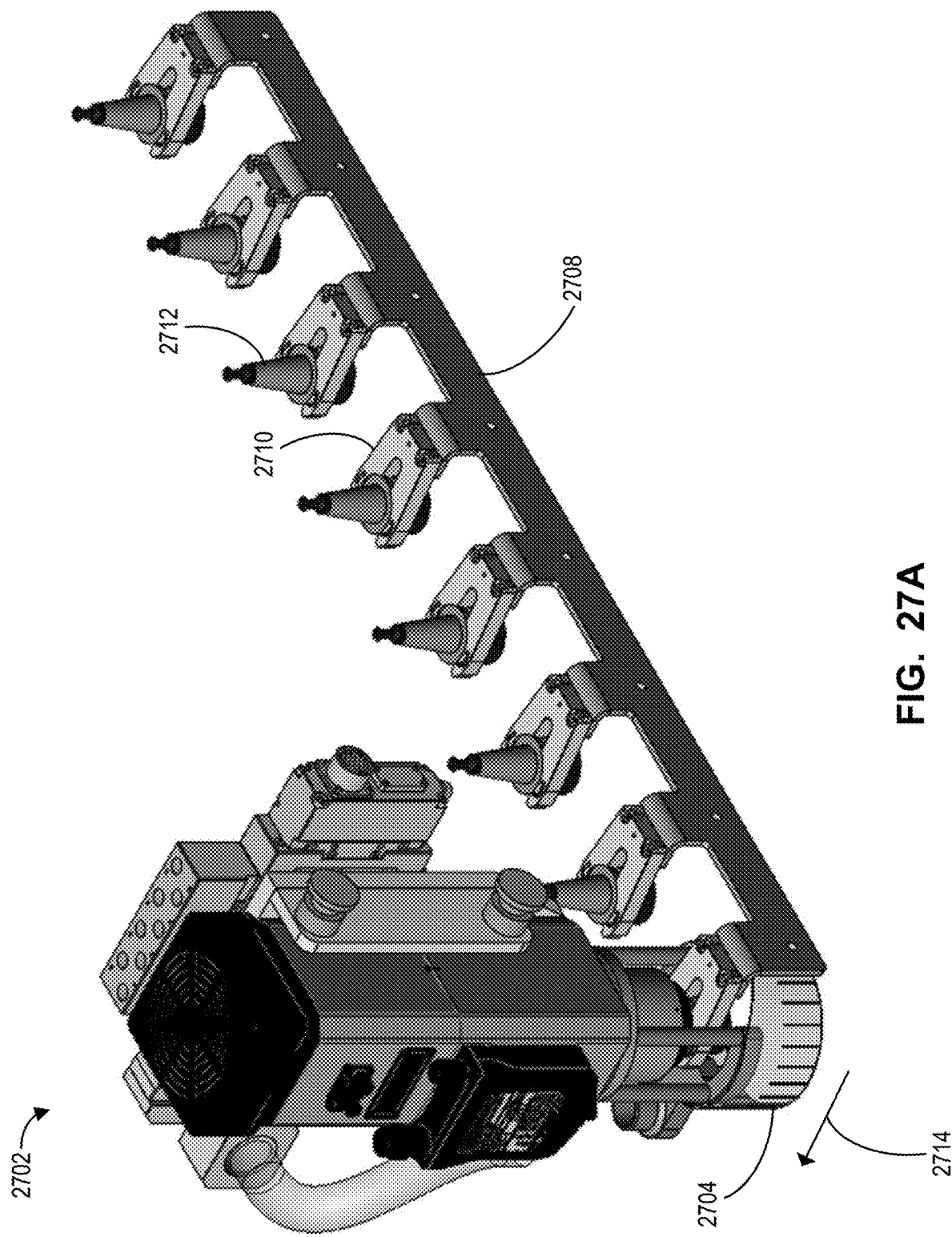
FIG. 27A shows a perspective view of an example machining spindle interacting with a tool station.

Reference is now made to FIG. 27A, which shows a perspective view of a machining spindle 2702 interacting with a tool station 2708. Machining spindle 2702 may include a dust collection shoe 2704. Tool station 2708 may include multiple tool forks 2710. Each tool fork 2710 may support a cutting tool or bit 2712. Tool station 2708 can support multiple cutting tools or bits 2712. In some examples, each cutting tool 2712 may be unique and provide different functionalities.

Machining spindle 2702 can interact with tool station 2708 to drop off an installed cutting tool 2712 and/or pick up a new cutting tool 2712. The tool changes can be automatically performed without requiring manual intervention. After picking up a new cutting tool 2712, machining spindle 2702 may be required to exit from tool station 2708 in a lateral direction 2714 to avoid collision with tool fork 2710. This may not be possible if dust collection shoe 2704 is rigid and free of gaps or openings. However, any gaps or openings in dust collection shoe 2704 can reduce the dust collection efficiency of dust collection shoe 2704.

Figure 27B:
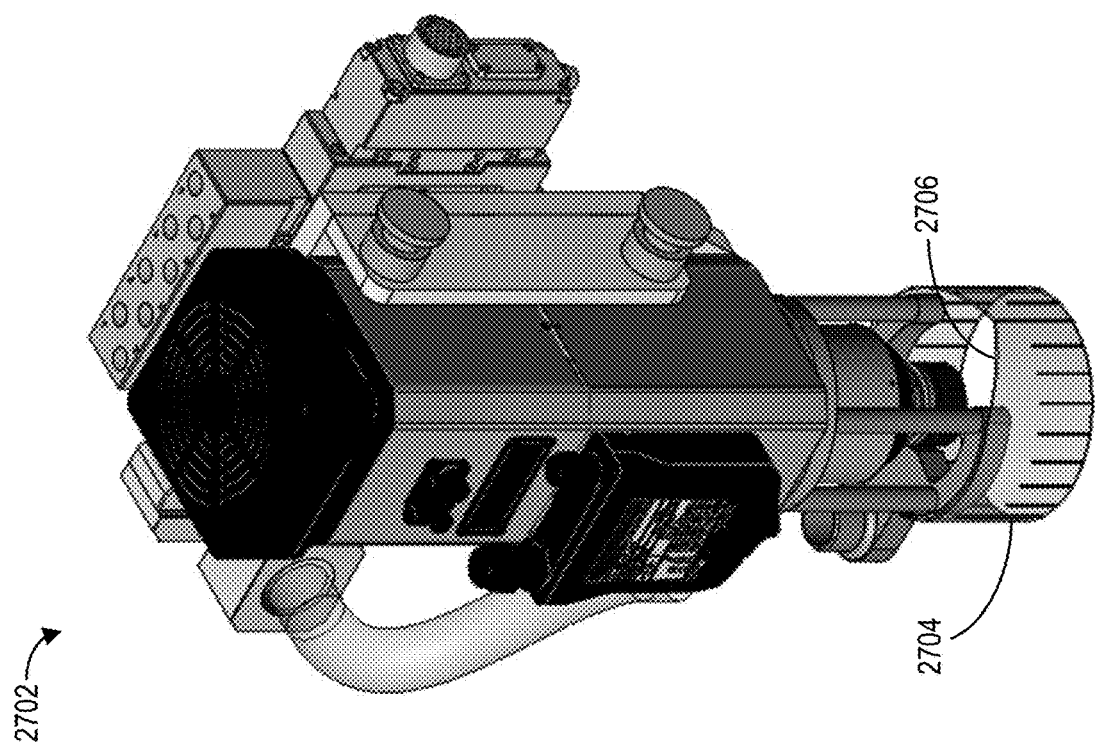
FIG. 27B shows a perspective view of a relief portion of a dust collection shoe of the machining spindle of FIG. 27A.

Reference is now also made to FIG. 27B, which shows a perspective view of a relief portion 2706 of dust collection shoe 2704 of machining spindle 2702. Dust collection shoe 2704 may be made of any suitable material that is sufficiently pliable/flexible to be displaced as machining spindle 2702 exits from tool station 2708 in lateral direction 2714 and springs back into position after machining spindle 2702 exits from tool station 2708.

XII. Example Compression Gripper/Nailer

The following is a discussion of an example compression gripper and nailer. The compression gripper and nailer can be used stand-alone or in any combination or sub-combination with any other feature or features described herein. For example, the compression gripper/nailer can be mounted to the distal end 1302a of an assembly robot 204 (FIG. 13A).

Reference is now made to FIGS. 28A-28D, which show perspective views of a compression gripper/nailer 2800. Compression gripper/nailer 2800 may include a connection portion 2804, gripping members 2808a and 2808b, gripper cylinder 2810, ejector cylinder 2812, and ejector members 2816a and 2816b.

Figure 28A:
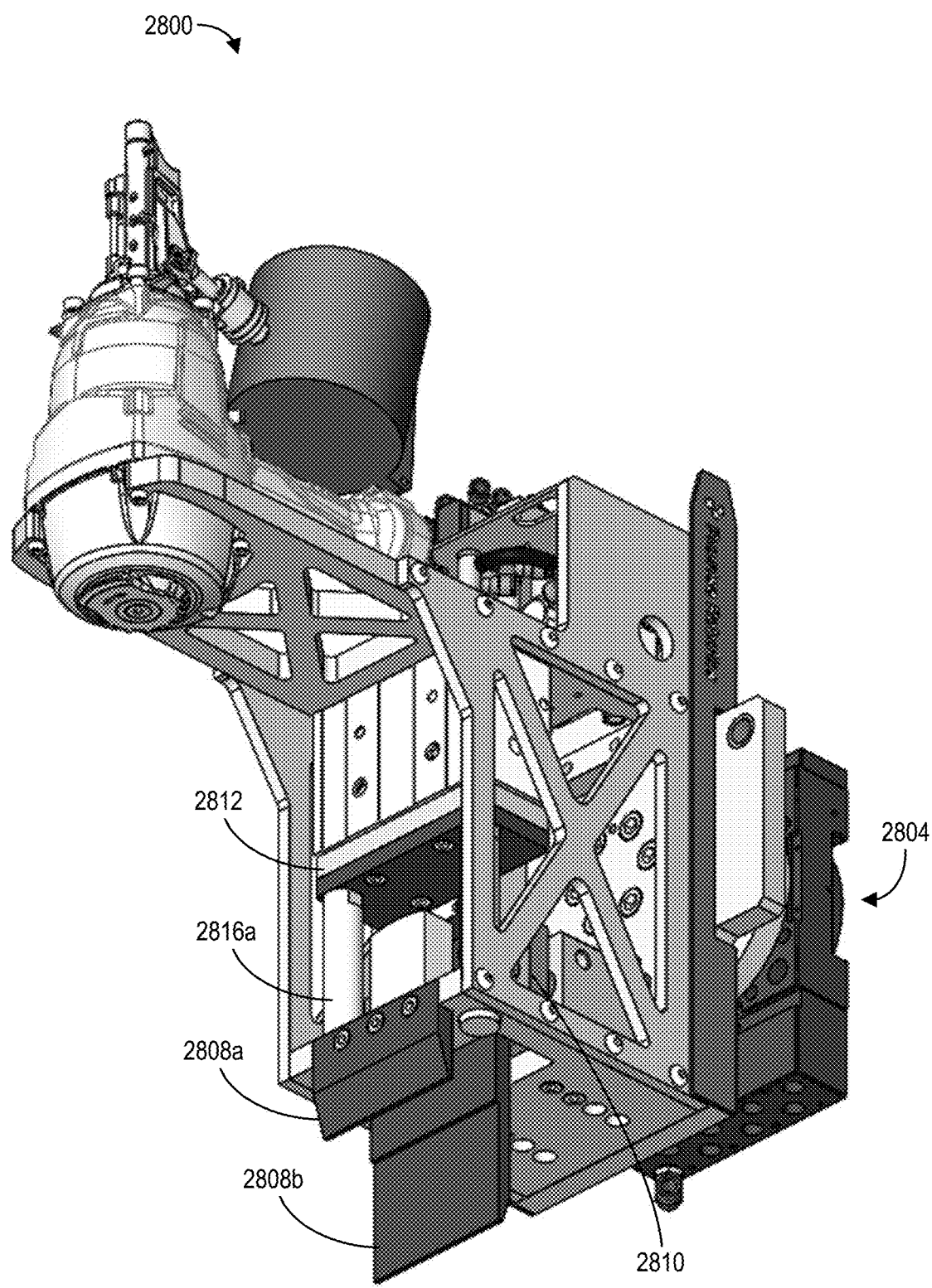
FIGS. 28A-28D show perspective views of an example compression gripper/nailer.
Figure 28B:
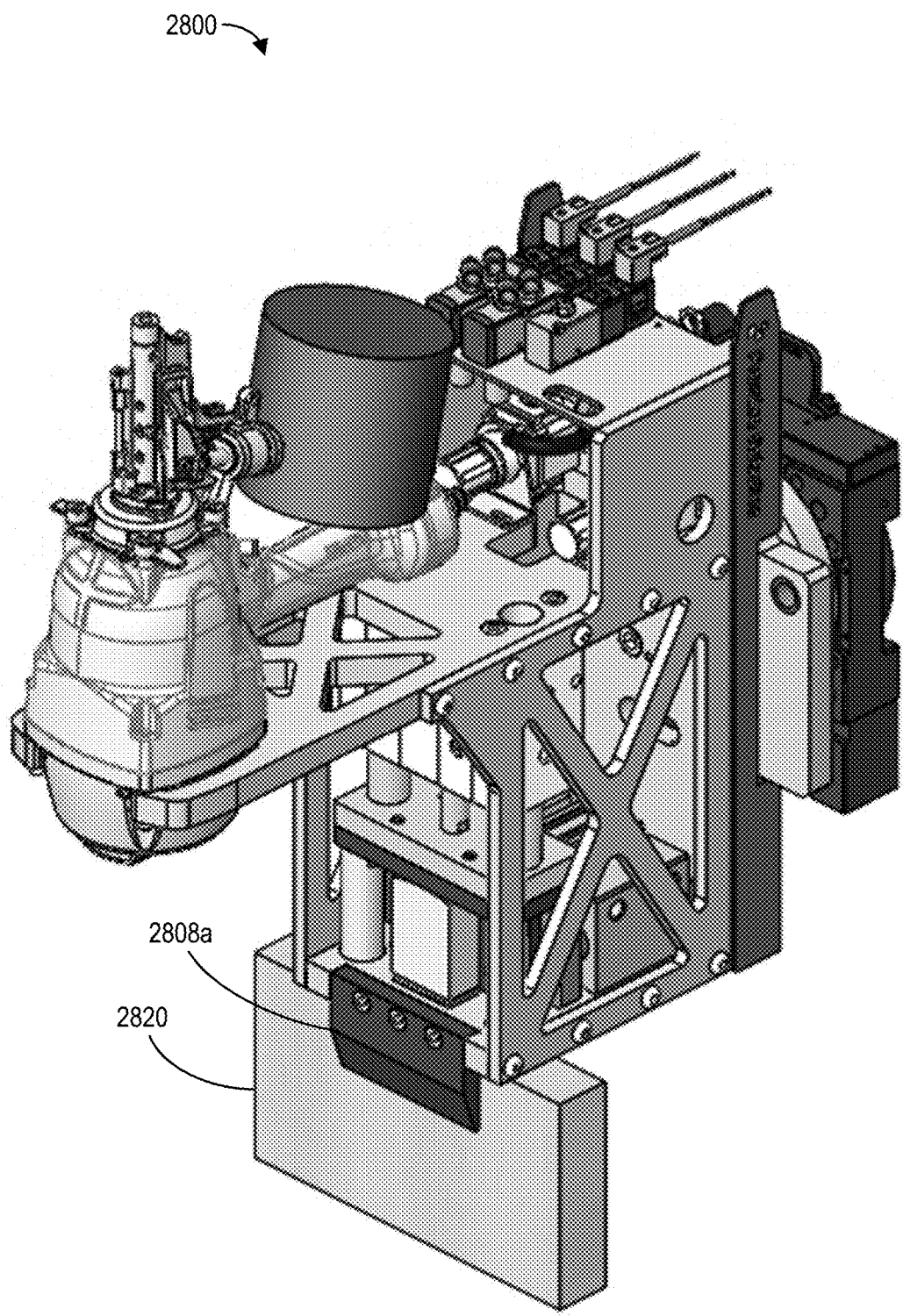
Figure 28C:
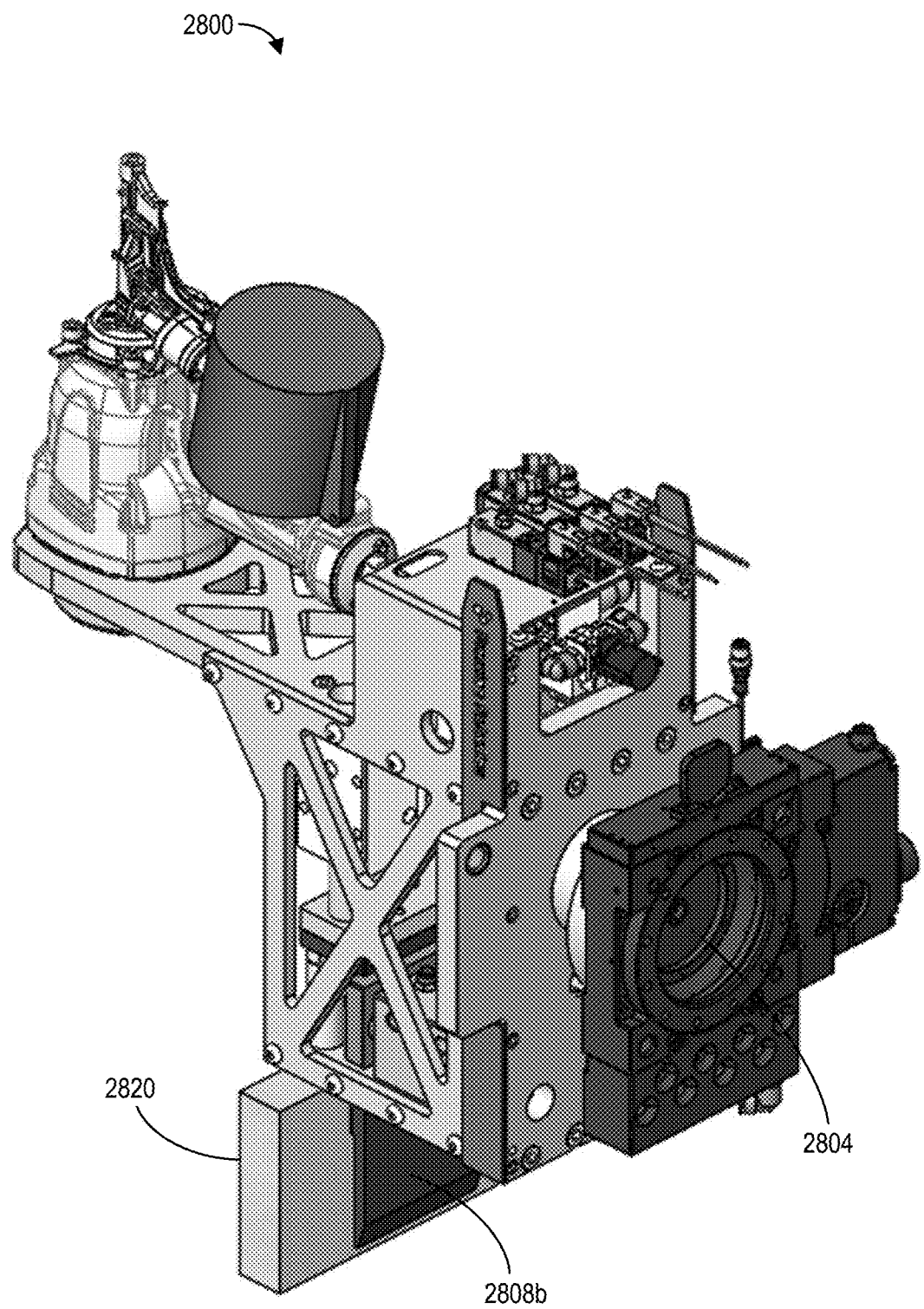
Figure 28D:
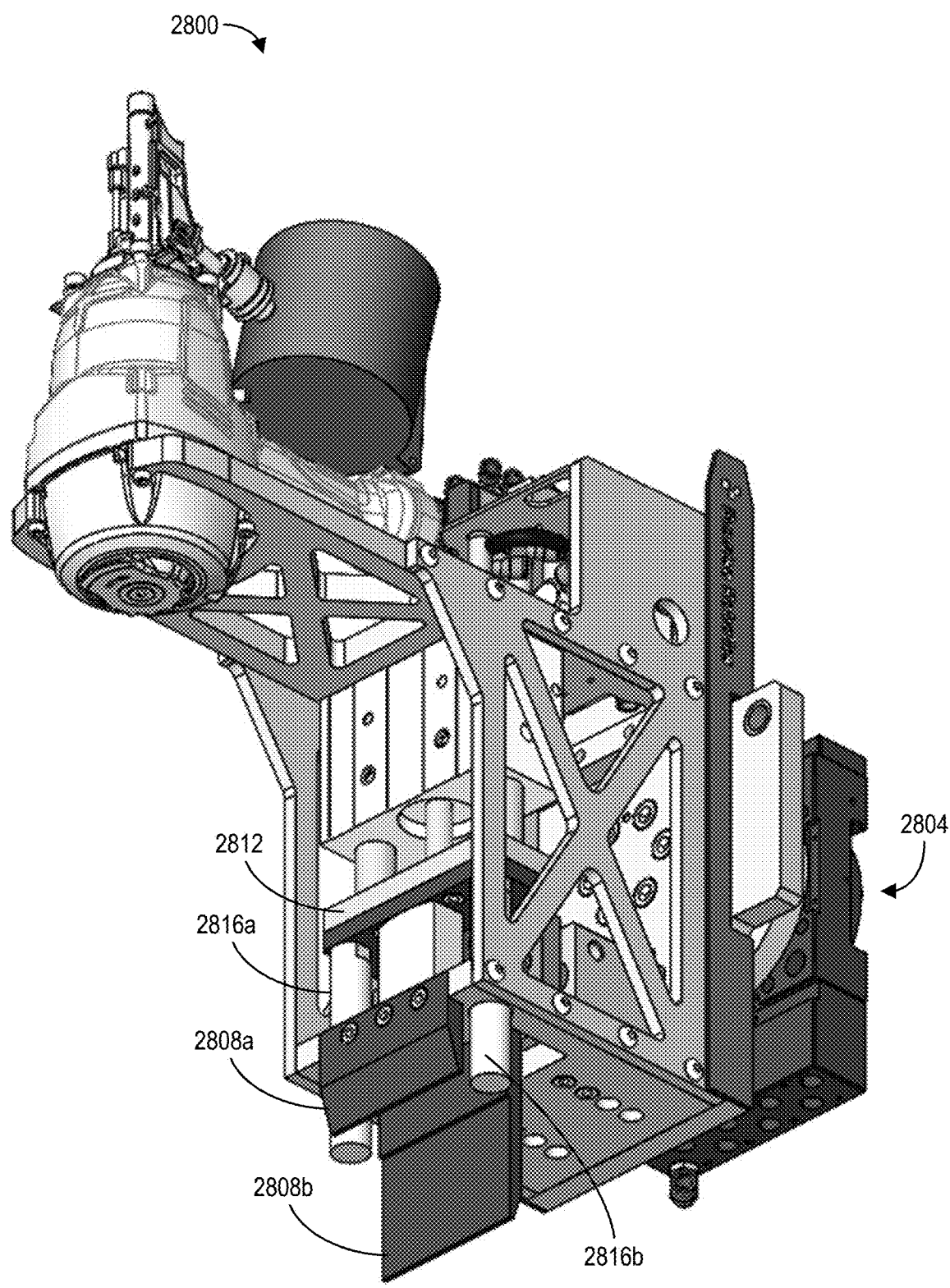

Connection portion 2804 may be used to mount compression gripper/nailer 2800 to an assembly robot. Gripping members 2808a and 2808b may enable gripping of building parts (e.g., building part 2820 shown in FIGS. 28B and 28C). The compression gripping action may be actuated using a single pneumatic gripping cylinder 2810. This may provide improved performance compared with using two pneumatic cylinders that need to be synchronized. Compression gripper/nailer 2800 can pick up pre-cut pieces in a range of sizes. For example, compression gripper/nailer 2800 may be used for framing 2×4, 2×6 and/or 2×8 wall panels. In various embodiments, the compression gripper/nailer 2800 can pick up pre-cut pieces in a range from 5 inches to 20 feet. Ejector cylinder 2812 may actuate ejector member 2816a and 2816b to eject a building part from compression gripper/nailer 2800. For example, FIG. 28A shows ejector cylinder 2812 in a retracted position and FIG. 28D shows ejector cylinder 2812 in an advanced position.

In some examples, the assembly robot may include a force/torque sensor that can detect changes in weight. The weight changes detected by the force/torque sensor may be used to detect if a fastener magazine of any spindle/tool mounted to the assembly robot is depleted. The detected weight changes may also be used to detect errors associated with building parts picked up by a spindle/tool mounted to the assembly robot. For example, the detected weight may indicate that an incorrect part has been picked up or multiple parts have been picked up instead of a single part.

The force/torque sensor of the assembly robot may also detect weight changes of compression gripper/nailer 2800 as the nail magazine is being depleted. The detected weight changes may be used to provide a notification when the nail magazine is close to being empty. The notification may be provided to a user (e.g., via computer terminal 102 shown in FIG. 1) and the nail magazine can be refilled in response to the notification. This can improve cycle time by providing automatic feedback regarding the status of the nail magazine.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A robotic assembly cell for assembling building structures comprising:
    a perception sensor system;
    one or more assembly robots; and
    at least one processor operable to:
        receive instructions corresponding to an assembly sequence for assembling a building structure;
        determine a plurality of building parts required for assembling the building structure based on the assembly sequence;
        identify each building part of the plurality of building parts within a facility, based on sensor data from the perception sensor system;
        configure an assembly robot to retrieve one or more identified building parts;
        configure the assembly robot to assemble the retrieved one or more building parts according to the assembly sequence;
        receive a captured image of a spindle of the assembly robot, the captured image including a picked bit that is picked by the spindle for performing a task;
        compare the captured image with multiple reference images, each reference image corresponding to a bit available to be picked by the spindle;
        determine multiple matching scores, each matching score indicating matching between features in the captured image and features in one of the reference images; and
        verify that correct bit was picked by the spindle for performing the task based on the multiple matching scores.

2. The robotic assembly cell of claim 1, wherein the at least one processor is operable to identify each building part withing the facility by identifying a location, an orientation, and a distance of each building part of the plurality of building parts.

3. The robotic assembly cell of claim 2, wherein the at least one processor is operable to identify each building part by identifying at least one edge of the building part.

4. The robotic assembly cell of claim 1, wherein the perception sensor system comprises at least one of: a 2D or 3D imaging camera, a force sensor, torque sensor and light source.

5. The robotic assembly cell of claim 1, wherein the at least one processor is further operable to determine if a building part includes a defect, based on the sensor data from the perception sensor system.

6. The robotic assembly cell of claim 5, wherein the defect is one of: a crack, an edge imperfection, and a crown.

7. The robotic assembly cell of claim 1, wherein the at least one processor is further operable to:
    when the building part includes a defect, determine if the building part can be used and if the building part cannot be used, configure the assembly robot to discard the building part.

8. The robotic assembly cell of claim 1, wherein the at least one processor is further operable to determine if the assembled building structure includes a defect, based on the sensor data from the perception sensor system.

9. The robotic assembly cell of claim 1, wherein the perception sensor system is configured to identify a presence of an obstacle in an operation zone of the assembly robot.

10. The robotic assembly cell of claim 1, wherein the at least one processor is further operable to:
receive a captured image of a building part, the building part being any one of the plurality of building parts;
generate a binary mask of the building part based on the captured image;
detect position and orientation of the building part based on detecting lines or corners of the binary mask; and
determine a pose correction for the building part based on the detected orientation.

11. The robotic assembly cell of claim 1, wherein the at least one processor is further operable to:
receive a captured image of a pre-cut table;
perform background subtraction of the received image to detect a building part staged on the pre-cut table; and
generate a binary mask of the building part based on the background subtraction.

12. The robotic assembly cell of claim 11, wherein the at least one processor is further operable to:
determine a contour of the building part based on the binary mask; and
compare the determined contour with a reference contour of the building part.

13. The robotic assembly cell of claim 12, wherein the at least one processor is further operable to:
determine a length and a width of the building part based on the binary mask.

14. The robotic assembly cell of claim 1, wherein the at least one processor is further operable to:
receive a captured image of a table;
perform background subtraction of the received image to detect an object on the table;
generate a binary mask of the object based on the background subtraction; and
determine a contour of the object based on the binary mask.

15. The robotic assembly cell of claim 1, wherein the one or more assembly robots comprises two assembly robots.

16. The robotic assembly cell of claim 1, wherein the one or more assembly robots comprises at least two assembly robots.

17. The robotic assembly cell of claim 1, wherein each assembly robot comprises a robotic arm extending between a first end and a second end, wherein the first end comprises a corresponding end effector and the second end comprises a drive system for facilitating movement of the robotic arm.

18. The robotic assembly cell of claim 17, wherein configuring the assembly robot to retrieve the identified building parts comprises selecting an assembly tool for use with the assembly robot, the assembly tool being couplable to the end effector of the assembly robot, and using the assembly tool to retrieve the identified building parts.

19. The robotic assembly cell of claim 17, wherein configuring the assembly robot to assemble the retrieved building parts according to the assembly sequence comprises selecting an assembly tool for use with the assembly robot, the assembly tool being couplable to the end effector of the assembly robot, and using the assembly tool to assemble the retrieved building parts.

20. The robotic assembly cell of claim 1, wherein the captured image of the spindle is mismatched in orientation with one or more of the multiple reference images.

21. A method of assembling building structures in a robotic assembly cell, the robotic assembly cell comprising a perception sensor system, one or more assembly robots and at least one processor, the method comprising:
receiving, at the at least one processor, instructions corresponding to an assembly sequence for assembling a building structure, the instructions being received from a remote processor;
determining, by the at least one processor, a plurality of building parts required for assembling the building structure based on the assembly sequence;
identifying each building part of the plurality of building parts within a facility, based on sensor data from the perception sensor system;
configuring, by the at least one processor, an assembly robot to retrieve one or more identified building parts;
configuring, by the at least one processor, the assembly robot to assemble the retrieved building parts according to the assembly sequence;
receiving, by the at least one processor, a captured image of a spindle of the assembly robot, the captured image including a picked bit that is picked by the spindle for performing a task;
comparing the captured image with multiple reference images, each reference image corresponding to a bit available to be picked by the spindle;
determining multiple matching scores, each matching score indicating matching between features in the captured image and features in one of the reference images; and
verifying that correct bit was picked by the spindle for performing the task based on the multiple matching scores.

22. The method of claim 21, wherein identifying each building part of the plurality of building parts within the facility comprises: identifying, by the at least one processor, a location, an orientation, and a distance of each building part of the plurality of target building parts.

23. The method of claim 21, wherein the method further comprises:
processing, by the at least one processor, sensor data received from the perception sensor system; and
determining, by the at least one processor, whether a building part includes a defect.

24. The method of claim 21, wherein the method further comprises:
determining, by the at least one processor, whether the building part including a defect can be used; and
configuring, by the at least one processor, the assembly robot to discard the building part if it is determined that the building part including the defect cannot be used.

25. The method of claim 21, wherein the method comprises identifying each building part by identifying at least one edge of the building part.

26. The method of claim 21, further comprising:
receiving, at the at least one processor, a captured image of a building part, the building part being any one of the plurality of building parts;
generating a binary mask of the building part based on the captured image;
detecting position and orientation of the building part based on detecting lines or corners of the binary mask; and
determining a pose correction for the building part based on the detected orientation.

27. The method of claim 21, further comprising:
receiving, by the at least one processor, a captured image of a pre-cut table;
performing background subtraction of the received image to detect a building part staged on the pre-cut table; and
generating a binary mask of the building part based on the background subtraction.

28. The method of claim 27, further comprising:
determining, at the at least one processor, a contour of the building part based on the binary mask;
comparing the determined contour with a reference contour of the building part; and
determining a length and a width of the building part based on the binary mask.

29. The method of claim 21, further comprising:
receiving, by the at least one processor, a captured image of a table;
performing background subtraction of the received image to detect an object on the table;
generating a binary mask of the object based on the background subtraction; and
determining a contour of the object based on the binary mask.

30. The method of claim 21, wherein the captured image of the spindle is mismatched in orientation with one or more of the multiple reference images.

* * * * *

UNITED STATES PATENT AND TRADEMARK OFFICE
CERTIFICATE OF CORRECTION

PATENT NO. : 12,179,361 B2
APPLICATION NO. : 18/590583
DATED : December 31, 2024
INVENTOR(S) : Ramtin Attar et al.

Page 1 of 1

It is certified that error appears in the above-identified patent and that said Letters Patent is hereby corrected as shown below:

In the Claims

Column 58, Claim 21, Line 16:
"robot to retrieve one or more identified building parts;"
Should recite:
--robot to retrieve the one or more identified building parts;--

Column 58, Claim 22, Line 38:
"part of the plurality of target building parts."
Should recite:
--part of the plurality of building parts.--

Signed and Sealed this
Fifteenth Day of July, 2025

Coke Morgan Stewart
*Acting Director of the United States Patent and Trademark Office*